United States Patent
LeMay et al.

(10) Patent No.: US 11,841,939 B2
(45) Date of Patent: *Dec. 12, 2023

(54) TECHNOLOGIES FOR OBJECT-ORIENTED MEMORY MANAGEMENT WITH EXTENDED SEGMENTATION

(71) Applicant: Intel Corporation, Santa Clara, CA (US)

(72) Inventors: Michael LeMay, Hillsboro, OR (US); Barry E. Huntley, Hillsboro, OR (US); Ravi Sahita, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,768

(22) Filed: Nov. 29, 2021

(65) Prior Publication Data
US 2022/0083648 A1    Mar. 17, 2022

Related U.S. Application Data

(63) Continuation of application No. 17/346,757, filed on Jun. 14, 2021, which is a continuation of application
(Continued)

(51) Int. Cl.
*G06F 21/53*    (2013.01)
*G06F 9/50*    (2006.01)
(Continued)

(52) U.S. Cl.
CPC ............ *G06F 21/53* (2013.01); *G06F 9/5016* (2013.01); *G06F 12/00* (2013.01); *G06F 21/121* (2013.01);
(Continued)

(58) Field of Classification Search
CPC ........ G06F 21/53; G06F 9/5016; G06F 12/00; G06F 21/121; G06F 21/74; G06F 2221/033; G06F 2221/0713; G06F 2221/2113
See application file for complete search history.

(56) References Cited

U.S. PATENT DOCUMENTS

| 5,517,657 A | 5/1996 | Rodgers |
| 5,564,030 A | 10/1996 | Whitted, III |

(Continued)

FOREIGN PATENT DOCUMENTS

| CN | 109643290 A | 4/2019 |
| DE | 112017004980 A | 6/2019 |

OTHER PUBLICATIONS

Non-Final OA issued in U.S. Appl. No. 17/456,817, dated Dec. 23, 2022, 12 pages.
(Continued)

*Primary Examiner* — Mohammad W Reza
(74) *Attorney, Agent, or Firm* — Jaffery Watson Mendonsa & Hamilton LLP

(57) ABSTRACT

Technologies for memory management with memory protection extension include a computing device having a processor with one or more protection extensions. The processor may load a logical address including a segment base, effective limit, and effective address and generate a linear address as a function of the logical address with the effective limit as a mask. The processor may switch to a new task described by a task state segment extension. The task state extension may specify a low-latency segmentation mode. The processor may prohibit access to a descriptor in a local descriptor table with a descriptor privilege level lower than the current privilege level of the processor. The computing device may load a secure enclave using secure enclave support of the processor. The secure enclave may
(Continued)

load an unsandbox and a sandboxed application in a user privilege level of the processor. Other embodiments are described and claimed.

20 Claims, 17 Drawing Sheets

Related U.S. Application Data

No. 16/218,908, filed on Dec. 13, 2018, now Pat. No. 11,036,850, which is a continuation of application No. 15/283,317, filed on Oct. 1, 2016, now Pat. No. 10,157,277.

(51) Int. Cl.
  *G06F 21/12* (2013.01)
  *G06F 21/74* (2013.01)
  *G06F 12/00* (2006.01)

(52) U.S. Cl.
  CPC ........ *G06F 21/74* (2013.01); *G06F 2221/033* (2013.01); *G06F 2221/0713* (2013.01); *G06F 2221/2113* (2013.01)

(56) References Cited

U.S. PATENT DOCUMENTS

| | | | |
|---|---|---|---|
| 5,878,245 | A | 3/1999 | Johnson |
| 6,438,671 | B1 | 8/2002 | Doing |
| 6,807,616 | B1 | 10/2004 | McGrath |
| 6,813,699 | B1 | 11/2004 | Belgard |
| 2003/0037220 | A1 | 2/2003 | Anvin et al. |
| 2004/0123066 | A1 | 6/2004 | Liron et al. |
| 2005/0044292 | A1 | 2/2005 | McKeen |
| 2006/0069901 | A1 | 3/2006 | Mathew |
| 2009/0204785 | A1 | 8/2009 | Yates, Jr. |
| 2009/0282474 | A1 | 11/2009 | Chen |
| 2011/0246724 | A1 | 10/2011 | Marathe |
| 2012/0017213 | A1* | 1/2012 | Hunt ................. G06F 21/53 718/100 |
| 2012/0042145 | A1 | 2/2012 | Sehr |
| 2013/0042049 | A1 | 2/2013 | Fiske |
| 2013/0052999 | A1 | 2/2013 | Fiske |
| 2013/0097706 | A1 | 4/2013 | Titonis et al. |
| 2013/0167222 | A1* | 6/2013 | Lewis ................. G06F 21/53 726/17 |
| 2013/0247147 | A1 | 9/2013 | Pontillo et al. |
| 2014/0033304 | A1* | 1/2014 | Lewis ................. G06F 21/53 726/22 |
| 2014/0282501 | A1 | 9/2014 | Zeng |
| 2015/0227373 | A1 | 8/2015 | Mudawar |
| 2015/0294113 | A1* | 10/2015 | Troeger ............. G06F 21/566 726/25 |
| 2017/0193222 | A1 | 7/2017 | Striem-Amit |
| 2018/0004531 | A1 | 1/2018 | Chen |
| 2018/0027018 | A1 | 1/2018 | McErlane |
| 2018/0052999 | A1 | 2/2018 | Mitola |
| 2018/0060065 | A1 | 3/2018 | Lai |

OTHER PUBLICATIONS

Chinese Office Action for CN Application No. 201780053202.4, dated Nov. 14, 2022, 14 pages. (No English Translation).
Non-Final OA issued in U.S. Appl. No. 17/346,860, dated Oct. 27, 2022, 11 pages.
Non-Final OA issued in U.S. Appl. No. 17/346,812, dated Oct. 27, 2022, 11 pages.
Notice of Allowance issued in U.S. Appl. No. 17/456,817, dated Feb. 8, 2023, 12 pages.
International Search Report for PCT Application No. PCT/US2017/047541, dated Nov. 27, 2017, 4 pages.
Written Opinion for PCT Application No. PCT/US2017/047541, dated Nov. 27, 2017, 4 pages.
Final Office Action issued in U.S. Appl. No. 17/346,757, dated Apr. 13, 2023, 7 pages.
Final Office Action issued in U.S. Appl. No. 17/346,860, dated Apr. 13, 2023, 8 pages.
Final Office Action issued in U.S. Appl. No. 17/346,812, dated Apr. 12, 2023, 12 pages.
Non-Final Office Action issued in U.S. Appl. No. 17/456,744, dated Apr. 13, 2023, 13 pages.

\* cited by examiner

TECHNOLOGIES FOR OBJECT-ORIENTED MEMORY MANAGEMENT WITH EXTENDED SEGMENTATION

CROSS-REFERENCE TO RELATED U.S. PATENT APPLICATION

This Application is a continuation of and claims the benefit of and priority to U.S. application Ser. No. 17/346,757, entitled TECHNOLOGIES FOR OBJECT-ORIENTED MEMORY MANAGEMENT WITH EXTENDED SEGMENTATION, by Michael LeMay, et al., filed Jun. 14, 2021, now allowed, which is a continuation of and claims the benefit of and priority to U.S. application Ser. No. 16/218,908, entitled TECHNOLOGIES FOR OBJECT-ORIENTED MEMORY MANAGEMENT WITH EXTENDED SEGMENTATION, by Michael LeMay, et al., filed Dec. 13, 2018, now issued as U.S. Pat. No. 11,036,850, which is a continuation of and claims the benefit of and priority to U.S. application Ser. No. 15/283,317, entitled TECHNOLOGIES FOR OBJECT-ORIENTED MEMORY MANAGEMENT WITH EXTENDED SEGMENTATION, by Michael LeMay, et al., filed Oct. 1, 2016, now issued as U.S. Pat. No. 10,157,277, the entire contents of which are incorporated herein by reference.

BACKGROUND

Certain computer processors support partitioning logical memory space into multiple partitions. For example, certain processors manufactured by Intel Corporation support a segmented memory model when operating in 32-bit mode. In those processors, a memory access instruction may specify a logical address (sometimes called a far pointer) that includes a segment selector and an effective address. The segment selector, which may be stored in a dedicated segment register (e.g., CS, SS, DS, ES, etc.) may be used to locate a segment descriptor. The segment descriptor includes a segment base and an effective limit. The processor adds the segment base to the effective address to generate a linear address. The processor may generate a general protection fault or other exception if the effective address exceeds the effective limit. The processor then uses a memory management unit and one or more page tables to translate the linear address into a physical memory address.

Most modern operating systems use a flat memory model, effectively disabling the segmentation features of the processor. For example, the operating system may treat the entire virtual memory space as a single segment. Additionally, support for memory segmentation is typically limited for processors operating in 64-bit mode. For example, in 64-bit mode the segment base for most segments is required to be zero, and the effective limit is not checked.

Current processors may provide support for a trusted execution environment such as a secure enclave. Secure enclaves include ranges of memory (including code and/or data) protected by the processor from unauthorized access including unauthorized reads and writes. In particular, certain processors may include Intel® Software Guard Extensions (SGX) to provide secure enclave support. SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Current processors may not support certain segmentation features from within an SGX secure enclave. For example, certain processors may require the segment base to be set to zero for most segments within a secure enclave and may disallow instructions that manipulate segment registers (other than the FS and GS registers).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
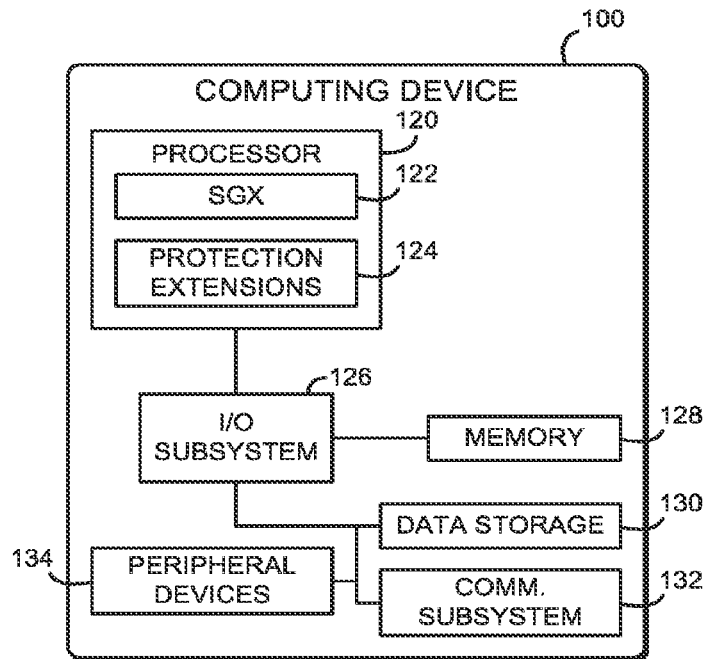
FIG. 1 is a simplified block diagram of at least one embodiment of a computing device for memory management with memory protection extensions.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for memory management with protection extensions includes a processor 120 that supports one or more protection extensions to specify and enforce segment limit checks efficiently for 64-bit addresses. In some embodiments, the processor 120 may support a low-latency segmentation mode that efficiently enforces segment limits, even for 64-bit addressing. In some embodiments, the processor 120 may support extended processor-based task switching to activate the low-latency segmentation mode. The extended task switching framework may include access control checks to allow supervisor code (e.g., ringlevel 0) to safely delegate sandbox management to user-level code (e.g., ringlevel 3) and to safely virtualize system call instructions. In some embodiments, the processor 120 may support segmentation and sandboxing using protection domains rather than the processor-based task switching mechanism. The processor 120 may also support a control stack segment to regulate control flow and thereby potentially prevent stack-based exploits. In some embodiments, the processor 120 may also support extended descriptors and extended descriptor tables to manage memory segments. Additionally or alternatively, as described further below in connection with FIGS. 17-25, the processor 120 may support memory protection using one or more segment-linked range registers (SLRRs) and a fast exception dispatch technique.

Those protection extensions may allow, for example, efficient memory protection and data isolation between applications or between different parts of a single application, without relying on memory paging or traditional virtualization. In particular, the protection extensions may allow user-level code (e.g., ringlevel 3) to configure and manage isolation of other user-level code. The protection extensions may support transparent protection of sandboxed application code, meaning that unmodified binary applications may be executed and protected. Accordingly, the computing device 100 may efficiently support memory protection and isolation for unmodified, containerized user-level applications. By using protection extensions of the processor 120, the computing device 100 may provide improved performance and reduced complexity as compared to software-only isolation approaches. The computing device 100 also supports efficient segmentation address calculation and limit checking for 64-bit addresses. Additionally, because the sandboxed application(s) and the unsandbox management code both execute as unprivileged code, the computing device 100 may avoid mode-switching overhead associated with virtualization-based approaches. Further, the sandboxed application(s) and the unsandbox management code may be included within the same Intel® SGX secure enclave, which may improve data protection and performance. Additionally, the integrity of a sandboxed application and its unsandbox container may be attested and verified using SGX attestation, allowing a remote entity to verify proper isolation and sandboxing.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 126, a memory 128, a data storage device 130, and a communication subsystem 132. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 128. The secure enclave support 122 may be embodied as a set of processor instruction extensions that allows the processor 120 to establish one or more secure enclaves in the memory 128. For example, the secure enclave support 122 may be embodied as Intel® Software Guard Extensions (SGX) technology.

As shown, the processor 120 also includes protection extensions 124. The protection extensions 124 allow the processor 120 to establish an enhanced memory segmentation model. In particular, in some embodiments the protection extensions 124 may support a low-latency segmentation mode with support for address translation and bounds checking in both 32-bit and 64-bit modes. The protection extensions 124 also may support permissive segmentation in 32-bit mode (e.g., requiring segment base to be zero and not performing limit checks). As described further below, the protection extensions 124 may also include support for isolated execution of applications or parts of applications (sandboxing), such as hardware support for enhanced task switching, call gate permission checks, protection domain switching, and/or control stack segment checking. In some embodiments, the protection extensions 124 may support segment-linked range registers and fast exception dispatch.

The memory 128 may be embodied as any type of volatile or non-volatile memory or data storage capable of performing the functions described herein. In operation, the memory 128 may store various data and software used during operation of the computing device 100 such as operating systems, applications, programs, libraries, and drivers. As described above, the memory 128 may be divided logically by the processor 120 into one or more segments, which may be used to isolate applications or other software executed by the computing device 100. Additionally, part of the memory 128 may be used as an enclave page cache (EPC) to store encrypted code and/or data for the secure enclaves established by the processor 120. The processor 120 may encrypt memory pages of each secure enclave before transferring the encrypted pages out of the processor 120 to the EPC within the memory 128.

The memory 128 is communicatively coupled to the processor 120 via the I/O subsystem 126, which may be embodied as circuitry and/or components to facilitate input/output operations with the processor 120, the memory 128, and other components of the computing device 100. For example, the I/O subsystem 126 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 120, the memory 128, and other components of the computing device 100, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. The communication subsystem 132 of the computing device 100 may be embodied as any communication circuit, device, or collection thereof, capable of enabling communications between the computing device 100 and other remote devices over a network. The communication subsystem 132 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 134. The peripheral devices 134 may include any number of additional input/output devices, interface devices, and/or other peripheral devices. For example, in some embodiments, the peripheral devices 134 may include a display, touch screen, graphics circuitry, keyboard, mouse, speaker system, microphone, network interface, and/or other input/output devices, interface devices, and/or peripheral devices.

Figure 2:
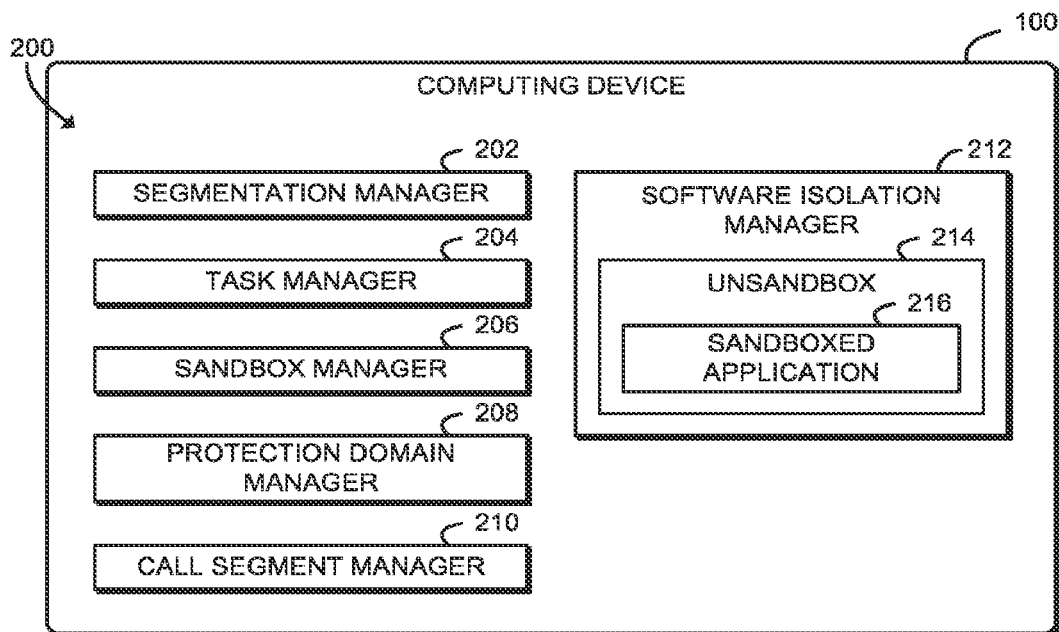
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a segmentation manager 202, a task manager 204, a sandbox manager 206, a protection domain manager 208, a call segment manager 210, and a software isolation manager 212. The various components of the environment 200 may be embodied as hardware, firmware, processor microcode, software, or a combination thereof. As such, in some embodiments, one or more of the components of the environment 200 may be embodied as circuitry or collection of electrical devices (e.g., segmentation manager circuitry 202, task manager circuitry 204, sandbox manager circuitry 206, protection domain manager circuitry 208, call segment manager circuitry 210, and/or software isolation manager circuitry 212). It should be appreciated that, in such embodiments, one or more of the segmentation manager circuitry 202, the task manager circuitry 204, the sandbox manager circuitry 206, the protection domain manager circuitry 208, the call segment manager circuitry 210, and/or the software isolation manager circuitry 212 may form a portion of one or more of the processor 120, the I/O subsystem 126, and/or other components of the computing device 100. Additionally, in some embodiments, one or more of the illustrative components may form a portion of another component and/or one or more of the illustrative components may be independent of one another.

The segmentation manager 202 is configured to load a logical address. The logical address includes a segment base, an effective limit, and an effective address. The segmentation manager 202 is further configured to generate a linear address as a function of the logical address with the effective limit as a mask. Generating the linear address includes, for each bit of the logical address, selecting a corresponding bit from the segment base or from the effective address based on a value of a corresponding bit from the effective limit. The segment base, the effective limit, the effective address, and the linear address may each be embodied as 32-bit values or as 64-bit values.

The task manager 204 is configured to switch to a new task that is described by a task state segment extension in the memory 128 of the computing device 100. The task manager 204 is further configured to activate a low-latency segmentation mode in response to switching to the new task if the task state segment extension is indicative of the low-latency segmentation mode. The logical address may be loaded as described above in connection with the segmentation manager 202 in response to activating the low-latency segmentation mode.

The sandbox manager 206 is configured to determine whether an application sandbox mode is enabled, to determine whether a destination segment for the new task is identified in a local descriptor table in response to determining that the application sandbox mode is enabled, and to determine whether the descriptor privilege level of the destination segment is less than the current privilege level of the processor 120 in response to determining that the destination segment for the new task is identified in the local descriptor table. The sandbox manager 206 is configured to generate an exception in response to determining that the descriptor privilege level is less than the current privilege level.

The software isolation manager 212 is configured to load an unsandbox 214 in a user privilege level of the processor 120. The software isolation manager 212 is further configured to load, by the unsandbox 214, a sandboxed application 216 in the user privilege level. The software isolation manager 212 is configured to configure, by the unsandbox 214, the task state segment extension. The new task described by the task state segment extension is the sandboxed application 216. The software isolation manager 212 is configured to enable, by the unsandbox 214, the application sandbox mode and execute the sandboxed application 216 after enabling the application sandbox mode.

The software isolation manager 212 may be further configured to load a host kernel in a supervisor privilege level of the processor 120. The host kernel loads a host application in the user privilege level, which includes the unsandbox 214. The software isolation manager 212 may be further configured to load a secure enclave in the host application using the secure enclave support 122 of the processor 120. The unsandbox 214 and the sandboxed application 216 may be loaded in the secure enclave. The software isolation manager 212 may be further configured to attest to the secure enclave, which includes measuring a global descriptor table of the sandboxed application 216, measuring a local descriptor table of the sandboxed application 216, and measuring the task state segment extension.

The software isolation manager 212 may be further configured to load, by the host application, a user-level virtual machine monitor and a paravirtualized kernel. The user-level virtual machine monitor includes the unsandbox 214 and the paravirtualized kernel manages one or more sandboxed applications 216. The paravirtualized kernel is also sandboxed by the unsandbox 214. The user-level virtual machine monitor may configure the task state segment extension. The software isolation manager 212 may be further configured to handle, by the user-level virtual machine monitor, a virtualized system call from the sandboxed application 216 in the user privilege level. The software isolation manager 212 may be configured to set a segmentation mode associated with the host kernel to a permissive segmentation mode and to set, by the host application, a segmentation mode associated with the task state segment extension to the low-latency segmentation mode. The software isolation manager 212 may be configured to set a global descriptor table base of the host kernel and a global descriptor table bounds of the host kernel to zero in response to setting the segmentation mode to the permissive segmentation mode. The software isolation manager 212 may be further configured to load, by the sandboxed application 216, a nested sandboxed application 216 in the user privilege level, to configure, by the sandboxed application 216, another task state segment extension that describes a task associated with the nested sandboxed application 216, and to execute the nested sandboxed application 216.

As shown in FIG. 2, in some embodiments the environment 200 may include the protection domain manager 208. The protection domain manager 208 is configured to switch to a new protection domain. Each protection domain may be embodied as a unit of code and data that may be used by multiple software threads. The protection domain manager 208 is further configured to load a segmentation state of the processor 120 for the new protection domain from a domain object segment. The segmentation state may include a local descriptor table selector, a code segment selector, and an entry point instruction pointer. The protection domain manager 208 is further configured to determine if a subsystem identifier of the domain object segment is different from a current subsystem identifier of a current protection domain and to index a subsystem table in the memory 128 with the subsystem identifier to retrieve a subsystem table entry in response to determining that the subsystem identifier of the domain object segment is different from the current subsystem identifier. The protection domain manager 208 is configured to load a stack segmentation state from the subsystem table entry in response to indexing the subsystem table. The stack segmentation state may include a stack segment selector and a stack pointer. The protection domain manager 208 is configured to activate a low-latency segmentation mode if the subsystem table entry is indicative of the low-latency segmentation mode. The logical address may be loaded as described above in connection with the segmentation manager 202 in response to activating the low-latency segmentation mode. The protection domain manager 208 may be further configured to store a current stack pointer of the processor 120 and/or a stack limit in the subsystem table in response to determining that the subsystem identifier of the domain object segment is different from the current subsystem identifier.

As shown in FIG. 2, in some embodiments the environment 200 may also include the call segment manager. The call segment manager 210 is configured to execute a call operation. The call operation is indicative of a target code destination, and may be embodied as a near call, a far call, or another instruction with call semantics. The call segment manager 210 is configured to push a call gate on a control stack in response executing the call operation. The call gate is indicative of a return point associated with the call operation. The control stack is included in a control stack segment of the memory 128. The call segment manager 210 is further configured to execute a return operation in response to executing the call operation. The return operation may be embodied a near return, far return, or other instruction with return semantics. The call segment manager 210 is configured to determine whether a return address of a legacy stack matches an address of a top call gate of the control stack in response executing the return operation. In some embodiments, the call segment manger 210 may be configured to use only the address of the top call gate of the control stack. The call segment manager 210 is configured to generate a control stack mismatch exception in response to determining that the return address of the legacy stack does not match the address of the top call gate of the control stack. The call segment manager 210 may be further configured to read a control stack segment mode from the subsystem table entry in response to indexing of the subsystem table. The call segment manager 210 may be configured to push the call gate and to determine whether the return address of the legacy stack matches the address of the top call gate for intra-domain transfers in response to determining that the control stack segment mode is an intra-domain transfer mode.

In some embodiments, the software isolation manager 212 may be configured to load the unsandbox 214 in a user privilege level of the processor 120; to load, by the unsandbox 214, the sandboxed application 216 in the user privilege level; and to store, by the unsandbox 214, an extended descriptor selector in a code segment register of the processor 120. The extended descriptor selector references an extended descriptor of an extended descriptor table. The sandbox manager 206 may be configured to enable an application sandbox mode of the processor 120 in response to storing the extended descriptor selector in the code segment register. The software isolation manager 212 may be further configured to execute the sandboxed application 216 in response to enabling the application sandbox mode. The logical address may be loaded as described above in connection with the segmentation manager 202 in response to activating the low-latency segmentation mode. The sandbox manager 206 may be further configured to prohibit loading of a segment register of the processor 120 with a legacy descriptor selector in response to enabling the application sandbox mode. The legacy descriptor selector references a legacy descriptor of a local descriptor table or a global descriptor table.

Figure 3:
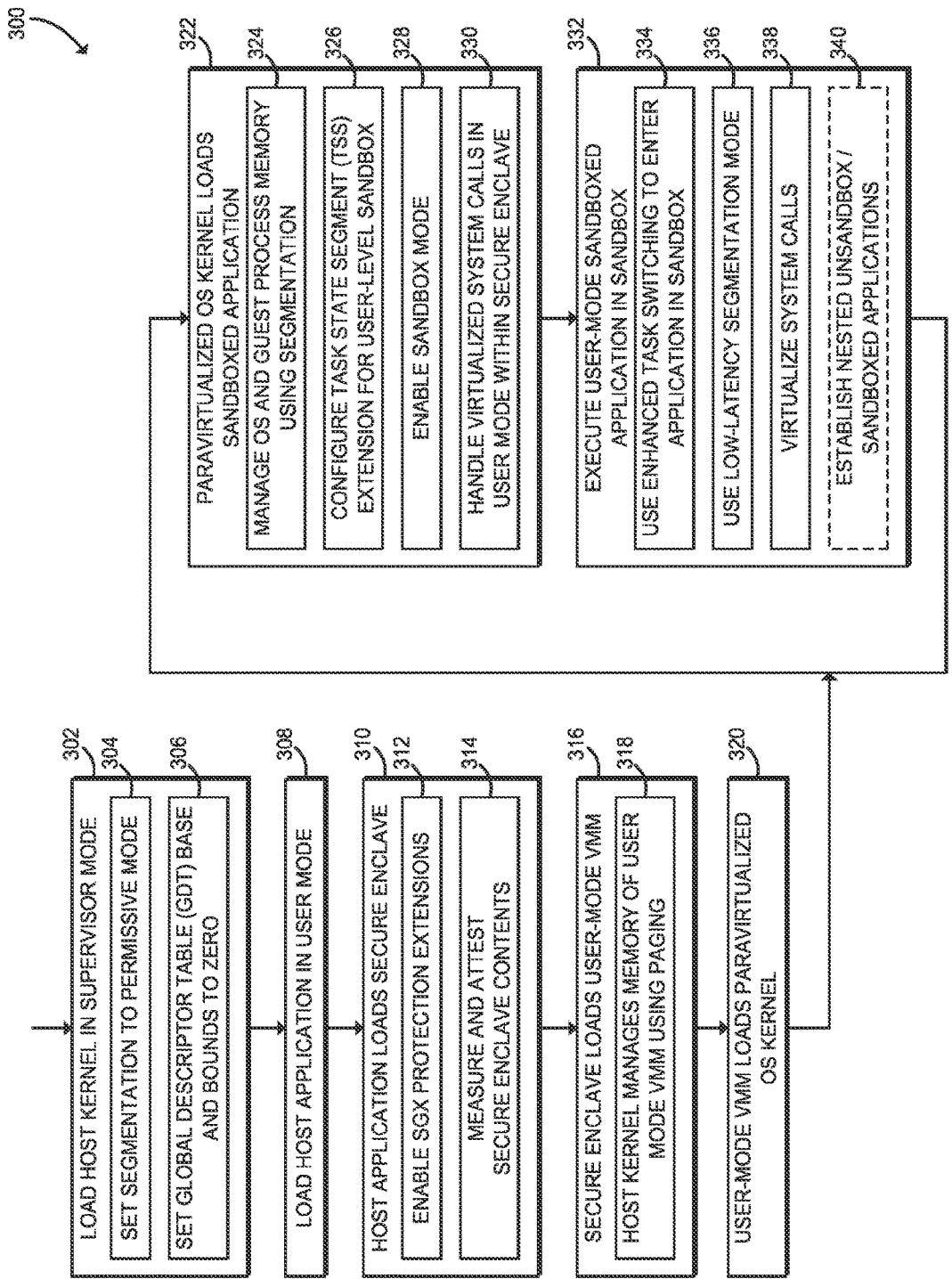
FIG. 3 is a simplified flow diagram of at least one embodiment of a method for application sandboxing using protection extensions that may be executed by the computing device of FIGS. 1-2.

Referring now to FIG. 3, in use, the computing device 100 may execute a method 300 for application sandboxing using protection extensions. It should be appreciated that, in some embodiments, the operations of the method 300 may be performed by one or more components of the environment 200 of the computing device 100 as shown in FIG. 2. The method 300 begins in block 302, in which the computing device 100 loads a host operating system kernel in a supervisor mode of the processor 120. The supervisor mode may include any privileged operating mode, root mode, or other mode of the processor 120 in which the processor 120 may perform supervisory operations. For example, the host kernel may be loaded in ring 0 for certain processors manufactured by Intel® Corporation. In block 304, the computing device 100 sets the segmentation mode of the processor 120 to a permissive mode. In the permissive mode, the processor 120 does not perform segment bounds checking. For example, the segment base for every segment may be set to zero and the processor 120 may not check the effective limits for each segment. The processor 120 may be set to the permissive segmentation mode when operating in 32-bit, 64-bit, or any other addressing mode. In block 306, the computing device 100 sets the global descriptor table (GDT) segment base and bounds to zero. Thus, accesses to the GDT with the processor 120 in permissive segmentation mode may be allowed, while accesses to the GDT with the processor 120 in another mode that enforces segmentation may generate a general protection fault or other exception. As described below, enforcing the GDT segment base and bounds may prevent access to the GDT from sandboxed applications.

In block 308, the computing device 100 loads a host application in a user mode of the processor 120. The user mode may include any non-privileged operating mode of the processor 120 that may be managed by code executed in the supervisor mode. For example, the host application may be loaded in ring 3 for certain processors manufactured by Intel Corporation.

In block 310, the host application loads a secure enclave in the user mode. As described above, the secure enclave may be embodied as an encrypted, isolated segment of code and data that is not accessible by other software entities of the computing device 100. The secure enclave is established and protected by the secure enclave support 122 of the processor 120. In particular, the contents of the secure enclave may be encrypted and stored in an enclave page cache included in the memory 128. Thus, even privileged software of the computing device 100 such as the host kernel may not access the contents of the secure enclave. As described above, the secure enclave may be established using Intel® SGX technology. Additionally or alternatively, in some embodiments, the secure enclave may be established using another trusted execution environment, such as an ARM® TrustZone® secure world, a manageability engine, or other environment.

In block 312, the computing device enables SGX protection extensions. Enabling the protection extensions allows the processor 120 to perform memory segmentation translation and bounds checking for code executing in the secure enclave. In particular, enabling the protection extensions may allow segment bases to be set to a value other than zero and allow instructions that manipulate segment registers other than FS and GS. The segment register state may also be measured and included whenever enclave state is saved and restored. Additionally, enabling protection extensions allows the EEXIT instruction to be executed only from within the unsandbox 214, because executing EEXIT from within a sandboxed application 216 could break the sandbox by, for example, specifying an arbitrary exitpoint and passing information through general-purpose registers. In block 314, the computing device 100 may measure and attest the secure enclave. As described above, the segment register state is included in the measurement of the secure enclave. Contents of data structures defining the memory segmentation state such as the global descriptor table (GDT), local descriptor table (LDT), and task-state segment (TSS) extensions are also included in the measurement. Verifying the attestation may allow a verifying entity to determine that a particular unsandbox 214 is trusted.

In block 316, the computing device 100 loads a user-mode virtual machine monitor (VMM) within the secure enclave. In the illustrative embodiment, the user-mode VMM is the unsandbox 214 and manages sandboxing for the sandboxed application(s) 216, as described further below. In block 318, the host kernel manages the memory of the user-mode VMM using paging. For example, memory accesses of the user-mode VMM may be regulated by page tables managed by the host kernel. The user-mode VMM may be the only entity of the host process to have its memory managed using paging. The user-mode VMM may execute in a permissive segmentation mode.

In block 320, the user-mode VMM loads a paravirtualized OS kernel, also within the secure enclave. The paravirtualized OS kernel executes in user mode, at a lower privilege level from the host kernel of the computing device 100. In the illustrative embodiment, the paravirtualized OS kernel and any processes managed by that paravirtualized kernel are the sandboxed applications 216. Thus, the memory of the paravirtualized OS kernel and its sandboxed applications are managed using segmentation. The user-level OS kernel may be paravirtualized because in some embodiments the host VMM may have restricted access to the guest, such as when the guest is an SGX enclave. The paravirtualized kernel itself has its memory managed using segmentation, which may prevent errant guest kernel accesses to guest process memory and allow faults generated by the guest kernel to be serviced in ring 3.

In block 322, the paravirtualized operating system kernel loads a sandboxed application 216. As described further below, the sandboxed application 216 executes in user mode and is isolated from other software executed by the computing device 100. The sandboxed application 216 may be embodied as any user-level application, plug-in, server, process, thread, or other software executed by the computing device. For example, the sandboxed application 216 may be embodied as an application container such as Docker or other user-mode process. The sandboxed application 216 may be capable of being executed outside of a sandbox without modification (i.e., the sandboxing may be transparent to the sandboxed application 216).

In block 324, the memory of the paravirtualized operating system kernel and the sandboxed application are managed using segmentation. In particular, the user-mode VMM may establish separate memory segments for the paravirtualized kernel and any sandboxed applications 216, and may manage segmentation-related faults and other exceptions generated by the sandboxed applications 216. The segmentation-related faults may be handled by the user-mode VMM in the user mode of the processor 120, which may prevent an expensive context switch to supervisor mode or an exit from the secure enclave. The user-mode VMM may manage segmentation by configuring LDTs, interrupt descriptor tables, segment registers, task-state segment extensions, and other segmentation control registers and data structures.

Figures 8, 9:
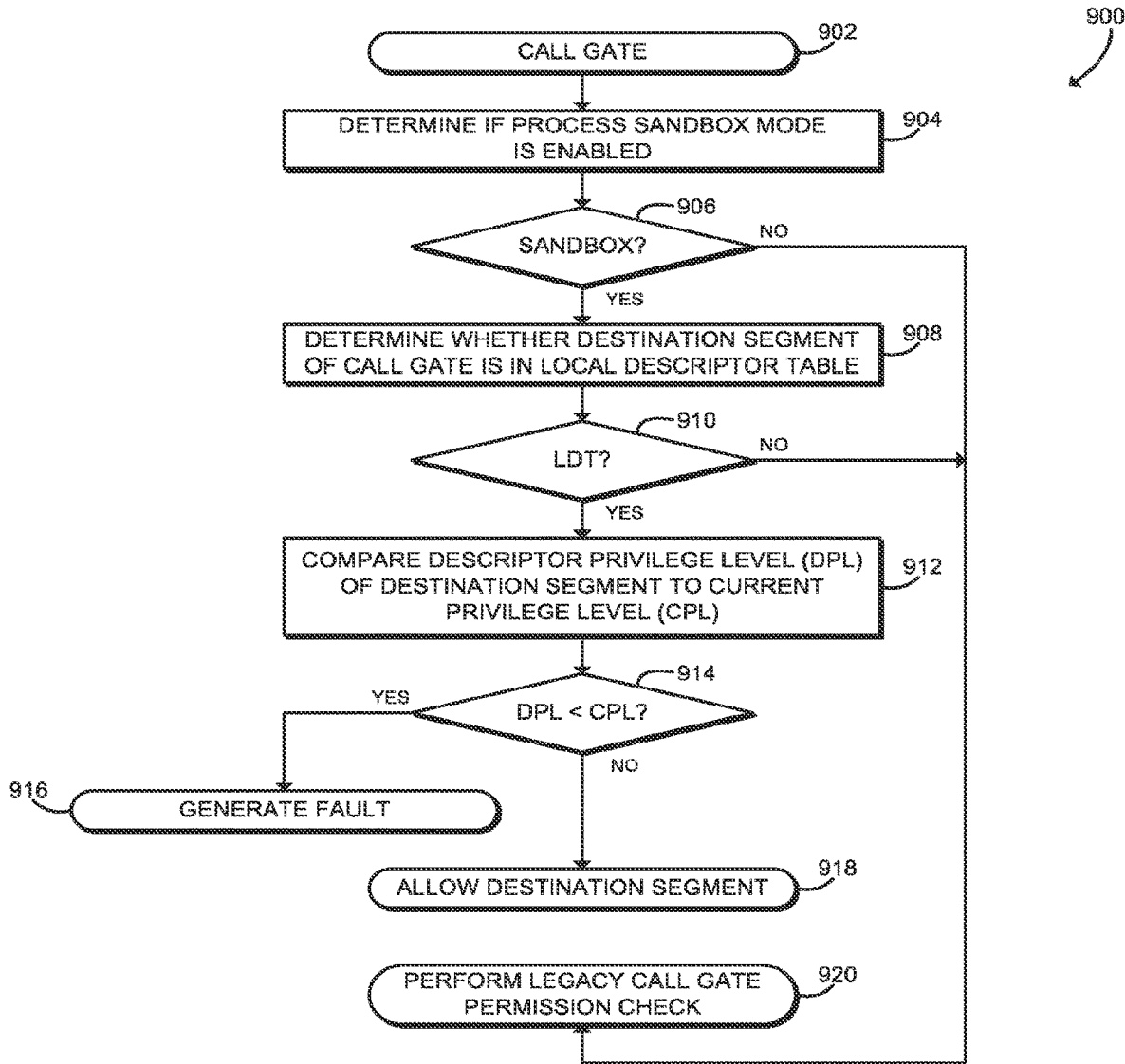
FIG. 8 is a schematic diagram of a task-state segment extension that may be accessed during execution of the method of FIG. 7.
FIG. 9 is a simplified flow diagram of at least one embodiment of a method for call gate execution with privilege checking that may be executed by the computing device of FIGS. 1-2.

In block 326, the computing device 100 may configure a task state segment (TSS) extension for the sandboxed application 216. The TSS extension may identify a particular LDT, code segment, stack segment, stack pointer, starting instruction pointer, and segmentation mode for the sandboxed application 216. The TSS may be appended to or otherwise located with a legacy TSS readable by the processor 120. One potential embodiment of a TSS extension is illustrated in FIG. 8 and described further below.

In block 328, the computing device 100 enables sandbox mode for the processor 120. For example, the host kernel and/or host VMM may enable one or more model-specific registers of the processor 120. When the sandbox mode is enabled, the unsandbox 214 (e.g., the user-mode VMM) may safely configure the LDT for the sandboxed application 216. One potential embodiment of a method for enforcing descriptor privilege levels is described below in connection with FIG. 9.

In block 330, the computing device 100 handles virtualized system calls from the sandboxed application 216 in user mode within the secure enclave. In particular, the processor 120 may support virtualizing instructions that transfer control from user-level (e.g., ring 3) software to privileged (e.g., ring 0) software such as SYSCALL or SYSENTER. For example, to intercept SYSCALL, SYSENTER, and other instructions that are not allowed in enclaves, a new type of exception may be defined. The associated IDT entry would be configured to transfer control to the unsandbox 214. The processor 120 may replicate the MSRs that control user to supervisor mode transitions so that the replicas control transitions from the sandboxed application 216 into the unsandbox 214. It may be unnecessary to provide special support for transitioning from the unsandbox 214 into application sandboxes 216, since it may possible to simply traverse a TSS extension descriptor to perform that transition. However, it may be possible to improve performance by defining new instructions to transition from the unsandbox 214 into application sandboxes 216. Handling the system calls within the secure enclave may prevent expensive context switching out of the secure enclave and/or out of user mode. Thus, the computing device 100 may support high-performance, transparent execution of the sandboxed application 216, because those SYSCALL and/or SYSENTER instructions may be used to issue performance-critical system calls from within a containerized application (e.g., from within a Docker container), and those instructions are embedded in binary container images. Similarly, other programs may be distributed in binary form with embedded SYSCALL and SYSENTER instructions.

In block 332, the user-level application 216 executes within a sandbox. The application 216 is isolated from other applications and code executed by the processor 120. The processor 120 prevents the application 216 from accessing code and/or data outside of the assigned sandbox, even in the presence of programming errors or malicious exploits. In block 334, the computing device 100 uses enhanced task switching of the processor 120 to enter the application 216 in the sandbox. The computing device 100 may, for example, execute a jump, call, or other change of control flow instruction using the TSS extension configured as described above in connection with block 326. The processor 120 may configure the protection extensions 124 of the processor 120 based on the contents of the TSS extension and begin executing the sandboxed application 216. One potential embodiment of a method for enhanced task switching is described below in connection with FIGS. 7 and 8.

In block 336, the computing device 100 uses a low-latency segmentation mode to execute the sandboxed application 216. The low-latency segmentation mode performs address translation and enforces segment limits. The low-latency segmentation mode provides sufficient performance to enforce segmentation for 64-bit addressing modes. One potential embodiment of a method for low-latency segmentation is described below in connection with FIGS. 5 and 6.

In block 338, the computing device 100 virtualizes system calls generated by the sandboxed application 216. As described above in connection with block 330, the processor 120 may support virtualizing SYSCALL, SYSENTER, or other system call instructions. The virtualized system calls are handled by the user-level VMM and/or the paravirtualized kernel in user mode, without exiting the secure enclave.

In some embodiments, in block 340 the computing device 100 may establish additional nested unsandboxes 214 and sandboxed applications 216 within the sandboxed application 216. The protection extensions 124 of the processor 120 are self-virtualizable, meaning that a sandboxed application 216 may be recursively split into a nested unsandbox 214 and collection of sub-sandboxes 216 using the protection extensions 124. Thus, nested sandboxing may be provided without defining new protection extensions for each nested level of sandboxing. The lower logical ringlevel is always responsible for informing the higher logical ringlevel of the TSS extension base addresses contained within the TSS descriptors. Thus, the lower logical ringlevel may configure memory bounds to detect accesses to those memory regions and translate them into modifications of shadow structures. This is analogous to the page table shadowing process that was used in VMMs prior to the introduction of nested paging. Lower logical ringlevels may add offsets to the bases of code and data descriptors installed by higher logical ringlevels to virtualize them. The unsandbox 214 may copy the appropriate shadow TSS extensions to the actual TSS extension locations when entering a virtualized ringlevel, and may perform the inverse operation when exiting it. Additionally, instructions that query information from the segment descriptors loaded in segment registers into memory (e.g., LSL, LAR) may be prohibited in the sandboxed applications 216, to facilitate self-virtualization by hiding virtualized memory bounds from virtualized software.

After executing the sandboxed application 216, the method 300 loops back to block 322, in which the computing device 100 may load and execute additional sandboxed applications 216.

Figure 4:
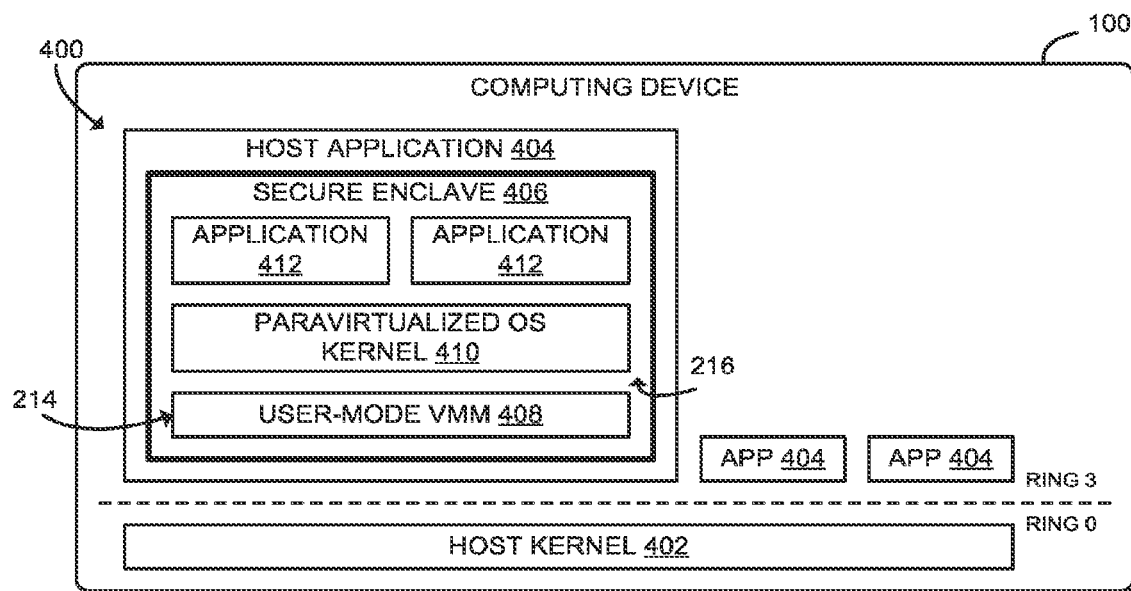
FIG. 4 is a simplified block diagram of a software environment that may be established during execution of the method of FIG. 3.

Referring now to FIG. 4, during execution of the method 300, the computing device 100 may establish a software environment 400. As shown, the environment 400 includes a host operating system kernel 402 that executes in ring 0 of the processor 120. The host operating system kernel 402 may execute multiple host applications 404. Each of the host applications 404 executes in ring 3, and may be embodied as any process, thread, or other code executed by the processor 120. As shown, one or more of the host applications 404 may establish a secure enclave 406 using the secure enclave support 122 of the processor 120. The code of the secure enclave 406 loads a user-mode VMM 408 and a paravirtualized OS kernel 410. The paravirtualized OS kernel 410 may load one or more applications 412. As shown, the user-mode VMM 408 may perform the functions of the unsandbox 214, and the paravirtualized OS kernel 410 and applications 412 may be the sandboxed application 216. Thus, the applications 412 and the paravirtualized OS kernel may be protected from each other using memory segmentation managed by the user-level VMM 408 (i.e., by the unsandbox 214). Additionally, the contents of the user-mode VMM 408, the paravirtualized OS kernel 410, and the applications 412 are protected by the secure enclave 406 from the host applications 404 and the host kernel 402 of the computing device 100.

It should be understood that in some embodiments, the computing device 100 may perform application sandboxing using one or more alternative structures. For example, in some embodiments, each sandboxed application 216 may be included in a separate enclave 406 in a separate host application 404. In those embodiments, rather than a user-level VMM 408 and paravirtualized kernel 410, each secure enclave 406 may include a shim to direct requests to the host kernel 402 through a resource monitor in a separate secure enclave 406. Additionally or alternatively, the functionality of the resource monitor may be distributed across the processes, for example as part of the shim. Including each sandboxed application 216 in a separate secure enclave 406 may increase the number of transitions across enclave boundaries.

Figure 5:
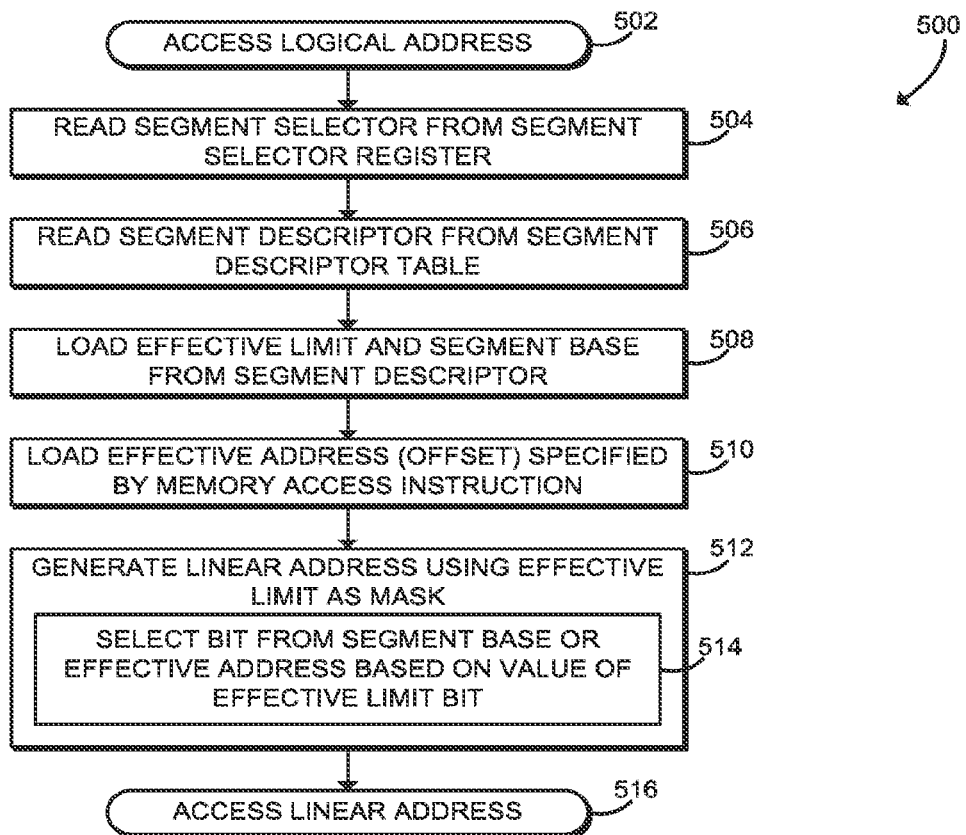
FIG. 5 is a simplified flow diagram of at least one embodiment of a method for low-latency segmentation that may be executed by the computing device of FIGS. 1-2.

Referring now to FIG. 5, in use, the computing device 100 may execute a method 500 for low-latency segmentation. It should be appreciated that, in some embodiments, the operations of the method 500 may be performed by one or more components of the environment 200 of the computing device 100 as shown in FIG. 2. The method 500 begins in block 502, in which the computing device 100 accesses a logical address in the low-latency segmentation mode. As described above, a logical address identifies a particular location in the memory 128 using a segmented memory model. The computing device 100 may access a logical address in response to executing a memory access instruction (e.g., a load, a store, a call, a jump, or a similar instruction) or another instruction that includes a logical address as a parameter. The computing device 100 may access the logical address, for example, while executing a sandboxed application 216 in the low-latency segmentation mode.

In block 504, the processor 120 reads a segment selector from a segment register of the processor 120. The segment register (e.g., CS, SS, DS, ES, FS, GS, or other register) may be determined based on the instruction that generates the logical address access (e.g., based on the instruction semantics or on a segment override prefix). The segment selector may be embodied as, for example, a 16-bit value, a 32-bit value, or other value that may be used to locate a particular segment. In block 506, the processor 120 reads a segment descriptor identified by the segment selector from a segment descriptor table. The particular segment descriptor table may be identified by the segment selector. For example, a bit of the segment selector may identify whether to read from the global description table (GDT) or the local descriptor table (LDT), and a field of the segment selector may include an offset within the descriptor table. Additionally or alternatively, in some embodiments the processor 120 may read the segment descriptor from an extended descriptor table (EDT), as described further below in connection with FIGS. 15 and 16.

In block 508, the processor 120 loads an effective limit and segment base from the segment descriptor. Each of the effective limit and the segment base may be embodied as 32-bit or 64-bit values, based on the operating mode of the processor 120. Thus, the segment descriptor may support storage of the segment base and effective limit, even in 64-bit mode. For example, in code and data descriptors the final word may specify an additional 27 bits for the limit (excluding the 5 bit type field that is required to be zeroed).

Additionally, in some embodiments the processor 120 may cache the effective limit and the segment base to improve performance, for example by storing those values in an inaccessible part of the corresponding segment register. Thus, the processor 120 may only read the segment descriptor when the segment selector changes. In block 510, the processor 120 loads the effective address specified by the memory access instruction. For example, the effective address may be included as an immediate value in the instruction, stored in a register, stored in another memory location, or otherwise specified by the instruction.

In block 512, the processor 120 generates a linear address from the logical address, using the effective limit as a mask. In particular, in block 514 the processor 120 selects a bit from the segment base or the effective address based on the value of a corresponding bit of the effective limit. For example, if a bit of the effective limit is zero, the processor 120 may select the corresponding bit from the segment base, and if the bit of the effective limit is one, the processor 120 may select the corresponding bit from the effective address. The processor 120 may generate the linear address in hardware with low latency by using a bank of hardware multiplexers. By using the effective limit as a mask, the processor 120 may limit linear address accesses to a particular address range. For example, considering a 32-bit memory access, if the most-significant 22 bits of the effective limit are set to zero and the least-significant 10 bits of the effective limit are set to one, the linear addresses may be restricted to a 1024-byte segment.

In block 516, the processor 120 accesses the linear address generated based on the logical address. The processor 120 may access the linear address through paging, for example by using a memory management unit to convert the linear address into a physical address that may be used to address the memory 128. After generating the linear address access, the method 500 is completed. The method 500 may be executed repeatedly by the processor 120 for each logical address access. Thus, the method 500 illustrates one potential embodiment of a low-latency segmentation mode of the processor 120. Compared to a legacy segmentation mode (e.g., the IA-32 segmentation model), the method 500 may avoid introducing a wide adder into the critical linear address computation path. In some embodiments, the processor 120 may employ a different low-latency segmentation mode. For example, in some embodiments the processor 120 may simply check single- or double-ended bounds, without performing address translation (e.g., with the segment base required to be zero).

Figure 6:
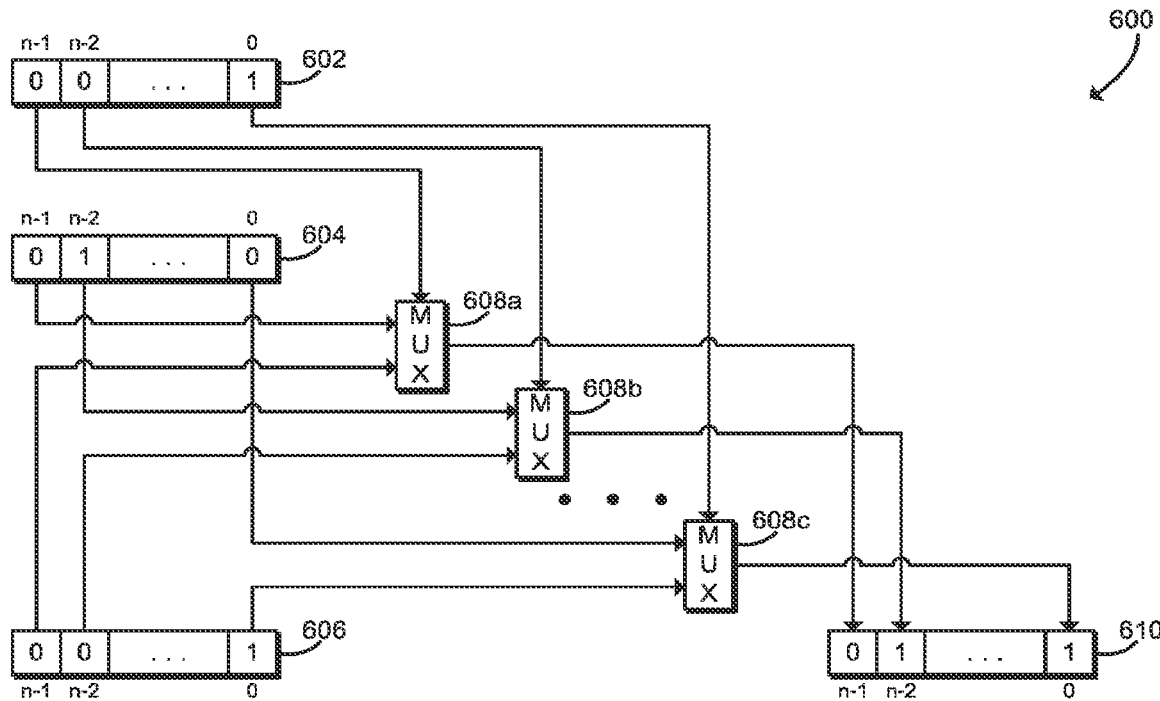
FIG. 6 is a schematic diagram illustrating logical address translation that may be performed during execution of the method of FIG. 5.

The low-latency segmentation mode may be used, for example, as an alternative way to enforce stack limits in both 32-bit and 64-bit modes to improve stack hardening for certain applications. Referring now to FIG. 6, schematic diagram 600 illustrates one potential embodiment of logical address translation that may be performed by the processor 120. The logical address translation may be performed in connection with block 512 of FIG. 5, described above. As described above, a logical address includes an effective address and a segment selector, and the segment selector may be used to determine a segment base and an effective limit. Accordingly, the diagram 600 illustrates an effective limit 602, a segment base 604, and an effective address 606. As shown, each element of the logical address includes n bits, for example 32 bits or 64 bits. Each bit of the effective limit 602 controls a corresponding multiplexer 608, which may be embodied as a hardware element of the processor 120. Each bit of the segment base 604 and the effective address 606 are input to a corresponding multiplexer 608. For example, bits n−1 of the segment base 604 and the effective address 606 are input to the multiplexer 608a, which is controlled by the bit n−1 of the effective limit 602; bits n−2 of the segment base 604 and the effective address 606 are input to the multiplexer 608b, which is controlled by the bit n−2 of the effective limit 602; and so on, up to bits 0 of the segment base 604 and the effective address 606 that are input to the multiplexer 608c, which is controlled by the bit 0 of the effective limit 602. Discarded (non-selected) bits from the effective address may be required to have a particular value to avoid generating an exception. For example, all such bits may be required to have the value 0. The processor 120 may generate an exception if any such bit has a disallowed value.

As shown, the outputs of the multiplexers 610 are combined to form a linear address 612. The values of the bits selected for the linear address 612 thus depend on the values of the corresponding bits of the effective limit 604. In the illustrative example, the bits n−1 and n−2 of the effective limit 604 are zero, causing the bits n−1 and n−2 of the linear address 612 to be selected from the bits n−1 and n−2 of the segment base 606. Further, the bit zero of the effective limit 604 is one, causing the bit zero of the linear address 612 to be selected from the bit zero of the effective address 608.

Figure 7:
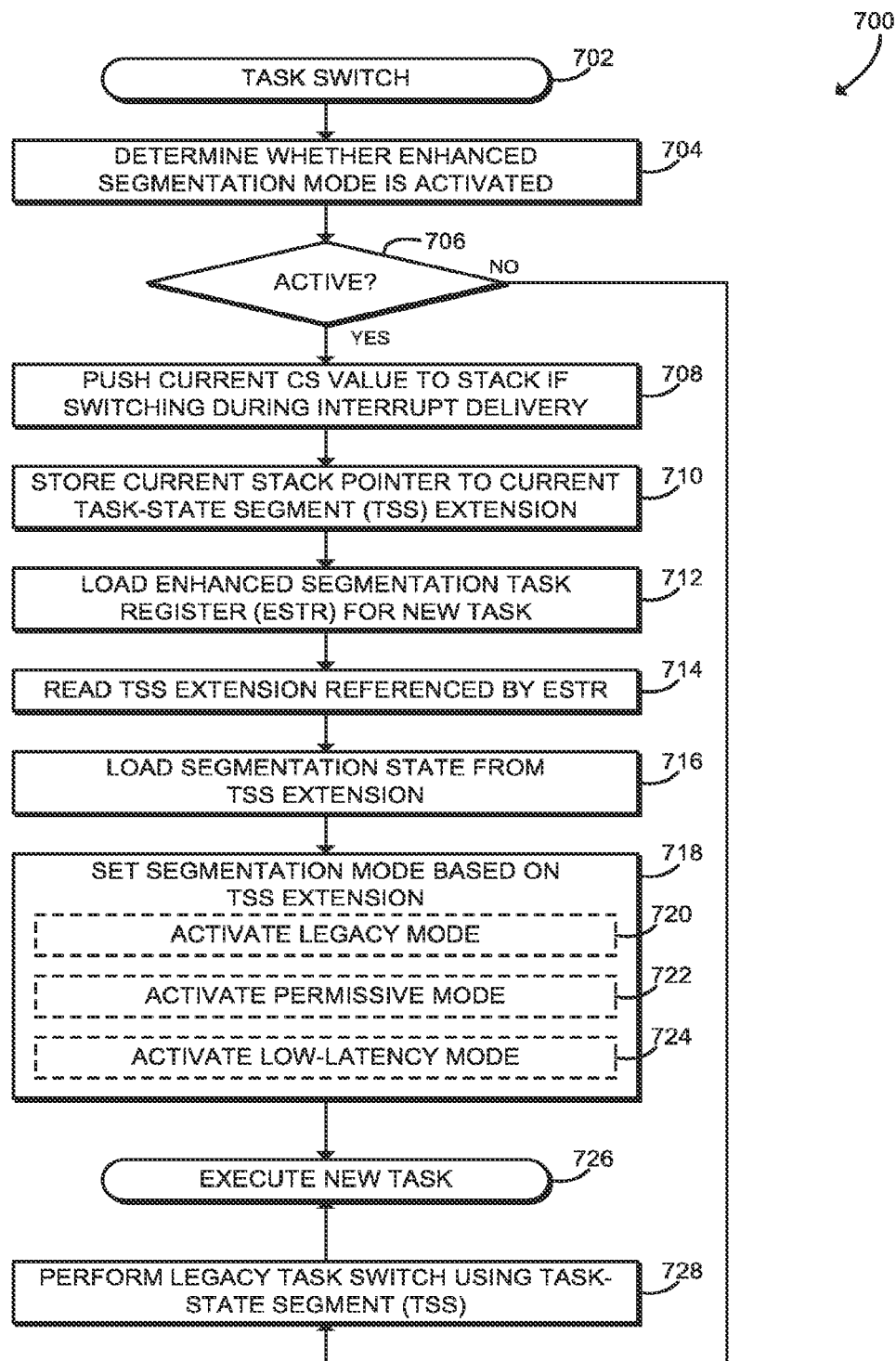
FIG. 7 is a simplified flow diagram of at least one embodiment of a method for task switching that may be executed by the computing device of FIGS. 1-2.

Referring now to FIG. 7, in use, the computing device 100 may execute a method 700 for task switching. It should be appreciated that, in some embodiments, the operations of the method 700 may be performed by one or more components of the environment 200 of the computing device 100 as shown in FIG. 2. The method 700 begins in block 702, in which the computing device 100 initiates a task switch. The computing device 100 may initiate the enhanced task switch in response to executing a change of control flow instruction (e.g., jump, call, return, or similar instruction) or another instruction that identifies a task gate as a parameter. The computing device 100 may initiate the task switch, for example, while entering execution of a sandboxed application 216 from the unsandbox 214, as described above in connection with block 332 of FIG. 3.

In block 704, the processor 120 determines whether enhanced segmentation mode is active. For example, the processor 120 may read one or more model-specific registers of the processor 120 to determine whether enhanced segmentation mode has been enabled. In block 706, the processor 120 checks whether enhanced segmentation mode is active. If not, the method 700 branches to block 730 to perform a legacy task switch, as described further below. If the enhanced segmentation mode is active, the method 700 advances to block 708.

In block 708, the processor 120 pushes the current value of the CS register to the system stack if the task switch occurs during delivery of an interrupt. The task switch may occur, for example, if an entry of an interrupt descriptor table identifies the new task. The CS identifies the current code segment used by the processor 120, and storing the current value on the stack may allow the processor 120 to resume execution after servicing the interrupt. In some embodiments, if a task gate is referenced within the interrupt descriptor table (IDT) so that a TSS extension switch occurs during interrupt delivery, the current CS value must still be placed on the stack. The CS field in the TSS extension may not be updated by the processor 120, unlike the legacy 32-bit TSS. However, the ESP/RSP field in the TSS extension is updated to support re-entrancy into the task (if it is invoked later, that saved stack pointer will be used so that the existing contents of the stack are not overwritten). In those embodiments, the interrupt return instruction (IRET) may be extended to comprehend this extended stack format when enhanced segmentation is enabled and the Nested Task (NT) flag is set, indicating that a task gate was used to deliver the interrupt.

In block 710, the processor 120 stores the current stack pointer (e.g., ESP or RSP) to the task-state segment (TSS) extension for the current task. The current TSS extension may be identified, for example, by a register of the processor 120 such as an enhanced segmentation task register (ESTR). Storing the current stack pointer may allow the task to be re-entered without overwriting the contents of the stack.

In block 712, the processor 120 loads the ESTR with the address of a TSS extension for the new task. The TSS extension may be specified, for example, by the task gate used to invoke the task switch. In block 714, the processor 120 reads the TSS extension referenced by the ESTR. In block 716, the processor 120 loads a segmentation state from the TSS extension referenced by the ESTR. In particular, the processor 120 may load values from the TSS extension into the local descriptor table (LDT) pointer, the SS register, the CS register, the stack pointer register (e.g., ESP or RSP), and the instruction pointer register (e.g., EIP or RIP).

In block 718, the processor 120 sets a segmentation mode for the processor 120 based on the TSS extension. In particular, the processor 120 may read one or more fields of the TSS extension to determine the appropriate segmentation mode. In some embodiments, in block 720 the processor 120 may activate a legacy segmentation mode. The legacy segmentation mode is compatible with certain legacy processors manufactured by Intel Corporation. In particular, for 32-bit memory accesses the legacy mode may perform logical-to-linear address translation with segment limit checking, and for 64-bit memory accesses the legacy segmentation mode may implement a flat, zero-based address space with no limit checking. In some embodiments, in block 722, the processor 120 may activate a permissive segmentation mode. The permissive segmentation mode implements a flat, zero-based address space similar to the legacy segmentation mode for 64-bit memory accesses. The permissive segmentation mode ignores the segment base and does not perform segment limit checking. Thus, processes executing in permissive mode are allowed a full range of memory access to the associated segment. The permissive segmentation mode of the processor 120 may be active in 32-bit or 64-bit address modes. In some embodiments, in block 724, the processor 120 may activate a low-latency segmentation mode. The low-latency segmentation mode may perform logical-to-linear address translation with segment limit checking using the effective limit as a mask. Additionally, the low-latency segmentation mode may deny all memory accesses to a segment with a base and limit pair set to zero. The low-latency segmentation mode is described further above in connection with FIGS. 5 and 6.

In block 726, the computing device 100 executes the new task. As described above in connection with blocks 716, 718, the new task may be executed with a segmentation state and in a segmentation mode specified by the TSS extension. That segmentation state and segmentation mode may enforce isolation of the new task from other entities of the computing device 100. For example, a sandboxed application 216 may be executed in a new task as described above in connection with block 332 of FIG. 3. After switching to the new task, the method 700 is completed. The method 700 may be executed repeatedly in response to the processor 120 switching to new tasks.

Referring back to block 706, if the enhanced segmentation mode is not active, the method 700 branches to block 728, in which the processor 120 performs a legacy task switch using a task-state segment (TSS). The processor 120 may perform a task switch compatible with certain legacy processors manufactured by Intel Corporation. In particular, the processor 120 may not access a TSS extension, and may always execute in legacy segmentation mode (i.e., not in permissive mode or low-latency mode). After performing the legacy task switch, the method 700 advances to block 726, in which the processor 120 executes the new task and the method 700 is completed.

Referring now to FIG. 8, schematic diagram 800 illustrates one potential embodiment of a task state segment (TSS) extension 802. The illustrative TSS extension includes values for the LDT register, the SS register, the CS register, the ESP/RSP register, the EIP/RIP register, and the segmentation mode. All of the values of the TSS extension 802 are static (i.e., pre-configured) except for the ESP/RSP register value, which is dynamic (i.e., stored by the processor 120 in response to an enhanced task switch).

Additionally or alternatively, in some embodiments, the processor 120 may modify its behavior with respect to the task-state segment (TSS). For example, in some embodiments the processor 120 may not save or restore all general-purpose registers when switching tasks. This behavior may be disabled for all or a specified set of registers. That set may be specified, for example, by a global mode register or by a new bit or bitfield in each TSS structure. Legacy TSS switching currently requires that all general-purpose registers be saved and restored when switching tasks. As another example, in some embodiments, the processor 120 may treat EIP and/or some or all of the segment selectors in the TSS as static, rather than saving them when exiting a task. As another example, in some embodiments the task gate descriptor may be extended to permit specifying an entrypoint, allowing the processor 120 to jump to multiple entrypoints in a task. As another example, in some embodiments the I/O port permission bitmap of the TSS may be supplemented with a compact access control list (ACL) that maps from port numbers to a specification of the privilege levels that are allowed to access them. That specification may take the form of a 4-bit map or a threshold, for example. As another example, in some embodiments, the stack segments and stack pointers for the supervisory ring levels 0-2 or for some subset of those levels may be factored out of each TSS to a shared data structure or set of MSRs, which may be more space-efficient for multi-task systems where those values are the same for every task.

Referring now to FIG. 9, in use, the computing device 100 may execute a method 900 for call gate execution with privilege checking. It should be appreciated that, in some embodiments, the operations of the method 900 may be performed by one or more components of the environment 200 of the computing device 100 as shown in FIG. 2. The method 900 begins in block 902, in which the computing device 100 executes a call gate. The computing device 100 may execute the call gate in response to executing a change of control flow instruction (e.g., a jump, a call, a return, or other similar instruction) or another instruction that identifies the call gate as a parameter. The computing device 100 may initiate the call gate, for example, from privileged code such as a host operating system kernel or from unprivileged code such as an unsandbox 214 or sandboxed application 216.

In block 904, the processor 120 determines whether the process sandbox mode is enabled. The processor 120 may, for example, read one or more model-specific registers of the processor 120. In block 906, the processor 120 checks whether sandbox mode is enabled. If not, the method 900 branches to block 920, described below. If the process sandbox mode is enabled, the method 900 advances to block 908.

In block 908, the processor 120 determines whether the destination segment of the call gate is in the local descriptor table (LDT). For example, the processor 120 may check a bit of the segment selector to determine whether the segment descriptor is included in the LDT. In block 910, the processor 120 checks whether the destination segment is in the LDT. If not (e.g., if the destination segment is in the global descriptor table), the method 900 branches to block 920, described below. If the descriptor is included in the LDT, the method 900 advances to block 912.

In block 912, the processor 120 compares the descriptor privilege level (DPL) of the destination segment to the current privilege level (CPL). The privilege level, also called ring level, indicates the relative privilege level of a particular segment. The privilege level may vary from zero (the most privileged, typically used by a host operating system kernel) to three (the least privileged, typically used by user-level application code). The DPL may be included in a field of the segment descriptor associated with the destination segment. The CPL represents the privilege level of the currently-executing code segment and may be included in a hidden field of the CS register.

In block 914 the processor 120 determines whether DPL is less than CPL. If so, the method 900 branches to block 916, in which the processor 120 generates a fault (e.g., a general protection fault or other exception). By generating the fault, the processor 120 may prevent less-privileged code from invoking a call gate from the LDT to more-privileged code. Accordingly, a user-level process may be allowed to modify entries in its own LDT. If the user-level process, for example as a result of a programming error or an attempted exploit, modifies the LDT to add a call gate to privileged code, the processor 120 generates a fault in response to an attempt to execute that call gate. Because the processor 120 does not perform such fault checking for call gates included in the GDT, privileged software should maintain control over GDT entries. Thus, by performing that permission check, the computing device 100 may safely allow unprivileged software (e.g., the unsandbox 214) to manage segmentation of other unprivileged software (e.g., the sandboxed application 216) using the LDT. Referring back to block 914, if DPL is not less than CPL, the method 900 advances to block 918, in which the processor 120 allows the call gate to the destination segment. After generating the fault or allowing the destination segment, the method 900 is completed.

Referring back to blocks 906, 910, if the process sandbox mode is not enabled or if the destination segment is not in the LDT, the method 900 branches to block 920. In block 920, the processor 120 performs a legacy call gate permission check. After performing the legacy call gate permission check, the method 900 is completed.

Figure 10:
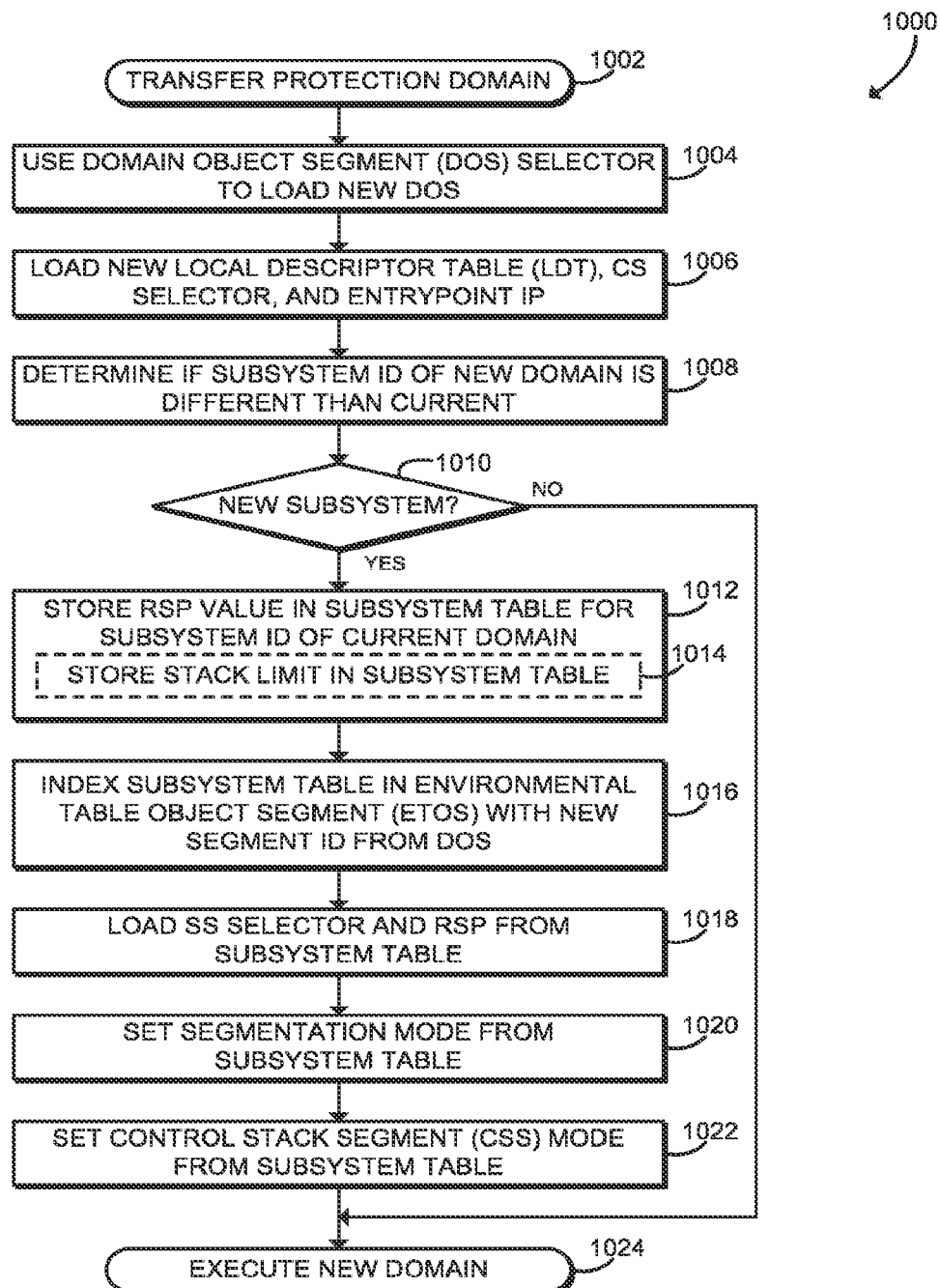
FIG. 10 is a simplified flow diagram of at least one embodiment of a method for transferring between protection domains that may be executed by the computing device of FIGS. 1-2.

Referring now to FIG. 10, in use, the computing device 100 may execute a method 1000 for transferring between protection domains. It should be appreciated that, in some embodiments, the operations of the method 1000 may be performed by one or more components of the environment 200 of the computing device 100 as shown in FIG. 2. The method 1000 begins in block 1002, in which the computing device 100 transfers to a new protection domain. A protection domain represents a unit of code and data that may be used by multiple software threads. Thus, each protection domain may represent a process such as a sandboxed application 216, a part of a process such as a function, or other unit of code. The computing device 100 may transfer to a new protection domain in response to executing a change of control flow instruction (e.g., a jump, a call, a return, or other similar instruction) or another instruction that identifies the protection domain (or an associated domain object segment) as a parameter. The computing device 100 may transfer protection domains in addition to and/or instead of performing enhanced task switching with a TSS extension as described above in connection with FIGS. 7 and 8.

Figures 11, 12:
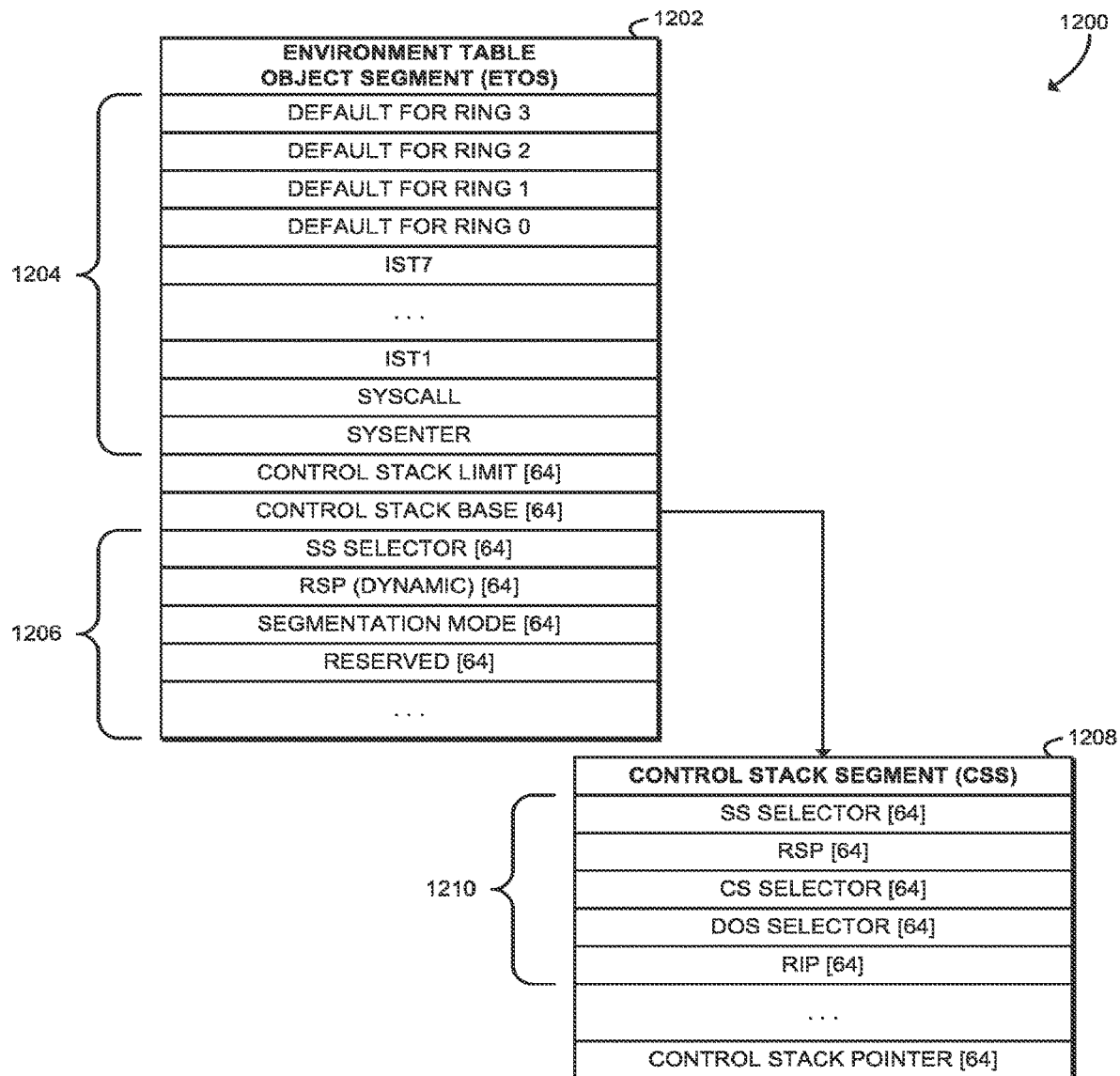
FIG. 11 is a schematic diagram of a domain object selector that may be accessed during execution of the method of FIG. 10.
FIG. 12 is a schematic diagram of various data segments that may be accessed during execution of the method of FIG. 10.

In block 1004, the processor 120 uses a domain object segment (DOS) selector to load a new DOS for the new protection domain. Referring now to FIG. 11, diagram 1100 illustrates one potential embodiment of a DOS 1102. As shown, the DOS 1102 includes 64-bit values for each of an LDT selector, a CS selector, a subsystem ID, and an entry-point instruction pointer (IP). Referring back to FIG. 10, in block 1006, the processor 120 loads new values for the local descriptor table (LDT), CS register, and entrypoint IP (i.e., a new value for RIP) from the DOS. In block 1008, the processor 120 determines whether the subsystem ID of the new domain is different from the subsystem ID of the current protection domain. In block 1010, the processor 120 checks whether the new domain has a new subsystem ID. If not, the method 1000 branches ahead to block 1024, described below. If the new protection domain has a new subsystem ID, the method 1000 advances to block 1012.

In block 1012, the processor 120 stores the current stack pointer value (RSP) into a subsystem table entry for the subsystem ID of the current protection domain. As described further below, the computing device 100 may establish an environment table object segment (ETOS) in the memory 128. The ETOS may include, among other data items, a subsystem table that includes entries for each subsystem ID in use by the computing device 100. Storing the RSP value in the subsystem table may allow multiple protection domains in the same subsystem to share the same system stack, and for the subsystem to be reentrant. In some embodiments, in block 1014, the processor 120 may also store a stack limit in the subsystem table. The stack limit may support limited sharing of a single stack to prevent callees from performing unauthorized accesses into direct and indirect callers' stack frames. The limit specified on the control stack would be the limit in the SS register at the time that control stack entry was created. It would be restored into SS when subsequently performing a return using that control stack entry. The limit specified on the subsystem table would be updated when switching away from that subsystem by storing the current value of the stack pointer. To pass parameters on the stack, the caller domain may walk ESP back to a point above the parameters before calling another domain. The SS requested privilege level could be set to the current privilege level during task entry to permit stack sharing across privilege levels.

In block 1016, the processor 120 indexes the subsystem table in the ETOS with the new segment ID from the DOS. The processor 120 reads an entry from the subsystem table. Each entry in the subsystem table may include values for the SS selector, RSP, and segmentation mode for a subsystem. The values for the SS selector and the segmentation mode may be static, and the values for RSP may be dynamic (i.e., stored by the processor 120 as described above in connection with block 1012). In block 1018, the processor 120 loads values for the SS register and the RSP register from the subsystem table entry for the new protection domain. In block 1020, the processor 120 sets the segmentation mode for the processor 120 based on the value included in the subsystem table entry. As described above in connection with block 718 of FIG. 7, the segmentation mode may be set to the legacy segmentation mode, the permissive segmentation mode, or the low-latency segmentation mode.

In block 1022, the processor 120 sets a control stack segment (CSS) mode of the processor 120 based on a value from the subsystem table entry. As described further below in connection with FIGS. 12-14, the CSS mode may allow tracking authorized return points and verifying changes in control flow executed by the processor 120. The CSS mode may allow the processor 120 to protect against certain return-oriented programming (ROP) attacks.

In block 1024, the processor 120 executes the new protection domain. The processor 120 may begin execution at the instruction pointer (IP) address in the code segment identified by the DOS, using the stack pointer and stack segment identified in the subsystem table. After executing the new protection domain, the method 1000 is completed. The method 1000 may be executed by the processor 120 repeatedly, for example when transferring between processes, functions, or other units of code.

Referring now to FIG. 12, diagram 1200 illustrates an environment table object segment (ETOS) 1202 that may be used by the processor 120. The ETOS 1202 may be embodied as a segment of the memory 128. As shown, the ETOS 1202 includes multiple special DOS selectors 1204, which each identify a particular domain object segment. The ETOS 1202 further includes a subsystem table 1206. Each entry of the subsystem table 1206 includes a SS selector, a dynamic RSP value, a segmentation mode, and 64 reserved bytes for alignment purposes.

As shown, the ETOS 1202 also includes a control stack base selector and a control stack limit. The control stack base selector points to a control stack segment (CSS) 1208. The CSS 1208 may be embodied as a segment of the memory 128, and includes a control stack 1210 and a control stack pointer. Each entry of the control stack 1210 includes an SS selector, an RSP value, a CS selector, a DOS selector, and an RIP value. As described further below in connection with FIGS. 13 and 14, the control stack 1210 may be used to prevent certain return-oriented programming attacks.

Figure 13:
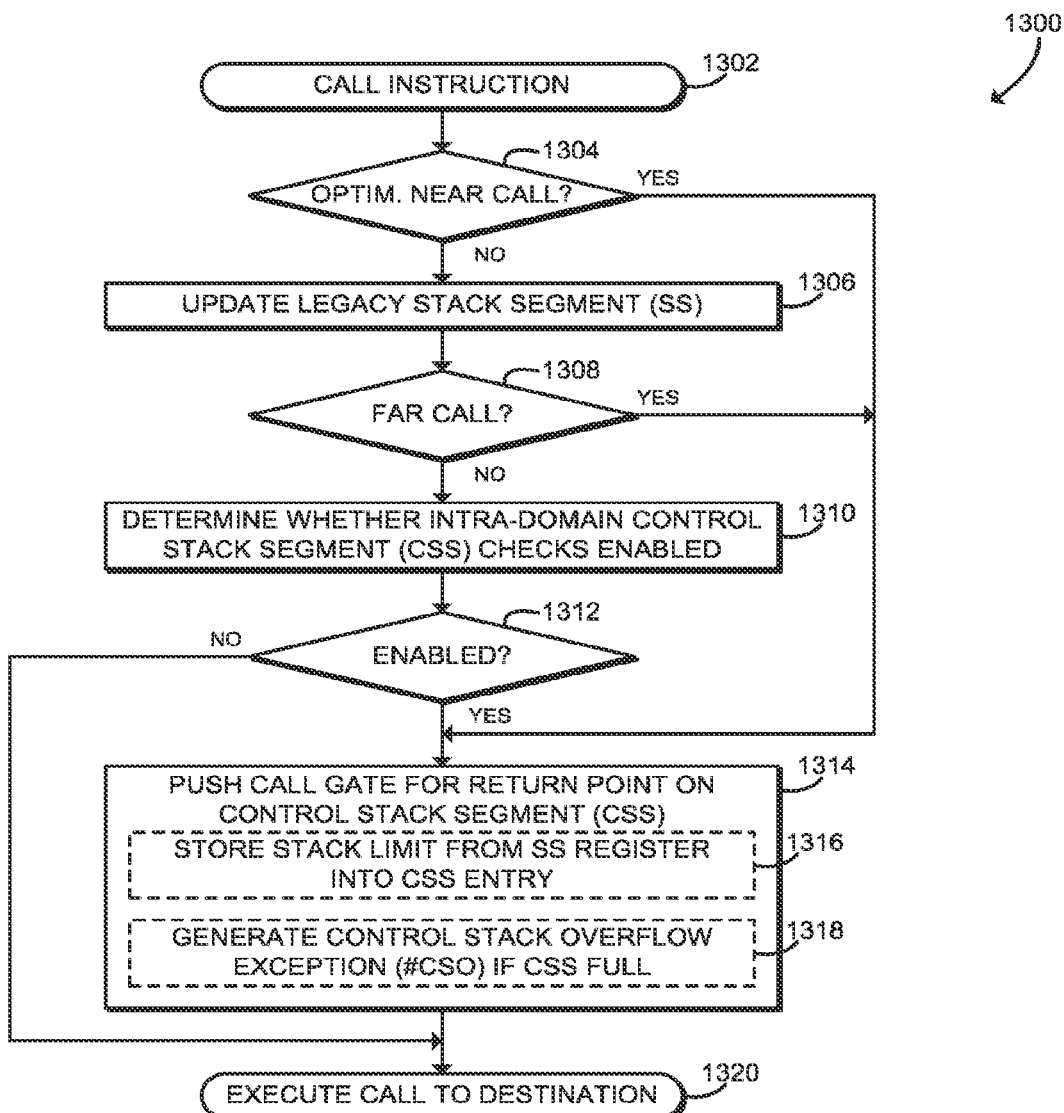
FIG. 13 is a simplified flow diagram of at least one embodiment of a method for executing a call with call stack segment checking that may be executed by the computing device of FIGS. 1-2.

Referring now to FIG. 13, in use, the computing device 100 may execute a method 1300 for executing a call with call segment stack checking. It should be appreciated that, in some embodiments, the operations of the method 1300 may be performed by one or more components of the environment 200 of the computing device 100 as shown in FIG. 2. The method 1300 begins in block 1302, in which the computing device 100 executes a call instruction to a destination address. The computing device 100 may execute a legacy call instruction, an optimized call instruction, or any other change of control flow instruction with call semantics. The destination may be in the same protection domain as the call instruction (a near call) or in a different protection domain (a far call).

In block 1304, the processor 120 determines whether an optimized near call instruction has been executed. If so, the method 1300 branches ahead to block 1314, described below. If an optimized near call has not been executed, for example if a legacy call instruction has been executed, then the method 1300 advances to block 1306. In block 1306, the processor 120 updates the legacy stack segment (SS). The processor 120 may, for example, push a return address onto the legacy stack identified by the SS register and update the corresponding stack pointer RSP.

In block 1308, the processor 120 determines whether a far call has been executed. The processor 120 may determine, for example, whether the destination of the call instruction is within a different protection domain. If a far call has been executed, the method 1300 branches ahead to block 1314, described below. If a far call has not been executed (e.g., a legacy near call has been executed), then the method 1300 advances to block 1310.

In block 1310, the processor 120 determines whether intra-domain control stack segment (CSS) checking has been enabled. The particular CSS checking mode may be specified in the active subsystem table entry in the environmental table object segment (ETOS). For example, each subsystem table entry may include a field CSSMODE that may specify that the control stack is used only for inter-domain transfers or that the control stack is also used for intra-domain transfers and checked against the legacy stack. In some embodiments, the CSSMODE field may also specify that the control stack alone is used for intra-domain transfers and that the legacy stack is not used. In block 1312, the processor 120 checks whether intra-domain CSS checking has been enabled. If not, the method 1300 branches to block 1320, in which the processor 120 executes the call instruction to the destination address. If intra-domain CSS checking has been enabled, the method 1300 advances to block 1314.

In block 1314, the processor 120 pushes a call gate for the return address from the current call instruction on to the control stack segment (CSS). The call gate may allow the processor 120 to properly return to the instruction following the current call instruction and/or allow the processor 120 to validate the return address on the legacy stack. The call gate may include the SS selector, RSP, CS selector, DOS selector, and RIP for the return address. In some embodiments, in block 1316, the processor 120 may also store a stack limit from the SS register into the CSS entry. The stack limit may be stored, for example, in a hidden part of the SS register. In some embodiments, in block 1318 the processor 120 may generate a control stack overflow exception (#CSO) if the CSS is full. The processor 120 may determine whether the CSS is full by comparing a control stack pointer to a control stack limit included in the ETOS. The processor 120 may generate the #CSO exception if there is only enough space left in the CSS for the #CSO interrupt record itself.

In block 1320, the processor 120 executes the call to the destination address. The processor 120 may transfer to a new protection domain, as described above in connection with FIGS. 10-12. After executing the call, the method 1300 is completed. The processor 120 may execute the method 1300 repeatedly in response to further call instructions.

Figure 14:
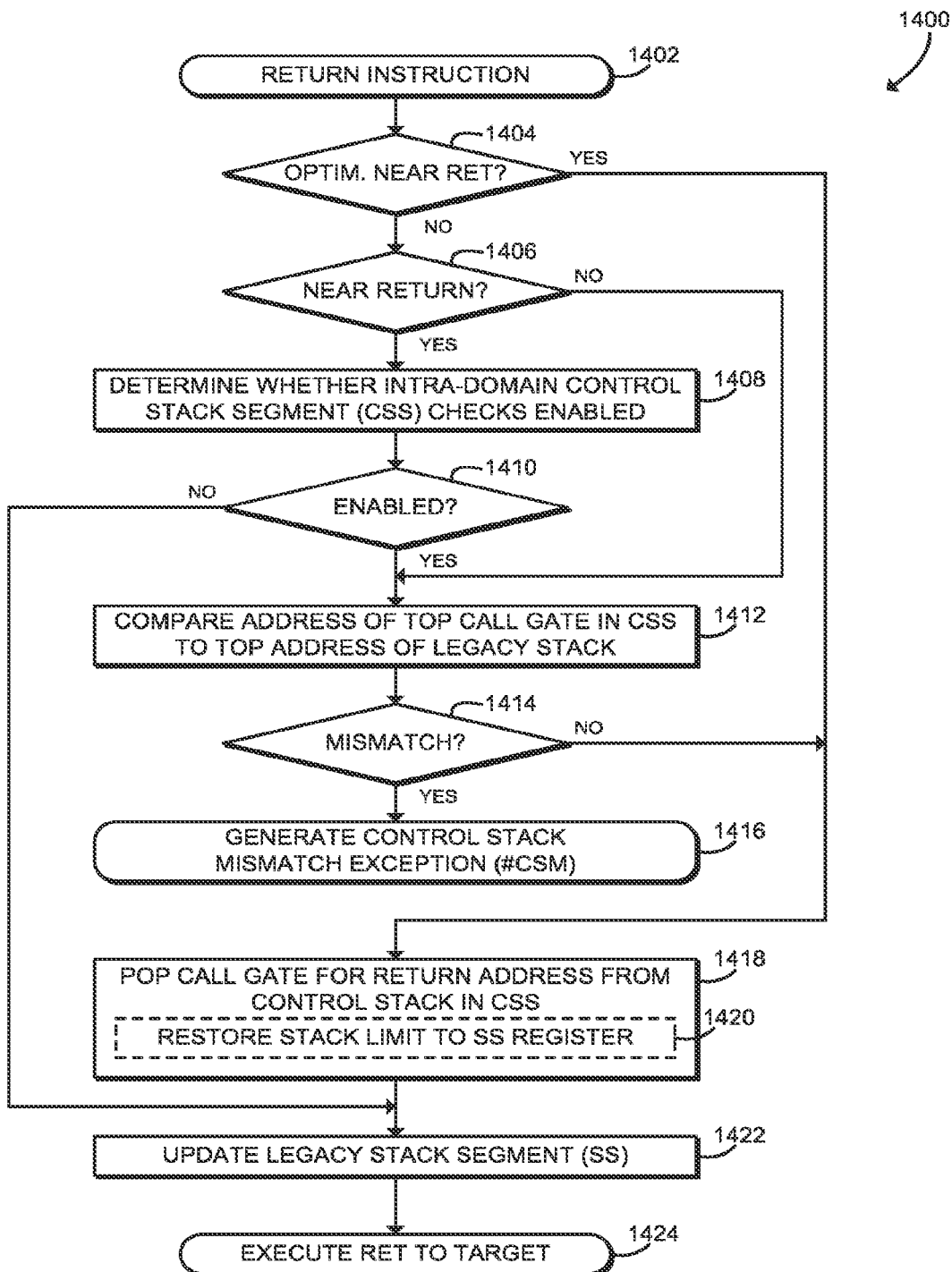
FIG. 14 is a simplified flow diagram of at least one embodiment of a method for executing a return with call stack segment checking that may be executed by the computing device of FIGS. 1-2.

Referring now to FIG. 14, in use, the computing device 100 may execute a method 1400 for executing a return with call segment stack checking. It should be appreciated that, in some embodiments, the operations of the method 1400 may be performed by one or more components of the environment 200 of the computing device 100 as shown in FIG. 2. The method 1400 begins in block 1402, in which the computing device 100 executes a return instruction to a return address. The computing device 100 may execute a legacy return instruction, an optimized return instruction, or any other change of control flow instruction with return semantics. The destination may be in the same protection domain as the return instruction (a near return) or in a different protection domain (a far return).

In block 1404, the processor 120 determines whether an optimized near return has been executed. If so, the method 1400 branches ahead to block 1418, described below. If an optimized near return has not been executed, for example if a legacy return instruction has been executed, the method 1400 advances to block 1406. In block 1406, the processor 120 determines whether a near return has been executed. The processor 120 may determine, for example, whether the return address is within the same protection domain as the return instruction. If a near return has not been executed (e.g., a legacy far return has been executed), the method 1400 branches head to block 1412, described below. If a near return has been executed, the method 1400 advances to block 1408.

In block 1408, the processor 120 determines whether intra-domain control stack segment (CSS) checking has been enabled. As described above, the particular CSS checking mode may be specified in the active subsystem table entry in the environmental table object segment (ETOS). For example, each subsystem table entry may include a field CSSMODE that may specify that the control stack is used only for inter-domain transfers or that the control stack is also used for intra-domain transfers and checked against the legacy stack. In some embodiments, the CSSMODE field may also specify that the control stack alone is used for intra-domain transfers and that the legacy stack is not used. In block 1410, the processor 120 checks whether intra-domain CSS checking has been enabled. If not, the method 1400 branches to block 1422, in which the processor 120 executes the return instruction to the return address as described further below. If intra-domain CSS checking has been enabled, the method 1400 advances to block 1412.

In block 1412, the processor 120 compares the address of the top call gate in the CSS to the top return address of the legacy stack. As described above in connection with FIG. 13, the processor 120 pushes the same return address to the control stack in the CSS and to the legacy stack. A mismatch could indicate that return-oriented programming (ROP) exploit has been attempted. In block 1414, the processor 120 determines whether a mismatch exists between the return addresses of the control stack in the CSS and the legacy stack. If not, the method 1400 branches to block 1418, described below. If a mismatch exists, the method 1400 advances to block 1416.

In block 1416, the processor 120 generates a control stack mismatch exception (#CSM). A service routine that handles the #CSM exception may determine whether the mismatch is benign or if the mismatch results from an attempted ROP attack. In response to a malicious attack, the computing device 100 may perform a security response such as reporting the violation, terminating the process, or other policy-based response. Thus, after generating the control stack mismatch, the method 1400 may be completed. In response to a benign violation, the service routine may re-attempt the faulting return instruction or otherwise restart execution.

In block 1418, the processor 120 pops the top call gate for the return address from the control stack in the CSS. The processor 120 may also, for example, update a control stack pointer in the CSS. In some embodiments, in block 1420 the processor 120 may restore the stack limit stored in the control stack to the SS register.

In block 1422, the processor 120 updates the legacy stack segment SS. The processor 120 may read a legacy return address from the top of the stack and may also update the legacy stack pointer RSP. In block 1424, the processor 120 executes the return to the target return address. The processor 120 may, for example, jump to the return address popped from the legacy stack or to the return address identified in the call gate popped from the control stack. The processor 120 may also transition to a new protection domain as described above in connection with FIGS. 10-12. After executing the return, the method 1400 is completed. The processor 120 may execute the method 1400 repeatedly in response to further return instructions.

Although illustrated as used in connection with protection domains, the control stack and subsystem techniques of FIGS. 12-14 may be used even if task-state segment (TSS) switching is still in use rather than the ETOS/DOS approach described above. Each control stack entry may comprise the TSS selector, the caller stack limit, and the caller EIP. Each subsystem table entry may comprise the stack segment selector and the stack limit.

Additionally or alternatively, SYSCALL and SYSENTER may be handled specially. The processor 120 performs a far call through the SYSCALL or SYSENTER descriptor referred to by the appropriate field in the current ETOS. The processor 120 may only push a stack frame on the control stack, not the legacy stack. The processor 120 may place the current value of RFLAGS into R11 and then clear RFLAGS.IF and RFLAGS.VM. In those embodiments, SYSRET and SYSEXIT behave like IRET, except that they only pull data from the control stack and they retrieve RFLAGS from R11.

Figure 15:
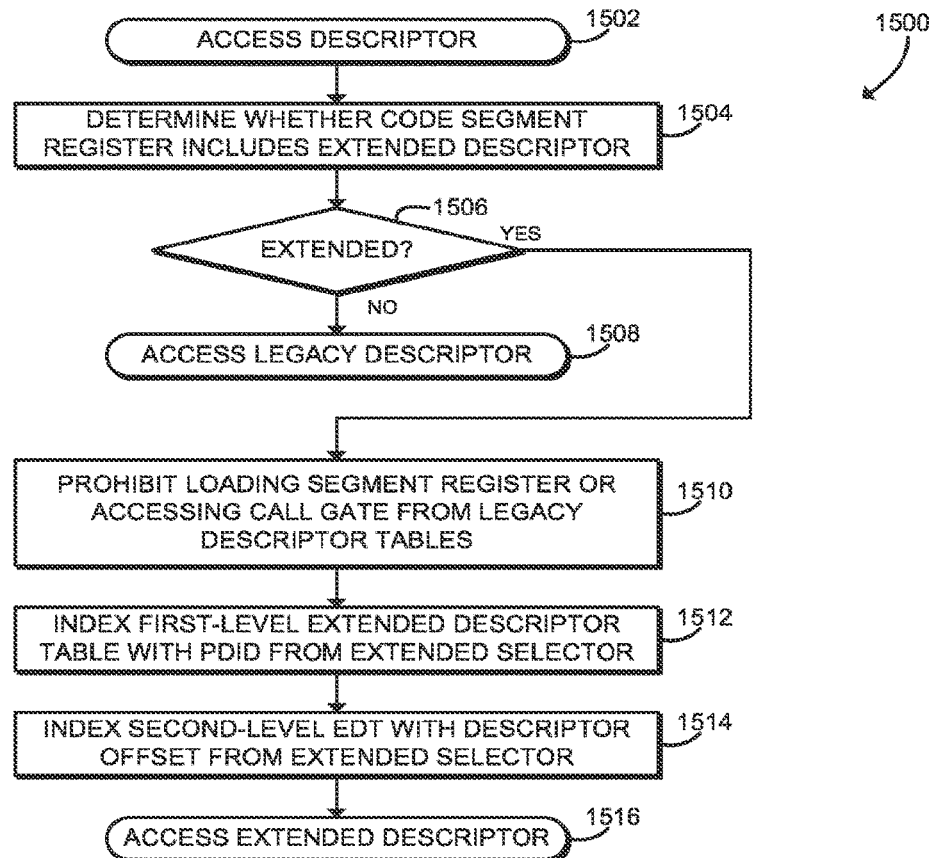
FIG. 15 is a simplified flow diagram of at least one embodiment of a method for accessing an extended descriptor that may be executed by the computing device of FIGS. 1-2.

Referring now to FIG. 15, in use, the computing device 100 may execute a method 1500 for accessing an extended descriptor. It should be appreciated that, in some embodiments, the operations of the method 1500 may be performed by one or more components of the environment 200 of the computing device 100 as shown in FIG. 2. The method 1500 begins in block 1502, in which the computing device 100 accesses a descriptor. The computing device 100 may access a descriptor whenever accessing or otherwise referencing a segment, for example when loading a segment register or when processing a logical address.

In block 1504, the processor 120 determines whether the code segment register CS includes a selector for an extended descriptor. The register CS may include a selector for an extended descriptor, for example, when the processor 120 is executing in sandbox mode. A legacy selector may be embodied as a 16-bit value including an offset that may be used to index a descriptor table such as the global descriptor table (GDT) or a local descriptor table (LDT). A selector for an extended descriptor may be embodied as a larger value (e.g., a 32-bit value) and may include a field indicating that the selector refers to an extended descriptor. The selector may illustratively include a 15-bit protection domain identifier (PDID) and an offset for a specific entry in an extended descriptor table (EDT). In block 1506, the processor 120 checks whether the CS register includes a selector for an extended descriptor. If not, the method 1500 advances to block 1508, in which the processor 120 accesses a legacy descriptor, for example in the LDT or GDT. After accessing the legacy descriptor, the method 1500 is completed.

Referring back to block 1506, if the CS register includes a selector for an extended descriptor, the method 1500 branches to block 1510. In block 1510, the processor 120 prohibits loading a segment register or accessing a call gate from any legacy descriptor table (e.g., the GDT, an LDT, or an interrupt descriptor table). In block 1512, the processor 120 indexes a first-level extended descriptor table (EDT) with the PDID from the extended selector. The processor 120 may access a first-level associated with the current processor privilege level (ring level). The indexed entry in the first-level EDT may identify a second-level EDT for the associated protection domain. The indexed entry in the first-level EDT may also identify additional data, such as protection key register (PKR) values that may be associated with different protection domains. The PKR value in a first-level EDT entry may be loaded into the PKR when that first-level EDT entry is used to enter the corresponding protection domain.

In block 1514, the processor 120 indexes the second-level EDT with a descriptor offset from the extended selector. In block 1516, the processor 120 accesses the extended descriptor from the second-level EDT. In some embodiments, the extended descriptor may be limited to one of two types of descriptors: call gate descriptors and memory bounds descriptors. After accessing the extended descriptor, the method 1500 is completed. Thus, the EDT may sandbox software by only allowing it to use descriptors specifically allocated to it by the unsandbox 214 through the EDT or in segment registers that are preloaded at the time of the transition into the sandboxed application 216. The only ways to exit the sandboxed application 216 may be through legacy interrupts, usermode interrupts, or through an EDT call gate that references a legacy segment descriptor. It may also be necessary to shadow and attest to EDT contents when they are used with SGX enclaves so that the enclave can maintain control over them.

Figure 16:
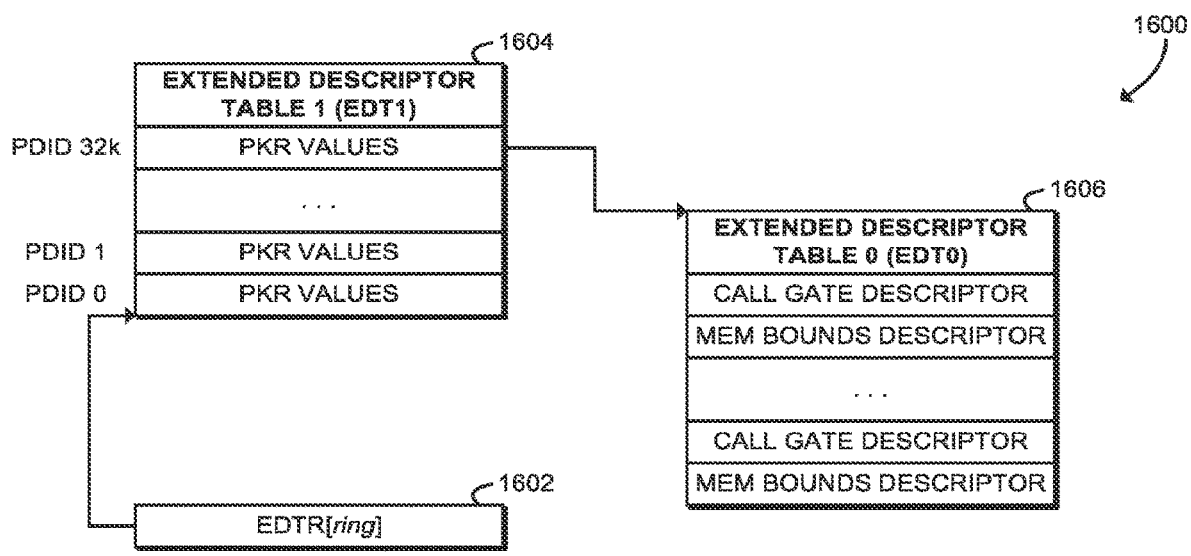
FIG. 16 is a schematic diagram illustrating extended descriptor tables that may be accessed during execution of the method of FIG. 15.

Referring now to FIG. 16, diagram 1600 illustrates one potential embodiment of an extended descriptor table (EDT). A set of extended descriptor table registers EDTR 1602 includes pointers for first-level EDTs for each ringlevel of the processor. As shown, the value of EDTR[ring] 1602 for the current ring level points to a first-level extended descriptor table 1604, labeled EDT1. As shown, EDT1 may be indexed by a 15-bit PDID, allowing up to 32 k entries. Each entry may include protection key register (PKR) values associated with the corresponding protection domain. As shown, an entry in EDT1 points to a second-level extended descriptor table 1606, labeled EDT0. EDT0 includes the extended descriptors, which are illustratively call gate descriptors or memory bounds descriptors only.

Referring back to FIG. 2, as described above, the computing device 100 establishes an environment 200 during operation that includes a sandbox manager 206 and a software isolation manager 212. In some embodiments, the software isolation manager 212 may be configured to execute the unsandbox 214 in a privilege level of the processor 120 (e.g., in the user privilege level or the supervisor level) and to enable, by the unsandbox 214, a sandbox mode of the processor 120. Enabling the sandbox mode may include setting a sandbox flag of the processor 120. The software isolation manager 212 is further configured to execute the sandboxed application 216 in the sandbox mode and in the same privilege level as the unsandbox 214. The software isolation manager 212 may be further configured to execute, by the unsandbox 214, a dispatch handler in the same privilege level in response to a dispatch of a sandbox exception, as described further below. The software isolation manager 212 may be configured to execute a dispatch return instruction (DISPRET) after handling the dispatch of the sandbox exception.

In some embodiments, the sandbox manager 206 may be configured to generate a sandbox exception in response to executing the sandboxed application 216 and to dispatch the sandbox exception to the sandbox exception handler of the unsandbox 214. The sandbox manager 206 is further configured to resume execution of the sandboxed application 216 in the sandbox mode and in the same privilege level in response to executing the user mode interrupt return instruction.

In some embodiments, the software isolation manager 212 may be further configured to configure, by the unsandbox 214, one or more range registers that are each linked to a segment register of the processor 120. In those embodiments, dispatching the sandbox exception may include dispatching a segment range sandbox violation in response to determining that a linear address of a memory access is not within the memory bounds defined by the associated range register. The software isolation manager 212 may be further configured to load a host kernel in a supervisor privilege level of the processor and to load, by the host kernel, a host application in the user privilege level. The software isolation manager 212 may be further configured to load a secure enclave in the host application using the secure enclave support 122 of the processor 120. The software isolation manager 212 may be further configured to load, by the host application, a user-level virtual machine monitor that includes the unsandbox 214 and to load, by the user-level virtual machine monitor, a user-level paravirtualized kernel that includes the sandboxed application 216.

Figure 17:
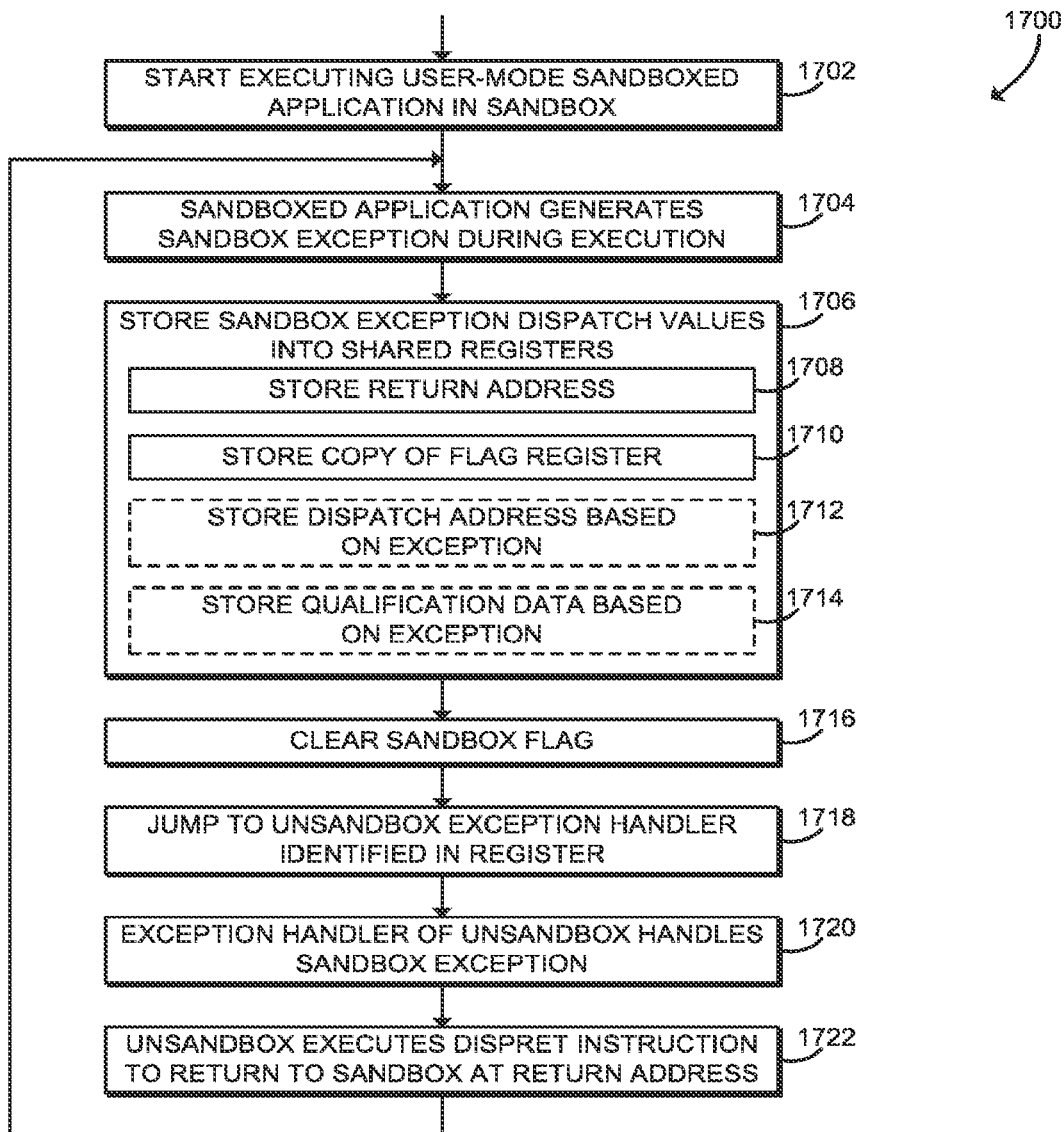
FIG. 17 is a simplified flow diagram of at least one embodiment of a method for executing a sandboxed application that may be executed by the computing device of FIGS. 1-2.

Referring now to FIG. 17, in use, the computing device 100 may execute a method 1700 for executing a sandboxed application. It should be appreciated that, in some embodiments, the operations of the method 1700 may be performed by one or more components of the environment 200 of the computing device 100 as shown in FIG. 2. The method 1700 begins in block 1702, in which the computing device 100 starts executing a user-mode sandboxed application 216 in a sandbox. The computing device 100 may, for example, enable a sandbox mode of the processor 120 using the unsandbox 214 and then begin executing the sandboxed application 216 in the sandbox mode. The unsandbox 214 may enable the sandbox mode by enabling one or more control registers established by the processor 120. For example, the unsandbox 214 may set a global sandboxing enable flag such as a SANDBOX_EN flag of the CR4 configuration register, as well as a mode-specific enable flag such as a SANDBOX flag of a user-level SAND-BOX_CTL_U register. One potential embodiment of sandbox control registers that may be established by the processor 120 is described below in connection with FIG. 18.

In block 1704, the sandboxed application 216 generates a sandbox exception during execution. The sandbox exception may be embodied as any violation, trap, error, or other exceptional circumstance generated by the sandboxed application 216 that may be handled by the unsandbox 214. For example, the sandbox exception may be a segment-linked range register (SLRR) bound violation as described further below in connection with FIGS. 19-20, a process or thread switch exception as described further below in connection with FIG. 21, a shadow stack mismatch violation as described further below in connection with FIGS. 22-24, a system call exception as described further below in connection with FIG. 25, or any other exceptional circumstance.

In block 1706, in response to the sandbox exception, the processor 120 stores sandbox exception dispatch values into a set of shared registers of the processor 120. The sandbox dispatch registers of the processor may be managed similarly to, for example, VT-x VMCS exit information fields used for VMExits to a root virtual machine monitor (VMM). In block 1708, the processor 120 stores a return address pointing to a location within the sandboxed application 216. As described further below, after handling the sandbox exception, the computing device 100 may resume executing the sandboxed application 216 at the return address. In block 1710, the processor 120 stores a copy of a flags register of the processor 120. For example, the processor 120 may store a copy of the RFLAGS register. The flags register may be restored when resuming execution of the sandboxed application 216. In some embodiments, in block 1712 the processor 120 may store a dispatch address based on the particular sandbox exception that was generated. In some embodiments, in block 1714 the processor 120 may store qualification data based on the particular sandbox exception that was generated. The semantics of the dispatch address and/or the qualification data depends on the particular sandbox exception that was generated. One potential embodiment of shared sandbox dispatch registers that may be established by the processor 120 is described below in connection with FIG. 18.

In block 1716, the processor 120 clears the sandbox flag of a control register of the processor 120. For example, the processor 120 may automatically clear the SANDBOX flag of the user-level SANDBOX_CTL_U register. Clearing the sandbox flag disables the sandbox mode and, for example, may disable SLRR bounds checking. In block 1718, the processor 120 jumps to an exception handler in the unsandbox 214. The particular address of the exception handler may be identified by a configuration register of the processor 120 associated with the particular sandbox exception that was generated. The processor 120 may perform a near jump to the exception handler; that is, the processor 120 may jump to the exception handler without modifying the segmentation state (or task state) of the processor 120.

In block 1720, the exception handler of the unsandbox 214 handles the sandbox exception. The unsandbox 214 executes with the sandbox mode disabled, and thus may be capable of configuring sandbox control registers or otherwise managing the sandboxed application 216. Thus, the unsandbox 214 may perform any appropriate management, policy, security, or other actions in response to the sandbox exception. For example, the unsandbox 214 may update configuration registers or otherwise correct the conditions that caused the sandbox exception, perform an operation requested by the sandboxed application 216, perform a security operation or other policy-based action, or perform other exception handling operations. Particular examples of sandbox exceptions and exception handlers are described further below in connection with FIGS. 19-25.

In block 1722, after handling the sandbox exception, the unsandbox 214 executes a dispatch return (DISPRET) instruction to return to the sandboxed application 216 at the stored return address. The DISPRET instruction may set the sandbox flag, restore the flag register of the processor 120, jump to the stored return address, and perform any other appropriate operations to resume execution of the sandboxed application 216. After resuming execution of the sandboxed application 216, the method 1700 loops back to block 1704 to handle further sandbox exceptions. Additionally, although illustrated as returning to the sandboxed application 216, it should be understood that in some embodiments the unsandbox 214 may terminate the sandboxed application 216 in response to the sandbox exception, thereby ending the method 1700.

Additionally, although illustrated as executing the unsandbox 214 and the sandboxed application 216 in the user privilege level of the processor 120, it should be understood that in some embodiments the unsandbox 214 and the sandboxed application 216 may execute in the supervisor privilege mode of the processor 120. To support user and supervisor mode sandboxing, the processor 120 may provide a set of sandbox configuration registers for each of the user and the supervisor mode. Supervisor mode sandboxing may not be inherently impervious to breaches, since supervisor mode software can access many namespaces over which the sandbox exerts no control. For example, sandboxed supervisor mode software could manipulate paging to arbitrarily redirect memory accesses. However, the sandboxing support of the computing device 100 may make breaching a sandbox more difficult or complicated and may limit the effects of programming errors or exploits in supervisor mode software in certain usages.

Figure 18:
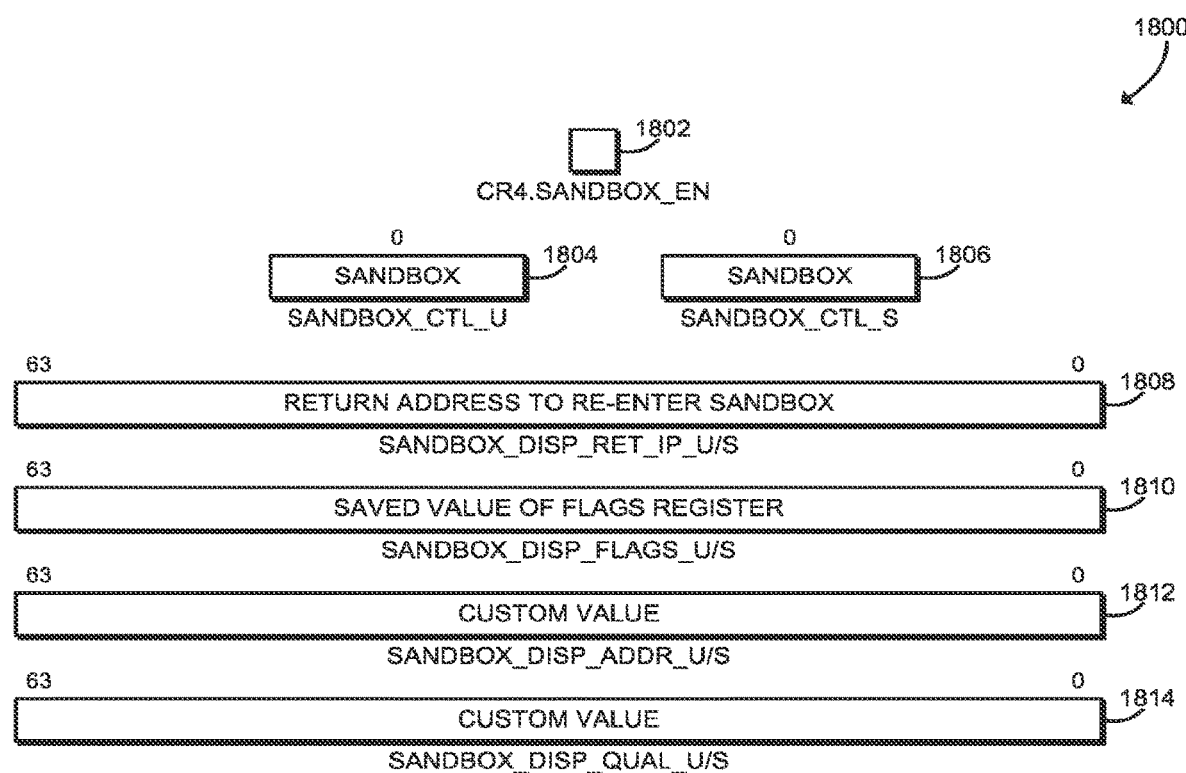
FIG. 18 is a schematic diagram illustrating sandbox configuration registers that may be established by the computing device of FIGS. 1-2.

Referring now to FIG. 18, diagram 1800 illustrates one potential embodiment of sandbox configuration registers that may be established by the processor 120. As shown in the diagram 1800, the processor 120 illustratively establishes a CR4.SANDBOX_EN flag 1802 of the configuration register CR4. The CR4.SANDBOX_EN flag 1802 is a global override flag that determines whether sandbox mode may be enabled by the processor 120. CR4 is automatically managed during transitions to and from VMX-root mode and SMM. The processor 120 also establishes a SANDBOX flag of a SANDBOX_CTL_U register 1804 and a SANDBOX flag of the SANDBOX_CTL_S register 1806. The SANDBOX flags of the registers 1804, 1806 enable sandbox mode for user-mode code and supervisor-mode code, respectively. Sandboxed software is not allowed to access any configuration registers for sandboxed features or the sandboxing framework itself. Whatever enhanced monitoring is defined by sandboxed features is temporarily disabled in the unsandbox (e.g., when the SANDBOX flag is disabled). As shown, the processor 120 also establishes four additional registers 1808 to 1814. Each of the registers 1808 to 1814 is a 64-bit value, and there is a set of registers 1808 to 1814 for each of the user mode and the supervisor mode. The SANDBOX_DISP_RET_IP_U/S register 1808 includes a return address within the sandboxed application 216 that may be used to re-enter the sandboxed application 216. The SANDBOX_DISP_FLAGS_U/S register 1810 includes the saved value of the processor 120 flags register (e.g., the RFLAGS register). The SANDBOX_DISP_ADDR_U/S register 1812 and the SANDBOX_DISP_QUAL_U/S register 1814 include a dispatch address and dispatch qualification data, respectively. The particular data stored in the registers 1812, 1814 depends on the particular sandbox exception that is being dispatched. Alternately, separate, non-shared registers could be defined for each type of information provided to exception handlers.

The set of supervisor mode registers may be configured using MSRs, and the set of user mode registers may be configured with a user-mode instruction set architecture. For example, the user mode registers may be configured with a user mode-accessible ISA analogous to RDMSR/WRMSR. Because user mode software is able to configure these new features without intervention from supervisor mode, a relying party can verify that proper sandboxing is being enforced within an SGX enclave based on an attestation of the enclave. As described further below, the sandbox configuration may be saved and restored using the XSAVE feature. Support for the sandboxing framework and each sandboxed feature may be enumerated using the CPUID instruction.

Figure 19:
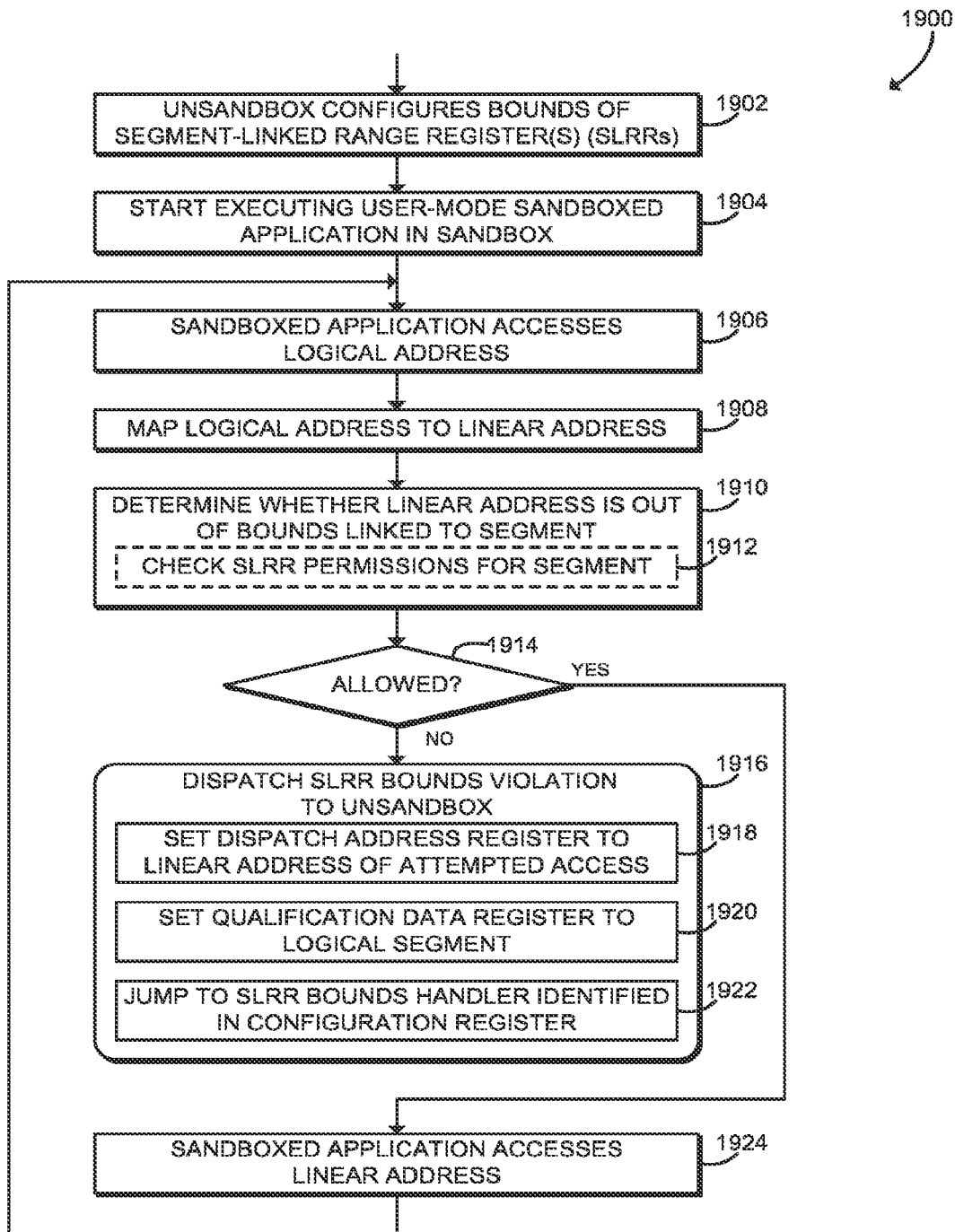
FIG. 19 is a simplified flow diagram of at least one embodiment of a method for enforcing segment-linked memory bounds that may be executed by the computing device of FIGS. 1-2.

Referring now to FIG. 19, in use, the computing device 100 may execute a method 1900 for enforcing segment-linked memory bounds. The SLRR framework described in FIG. 19 is built on generic sandboxing framework described above in connection with FIGS. 17-18, and may provide low-latency bounds-checking support in both 32-bit and 64-bit mode, low-overhead bounds updates, and acceptable energy efficiency. It should be appreciated that, in some embodiments, the operations of the method 1900 may be performed by one or more components of the environment 200 of the computing device 100 as shown in FIG. 2. The method 1900 begins in block 1902, in which the unsandbox 214 of the computing device 100 configures memory bounds defined by one or more segment-linked range registers (SLRRs) of the processor 120. Each SLRR is associated with a segment register of the processor 120 (e.g., CS, SS, DS, etc.) and defines a contiguous range of linear addresses that are allowed to be accessed by the sandboxed application 216 through the corresponding logical segment. Each SLRR may also be associated with read and/or write permissions, and in some embodiments may be enabled or disabled. In some embodiments, there may be one SLRR linked to each segment register; however; in other embodiments one or more SLRRs may be assigned to each segment register. One potential embodiment of SLRRs is described below in connection with FIG. 20. In block 1904, the computing device 100 starts executing the user-mode sandboxed application 216 in the sandbox. As described above in connection with block 1702 of FIG. 17, the unsandbox 214 may enable the sandbox mode and then start execution of the sandboxed application 216.

In block 1906, the sandboxed application 216 accesses a logical address in the memory 128. The logical address is associated with a segment register of the processor 120 (e.g., CS, SS, DS, etc.). The logical address may include a segment selector (stored in the associated segment register), an effective address (offset), and an effective limit. The processor 120 may access the logical address in a 32-bit mode or a 64-bit mode. In block 1908, the processor 120 maps the logical address to a linear address in the memory 128. The linear address is a virtual address in a flat (linear) memory space, and may be embodied as a 32-bit or a 64-bit address. The processor 120 may perform a legacy mapping of the logical address to the linear address; for example, in 64-bit mode the segment base may be zero and the effective limit may not be checked.

In block 1910, the processor 120 determines whether the linear address is out of bounds established by an SLRR linked to the segment register of the logical address. For example, if the logical address is linked to the CS register, the processor 120 may check the linear address against bounds established by an SLRR_CS register, if the logical address is linked to the SS register, the processor 120 may check the linear address against bounds established by an SLRR_SS register, and so on. Each SLRR may include fields to establish an upper and a lower bound, and the processor 120 may determine whether the linear address is out of bounds by performing comparisons against those fields. In some embodiments, in block 1912, the processor 120 may also check whether access is allowed by permissions associated with the SLRR. For example, a separate configuration register SLRR_CFG may define read and write permissions for each segment register. The processor 120 may also be configured to only allow execute (instruction fetch) access to the code segment (i.e., the CS register) and to deny execute access for logical addresses associated with other segment registers.

In block 1914, the processor 120 checks whether the linear address is allowed. If so (e.g., if in-bounds and allowed by the appropriate permissions), the method 1900 branches ahead to block 1924, described below. If the linear address is not allowed (i.e., if the address is out-of-bounds or not allowed by the appropriate permissions), the method 1900 advances to block 1916.

In block 1916, the processor 120 dispatches an SLRR bounds violation to a bounds violation handler of the unsandbox 214. The processor 120 dispatches the violation using the sandbox exception dispatch method described above in connection with FIGS. 17-18. In block 1918, the processor 120 sets the dispatch address register (e.g., SANDBOX_DISP_ADDR_U) to the linear address of the attempted access. In block 1920, the processor 120 sets the dispatch qualification data register to identify the segment register of the logical address (e.g., CS, SS, DS, etc.). In block 1922, the processor 120 jumps to an SLRR bounds handler in the unsandbox 214 that is identified in a configuration register of the processor 120 (e.g., SLRR_BNDV_IP). After jumping to the SLRR bounds handler, the unsandbox 214 may handle the bounds violation by, for example, adjusting the SLRR bounds linked to the segment register, modifying the logical address or other data structures, servicing a request associated with the linear address, or otherwise processing the exception. In some embodiments, the unsandbox 214 may report a potential security violation, terminate the sandboxed application 216, or perform another security response. As another example, in some embodiments the unsandbox 214 may support discontinuous memory ranges (similar to paging) by updating the appropriate SLRR to cover the needed range. After the unsandbox 214 exception handler completes processing, the computing device 100 resumes executing the sandboxed application 216, as described above.

In block 1924, the sandboxed application 216 of the computing device 100 accesses the linear address in the memory 128. The linear address is thus accessed after it is determined to be within the bounds established by the corresponding SLRR (or after the SLRR bounds have been adjusted by the exception handler). Thus, the computing device 100 may enforce memory isolation between the sandboxed application 216 and other processes of the computing device 100 in an efficient manner, without requiring the processor 120 to change between modes or privilege levels. After accessing the linear address, the method 1900 loops back to block 1906, in which the sandboxed application 216 may access additional logical addresses.

Figure 20:
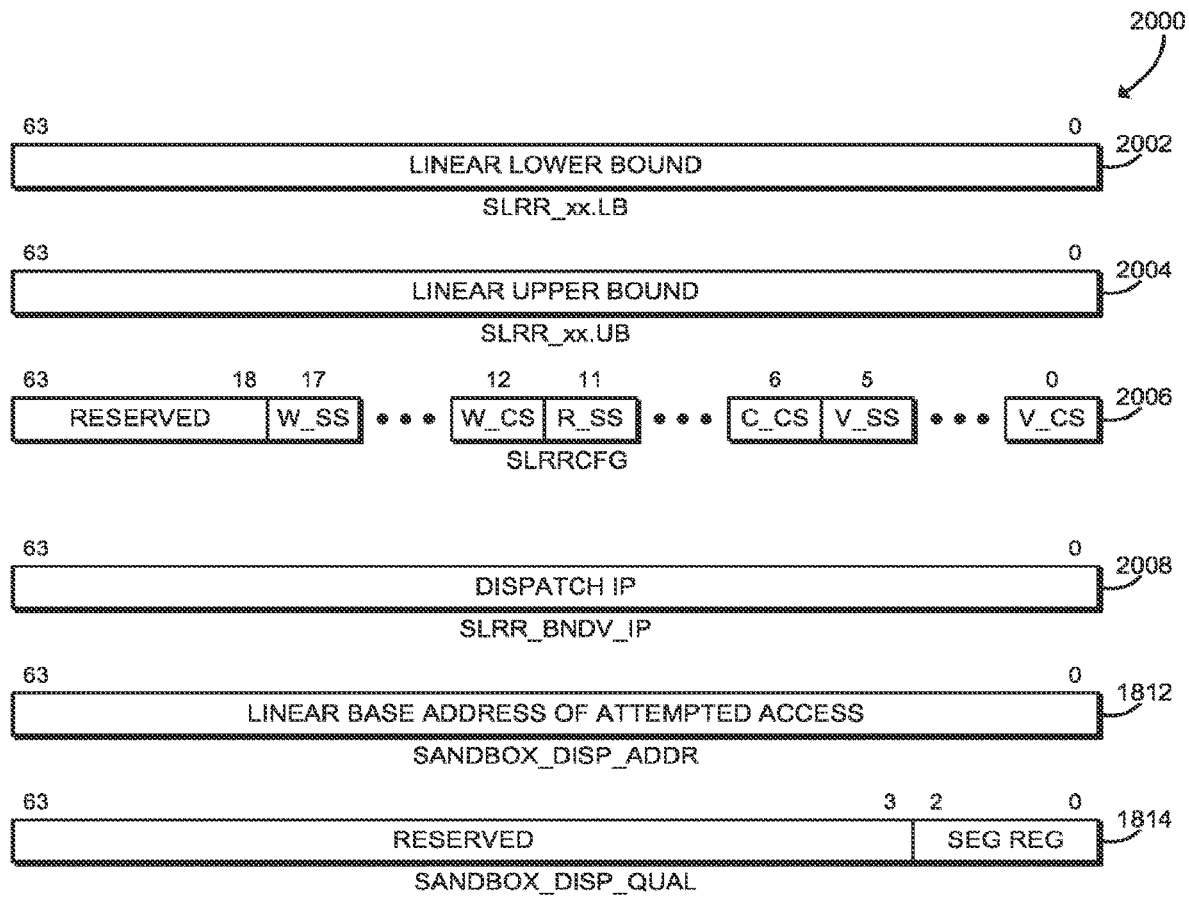
FIG. 20 is a schematic diagram illustrating segment-linked range registers and associated configuration registers that may be established by the computing device of FIGS. 1-2.

Referring now to FIG. 20, diagram 2000 illustrates one potential embodiment of segment-linked range registers (SLRRs) that may be established by the processor 120. A single SLRR includes an SLRR_xx.LB lower bound field 2002 and an SLRR_xx.UB upper bound field 2004. Each of the lower bound and upper bound fields 2002, 2004 include a 64-bit linear address that establishes the lower bound and upper bound, respectively, of a contiguous range of linear addresses that may be accessed through the corresponding segment register. Each segment register may be associated with a specific SLRR. For example, CS may be associated with SLRR_CS.LB and SLRR_CS.UB, SS may be associated with SLRR_SS.LB and SLRR_SS.UB, and so on. The processor 120 may also establish a 64-bit SLRRCFG register 2006, which may be used to configure permissions for each segment register. The SLRRCFG register 2006 may include a write enable bit for each segment register (e.g., W_SS, W_CS, etc.) and a read enable bit for each segment register (e.g., R_SS, R_CS, etc.). The SLRRCFG register 2006 may not include execute-enable bits because code may only be executed through the CS register. The SLRRCFG register 2006 may also include a valid bit for each segment register (e.g., V_SS, V_CS, etc.), which may determine whether SLRR checking is performed for that segment register. As shown, the processor 120 also establishes a SLRR_BNDV_IP register 2008, which may include the 64-bit linear address of the bounds violation exception handler in the unsandbox 214. As shown, during exception dispatch the linear base address of the attempted access is stored in the SANDBOX_DISP_ADDR register 1812 and an identifier of the segment register is stored in the lower 3 bits of the SANDBOX_DISP_QUAL register 1814. The consolidated SLRRCFG register may support efficient bulk updates of the SLRRs enable status and permissions. The processor 120 may also define a new bit (SLRR_EN) in CR4 that can override the valid bits in SLRRCFG to disable SLRR checking when SLRR_EN is cleared.

Thus, to transition from the sandboxed application 216 to the unsandbox 214 using SLRR bound checking, the sandboxed application 216 may intentionally attempt to access code or data outside the bounds of the SLRRs. That access will generate an SLRR bounds violation to the unsandbox 214. The effect of this is logically similar to the effect of performing a SYSCALL instruction to transition from user mode to supervisor mode. Alternately, a new or existing instruction such as SYSCALL may be defined to invoke the unsandbox when executed in sandbox mode.

Figure 21:
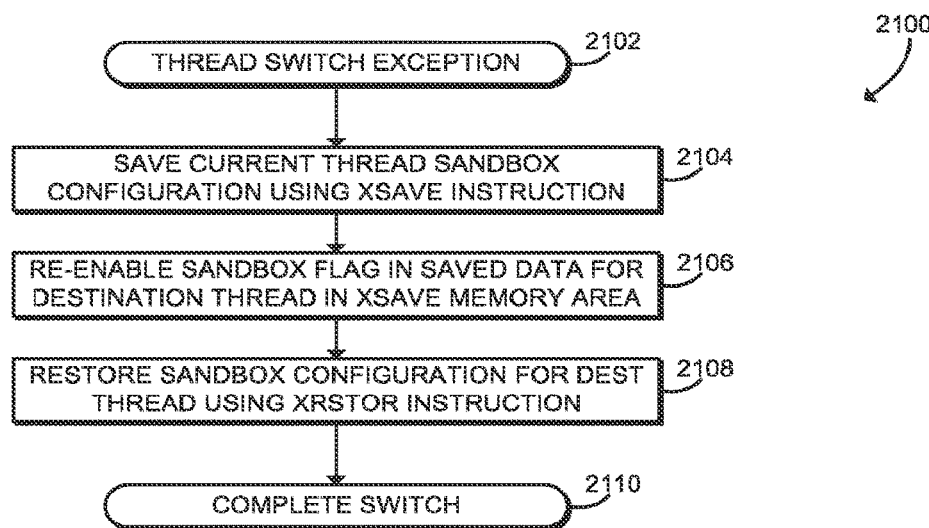
FIG. 21 is a simplified flow diagram of at least one embodiment of a method for switching between threads that may be executed by the computing device of FIGS. 1-2.

Referring now to FIG. 21, in use, the computing device 100 may execute a method 2100 for switching between threads. It should be appreciated that, in some embodiments, the operations of the method 2100 may be performed by one or more components of the environment 200 of the computing device 100 as shown in FIG. 2. The method 2100 begins in block 2102, in which the processor 120 of the computing device 100 dispatches a thread switch exception to the unsandbox 214. The thread switch exception may be generated in response to any request to switch threads or processors or in response to any other thread switching event. For example, the sandboxed application 216 may intentionally access a predetermined memory location that is outside the bounds of the SLRRs in order to cause the exception to be dispatched to the unsandbox 214. The computing device 100 executes an appropriate thread switch handler of the unsandbox 214 with the sandbox mode disabled. The unsandbox 214 may identify the current thread as well as a destination thread that will be switched to.

In block 2104, the computing device 100 saves the current thread sandbox configuration by executing the XSAVE instruction. The XSAVE instruction saves a large amount of processor 120 state into an XSAVE area in the memory 128. The XSAVE instruction may save, for example, sandbox configuration registers such as CR4.SANDBOX_EN, SANDBOX_CTL_U, SANDBOX_DISP_RET_IP_U, and SANDBOX_DISP_FLAGS_U, as well as other processor 120 state such as floating point register state, MMX register state, or other register state.

In block 2106, the computing device 100 re-enables the sandbox flag (e.g., SANDBOX_CTL_U.SANDBOX) in the saved data in the XSAVE memory area for the destination thread. Because the sandbox state data for the destination thread was saved during execution of the unsandbox 214 as described above in connection with block 2104, the sandbox flag as stored in the XSAVE memory area is cleared. In block 2108, the computing device 100 restores the sandbox configuration for the destination thread by executing the XRSTOR instruction. The XRSTOR instruction loads the saved state data from the XSAVE memory area into the appropriate registers of the processor 120. Because the sandbox flag was enabled as described above in connection with block 2106, the sandbox configuration is restored into the enabled state. In block 2110, the computing device 100 completes the switch to the destination thread. In particular, the computing device 100 starts executing the destination thread in the sandbox mode.

Figure 22:
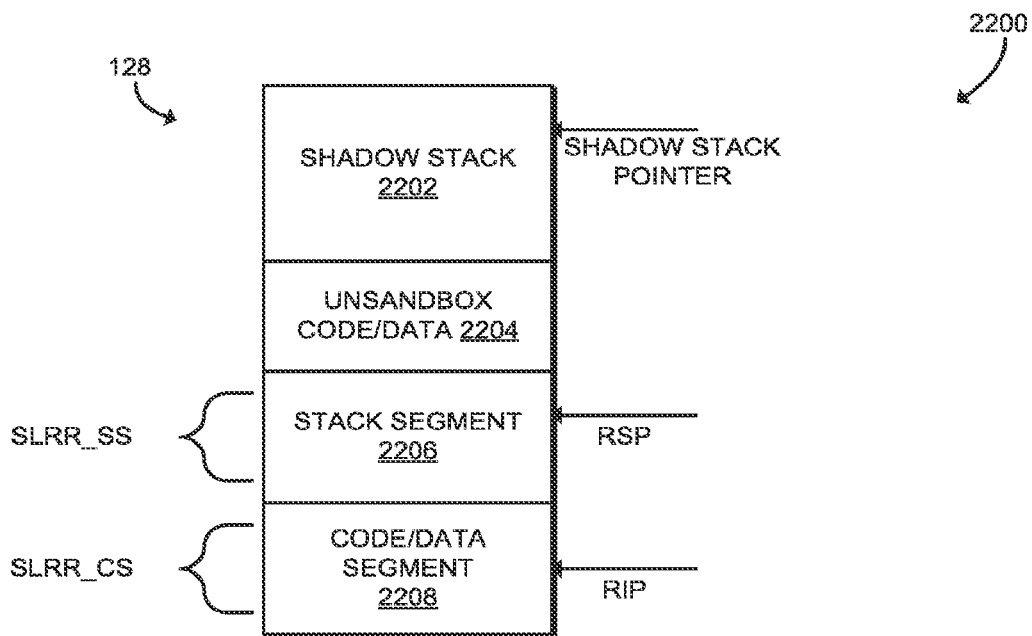
FIG. 22 is a schematic diagram illustrating a memory layout that may be established by the computing device of FIGS. 1-2.

Referring now to FIG. 22, diagram 2200 illustrates one potential embodiment of a memory layout for shadow stack support that may be provided by the computing device 100.

As described above, a shadow stack may provide protection against return-oriented programming (ROP) exploits and other potential malware. The diagram 2200 shows that the memory 128 of the computing device 100 may be divided into a shadow stack 2202, an unsandbox code/data range 2204, a stack segment 2206, and a code/data segment 2208. The computing device 100 further establishes an SLRR_SS register that defines valid memory bounds in the stack segment 2206 and a SLRR_CS register that defines valid memory bounds in the code/data segment 2208. All other SLRRs may be configured to cover some or all of the same range as SLRR_CS. Alternately, SLRR_CS may just cover executable code within the code/data segment 2208, and other SLRRs (besides SLRR_SS) may cover all or a subset of the code/data segment 2208. The sandboxed application 216 may execute within the code/data segment 2208 (e.g., referencing the RIP register) and use the stack segment 2206 (e.g., referencing the RSP register) and thus may be limited to accessing memory within the bounds defined by SLRR_CS and SLRR_SS. As shown in FIG. 22, the shadow stack 2202 is outside of the bounds of any SLRR and thus may not be accessed by software executing in the sandbox mode. Rather, the processor 120 may directly update the shadow stack 2202 in response to near call instructions and near return instructions, as described further below. Accesses to the shadow stack 2202 by the processor 120 do not check the SLRRs. Similarly, the unsandbox 214 executes with sandbox mode disabled and thus the SLRRs are also not checked. Accordingly, the unsandbox 214 may access the unsandbox code/data range 2204 as well as the shadow stack 2202. The unsandbox 214 thus may manage, analyze, or otherwise process the contents of the shadow stack 2202, for example by executing "ROP detector" software to identify and mitigate return-oriented programming attacks. Shadow stack checking may be enabled and otherwise controlled by the unsandbox 214 using one or more control registers as described below in connection with FIG. 24.

Figure 23:
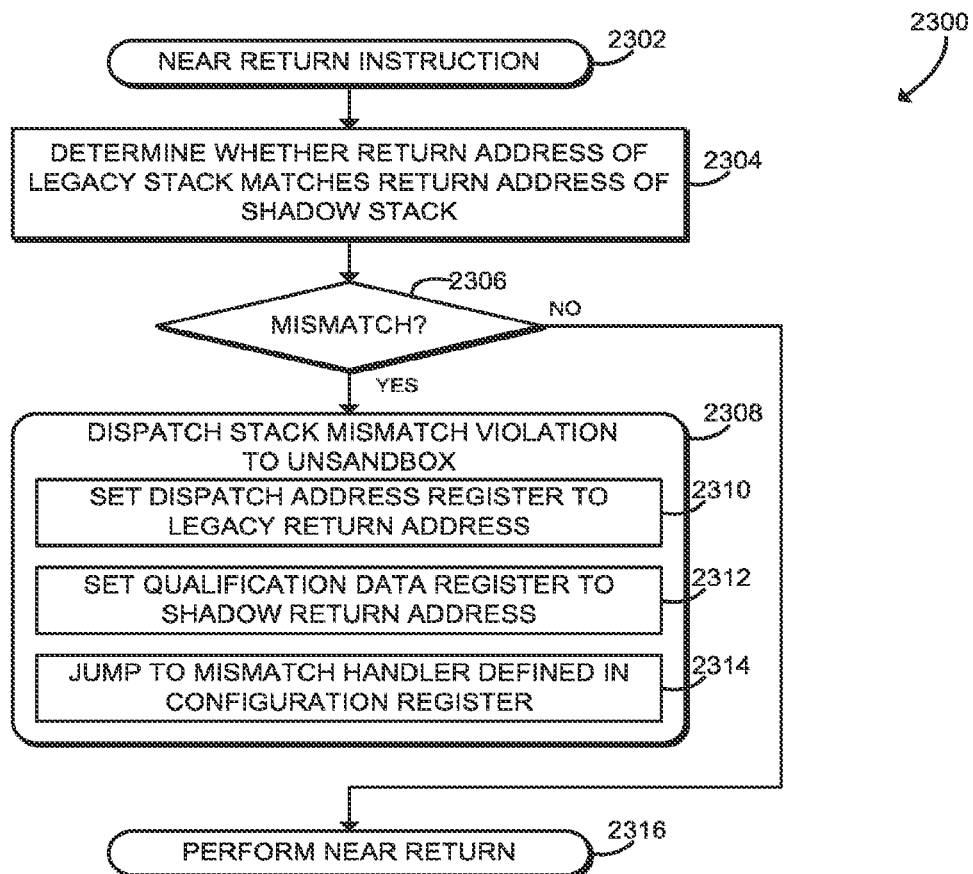
FIG. 23 is a simplified flow diagram of at least one embodiment of a method for executing a near return instruction that may be executed by the computing device of FIGS. 1-2.

Referring now to FIG. 23, in use, the computing device 100 may execute a method 2300 for executing a near return instruction. It should be appreciated that, in some embodiments, the operations of the method 2300 may be performed by one or more components of the environment 200 of the computing device 100 as shown in FIG. 2. The method 2300 begins in block 2302, in which the processor 120 of the computing device 100 executes a near return instruction with the sandbox mode enabled and with shadow stack checking enabled. A near return instruction performs a return to a return address in the same code segment as the return instruction, without requiring the processor 120 to change modes.

In block 2304, the processor 120 determines whether the return address on the top of the legacy stack matches the top return address of the shadow stack. The legacy stack is included in the SS segment and is pointed to by the processor 120 stack pointer (e.g., RSP). As described above in connection with FIG. 22, the shadow stack is included in the memory 128 outside of any valid bounds defined by an SLRR. The top of the shadow stack may be pointed to by a field of a specialized register of the processor 120 such as SHADOW_STK_U.PTR (for user-mode code) or SHADOW_STACK_S.PTR (for supervisor-mode code). Each entry of the shadow stack is precisely 64 bits in length and thus the shadow stack pointer may be 64-bit aligned in memory. The processor 120 accesses the shadow stack without performing any SLRR bounds checking.

In block 2306, the processor 120 determines whether a mismatch has been found between the legacy stack and the shadow stack. Such a mismatch may indicate that the legacy stack has been corrupted, for example as the result of a programming error, a stack overflow exploit, a ROP exploit, or other exploit. If no mismatch exists, the method 2300 branches ahead to block 2316 to perform the near return, as described below. If a mismatch exists, the method 2300 advances to block 2308.

In block 2308, the processor 120 dispatches a stack mismatch violation to a stack mismatch violation handler of the unsandbox 214. The processor 120 dispatches the violation using the sandbox exception dispatch method described above in connection with FIGS. 17-18. In block 2310, the processor 120 sets the dispatch address register (e.g., SANDBOX_DISP_ADDR_U) to the legacy return address from the legacy stack. In block 2312, the processor 120 sets the dispatch qualification data register to the shadow return address from the shadow stack. In block 2314, the processor 120 jumps to stack mismatch handler in the unsandbox 214 that is identified in a configuration register of the processor 120 (e.g., SHADOW_STK_MISM_IP_U). After jumping to the stack mismatch handler, the unsandbox 214 may handle the stack mismatch violation by analyzing the legacy and/or shadow stacks in order to determine whether the mismatch was caused by a potential exploit or by benign behavior. For example, setjmp/longjmp and C++ exceptions may cause deviations from a strict call/return model of control flow and should be permitted. In some embodiments, the unsandbox 214 may report a potential security violation, terminate the sandboxed application 216, or perform another security response. After the unsandbox 214 exception handler completes processing, the computing device 100 resumes executing the sandboxed application 216, as described above.

In block 2316, the processor 120 performs the near return. The processor 120 may pop the top entry from both the shadow stack and the legacy stack, and then jump to the return address popped from the legacy stack. After performing the near return, the method 2300 is completed. The computing device 100 may execute the method 2300 again in response to additional near return instructions.

Figure 24:
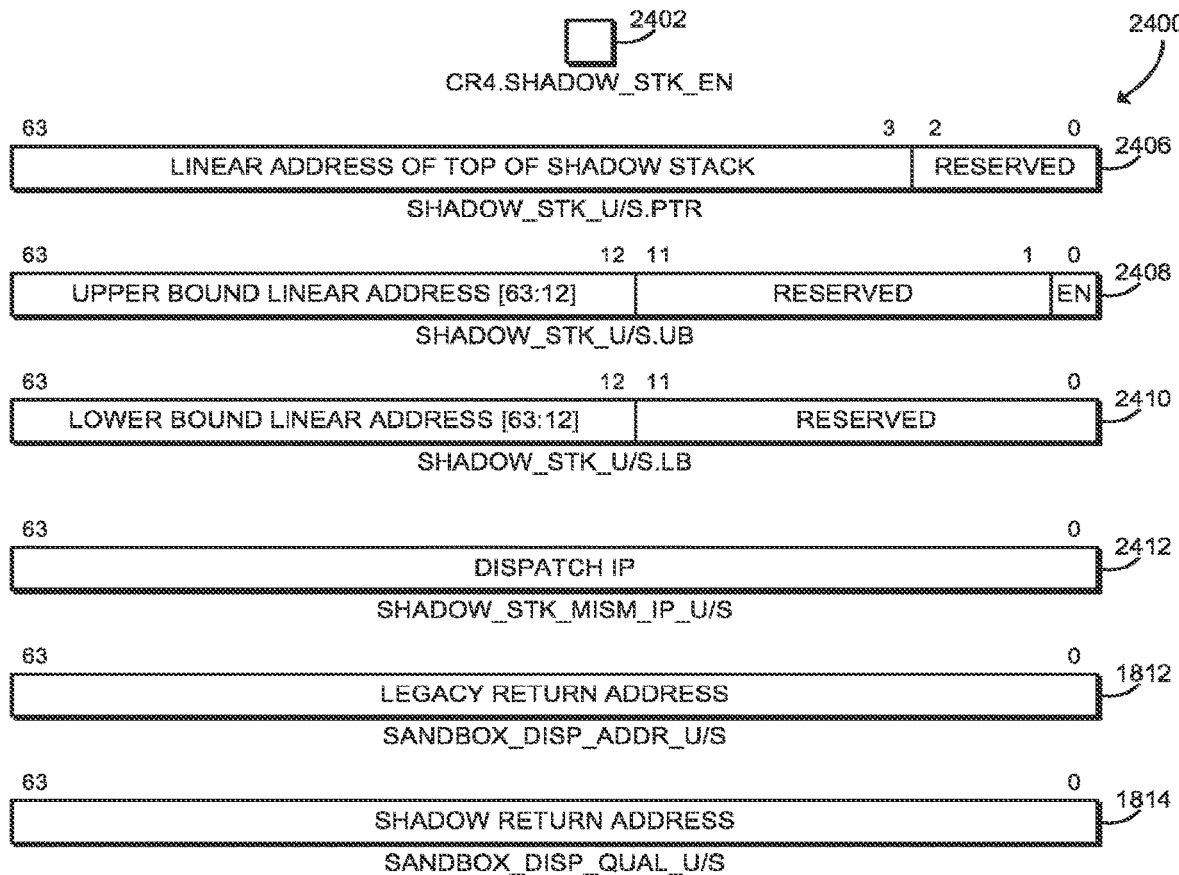
FIG. 24 is a schematic diagram illustrating shadow stack configuration registers that may be established by the computing device of FIGS. 1-2.

Referring now to FIG. 24, diagram 2400 illustrates one potential embodiment of shadow stack configuration registers that may be established by the processor 120. As shown in the diagram 2400, the processor 120 illustratively establishes a CR4.SHADOW_STK_EN flag 2402 of the configuration register CR4. The processor 120 establishes a shadow stack register that includes a SHADOW_STK_U/S.PTR field 2406, an upper bound SHADOW_STK_U/S.UB field 2408, and a lower bound SHADOW_STK_U/S.LB field 2410. The SHADOW_STK_U/S.PTR field 2406 includes the linear address of the top of the shadow stack. As shown, the shadow stack pointer is 64-bit aligned in memory and thus the lower 3 bits are reserved or must be zero. The SHADOW_STK_U/S.UB field 2408 and the lower bound SHADOW_STK_U/S.LB field 2410 each include page-aligned linear addresses that establish the upper bound and lower bound, respectively, that may be used by the shadow stack. Those bounds may prevent the shadow stack from growing too large and interfering with other memory regions. The SHADOW_STK_U/S.UB field 2408 also includes an enable bit. The enable bit determines whether shadow stack checking may be enabled by the processor 120. The processor 120 may also only enable shadow stack checking if the bounds register enable (e.g., CR4.SLRR_EN) bit is set, if the CR4.SHADOW_STK_EN flag 2402 is enabled, and if the sandbox flag (e.g., SANDBOX_CTL_U.SANDBOX) is also enabled. As shown, the processor 120 also establishes a SHADOW_STK_MISM_IP_U/S register 2412, which may include the 64-bit linear address of the stack mismatch violation exception handler in the unsandbox 214. As shown, during dispatch of the exception, the legacy return address is stored in the SANDBOX_DISP_ADDR register 1812 and the shadow return address is stored in the SANDBOX_DISP_QUAL register 1814.

The SLRR and shadow stack support may also provide shadow stack protections for legacy operating systems. In particular, if it is not possible to modify OS components that legitimately switch stacks, then it may be helpful to be able to monitor accesses to the legacy stack and detect switches between distinct legacy stacks. This may be accomplished using SLRRs by defining narrow bounds on the accesses through SS (the legacy stack segment) in the associated SLRR. This also may make it preferable to avoid incorporating SLRR checks into TLB fills but instead checking them for every access, since this stack window moves frequently and may thus result in stale TLB entries needing to be flushed.

Figure 25:
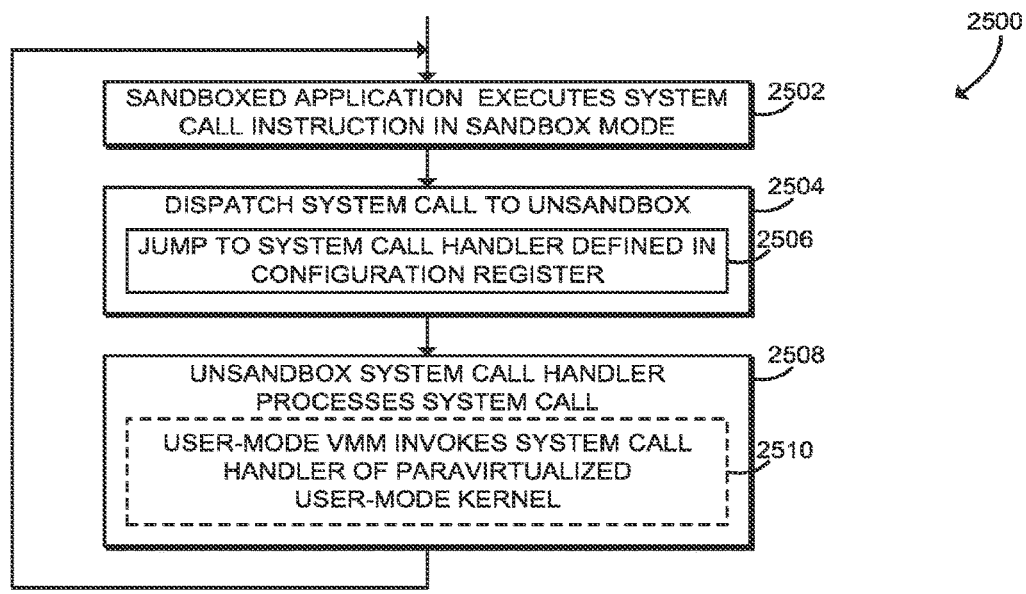
FIG. 25 is a simplified flow diagram of at least one embodiment of a method for handling a system call instruction that may be executed by the computing device of FIGS. 1-2.

Referring now to FIG. 25, in use, the computing device 100 may execute a method 2500 for handling a system call instruction. It should be appreciated that, in some embodiments, the operations of the method 2500 may be performed by one or more components of the environment 200 of the computing device 100 as shown in FIG. 2. The method 2500 begins in block 2502, in which the sandboxed application 216 of the computing device 100 executes a system call instruction in the sandbox mode. The system call instruction may be embodied as any processor instruction that may cause the processor 120 to switch to a higher privilege level. For example, the sandboxed application 216 may execute a SYSCALL, SYSENTER, or other similar instruction.

In block 2504, the processor 120 of the computing device 100 dispatches a system call exception to a system call handler in the unsandbox 214. The processor 120 dispatches the exception using the sandbox exception dispatch method described above in connection with FIGS. 17-18. The processor 120 does not include any custom data in the dispatch address or dispatch qualification registers. In block 2506, the processor 120 jumps to system call handler in the unsandbox 214 that is identified in a configuration register of the processor 120.

In block 2508, the system call handler of the unsandbox 214 processes the system call exception. For example, the unsandbox 214 may determine the requested system call and perform the system call operation that the sandboxed application 216 expects to be performed by an operating system or virtual machine monitor (VMM). In some embodiments, in block 2510, a user-mode VMM of the computing device 100 may invoke a system call handler of a paravirtualized user-mode kernel of the computing device 100. The paravirtualized user-mode kernel may service the system call. For example, in some embodiments the unsandbox 214 may include the user-mode VMM, and the sandboxed application 216 may include the paravirtualized user-mode kernel (and the associated processes managed by that kernel). In those embodiments, the user-mode VMM may effectively virtualize system calls generated from within the sandbox without requiring the processor 120 to exit the user mode. In some embodiments, the user-mode VMM, paravirtualized user-mode kernel, and associated processes may all be included in an Intel® SGX secure enclave. In those embodiments, system calls may be virtualized without requiring the processor 120 to exit the secure enclave. Additionally, by virtualizing system call instructions, processes may be executed in the sandbox transparently, without requiring modifications to the application binaries. After processing the system call exception, the unsandbox 214 returns execution to the sandboxed application 216 as described above. The method 2500 loops back to block 2502, in which the sandboxed application 216 may execute additional system call instructions. Accordingly, using the computing device 100 to support a paravirtualized container host may provide low-latency process switches as well as the ability to run the entire virtualized host inside a single SGX enclave. Placing an entire virtualized host in a secure enclave may be useful to minimize expensive enclave boundary crossings, to provide self-contained attestation of the proper sandboxing within the enclave, and to harden the internal communications between sandboxes by keeping them within the boundaries of the enclave.

It should be appreciated that, in some embodiments, the methods 300, 500, 700, 900, 1000, 1300, 1400, 1500, 1700, 1900, 2100, 2300, and/or 2500 may be embodied as various instructions stored on a computer-readable media, which may be executed by the processor 120, the I/O subsystem 126, and/or other components of the computing device 100 to cause the computing device 100 to perform the respective method 300, 500, 700, 900, 1000, 1300, 1400, 1500, 1700, 1900, 2100, 2300, and/or 2500. The computer-readable media may be embodied as any type of media capable of being read by the computing device 100 including, but not limited to, the memory 128, the data storage device 130, firmware devices, and/or other media.

EXAMPLES

Illustrative examples of the technologies disclosed herein are provided below. An embodiment of the technologies may include any one or more, and any combination of, the examples described below.

Example 1 includes a computing device for process isolation, the computing device comprising: a processor, wherein the processor comprises a segmentation manager to: (i) load a logical address, wherein the logical address includes a segment selector and an effective address, and wherein the segment selector is indicative of a segment base and an effective limit, and (ii) generate a linear address as a function of the logical address with the effective limit as a mask, wherein generating the linear address comprises, for each bit of the logical address, selecting a corresponding bit from the segment base or from the effective address based on a value of a corresponding bit from the effective limit.

Example 2 includes the subject matter of Example 1, and wherein to load the logical address comprises to: read a segment selector from a segment selector register of the processor; index a segment descriptor table in a memory of the computing device with the segment selector to read a segment descriptor; and load the segment base and the effective limit from the segment descriptor.

Example 3 includes the subject matter of any of Examples 1 and 2, and wherein the segment base, the effective limit, the effective address, and the linear address each comprise a 32-bit value.

Example 4 includes the subject matter of any of Examples 1-3, and wherein the segment base, the effective limit, the effective address, and the linear address each comprise a 64-bit value.

Example 5 includes the subject matter of any of Examples 1-4, and wherein to select the corresponding bit from the segment base or from the effective address comprises to select the corresponding bit with a multiplexer device of the processor.

Example 6 includes the subject matter of any of Examples 1-5, and wherein: the processor further comprises a task manager to (i) switch to a new task, wherein the new task is described by a task state segment extension in a memory of the computing device, and activate a low-latency segmentation mode in response to a switch to the new task, wherein the task state segment extension is indicative of the low-latency segmentation mode; wherein to load the logical address comprises to load the logical address in response to activation of the low-latency segmentation mode.

Example 7 includes the subject matter of any of Examples 1-6, and wherein to switch to the new task comprises to: store a current stack pointer value of the processor to a second task state segment extension associated with a previous task; load an enhanced segmentation task register with a pointer value indicative of the task state segment extension; and load a segmentation state of the processor for the new task from the task state segment extension.

Example 8 includes the subject matter of any of Examples 1-7, and wherein to load the segmentation state of the processor comprises to: load a local descriptor table register of the processor with a local descriptor table pointer from the task state segment extension; load a stack segment register of the processor with a stack segment selector from the task state segment extension; load a code segment register of the processor with a code segment selector from the task state segment extension; load a stack pointer register of the processor with a stack pointer value from the task state segment extension; and load an instruction pointer register of the processor with an instruction pointer value from the task state segment extension.

Example 9 includes the subject matter of any of Examples 1-8, and wherein the processor further comprises a sandbox manager to: determine whether an application sandbox mode is enabled; determine whether a destination segment for the new task is identified in a local descriptor table in response to a determination that the application sandbox mode is enabled; determine whether a descriptor privilege level of the destination segment is less than a current privilege level of the processor in response to a determination that the destination segment for the new task is identified in the local descriptor table; and generate an exception in response to a determination that the descriptor privilege level is less than the current privilege level.

Example 10 includes the subject matter of any of Examples 1-9, and further comprising a software isolation manager to: load an unsandbox in a user privilege level; load, by the unsandbox, a sandboxed application in the user privilege level; configure, by the unsandbox, the task state segment extension, wherein the new task described by the task state segment extension comprises the sandboxed application; enable, by the unsandbox, the application sandbox mode; and execute the sandboxed application in response to enablement of the application sandbox mode; wherein to load the logical address comprises to load the logical address in response to execution of the sandboxed application.

Example 11 includes the subject matter of any of Examples 1-10, and wherein: the software isolation manager is further to load a host kernel in a supervisor privilege level; and the host kernel is to load a host application in the user privilege level, wherein the host application comprises the unsandbox.

Example 12 includes the subject matter of any of Examples 1-11, and wherein: the processor further comprises secure enclave support; the software isolation manager is further to load a secure enclave in the host application using the secure enclave support of the processor; to load the unsandbox comprises to load the unsandbox in the secure enclave; and to load the sandboxed application comprises to load the sandboxed application in the secure enclave.

Example 13 includes the subject matter of any of Examples 1-12, and wherein the software isolation manager is further to attest to the secure enclave, wherein to attest to the secure enclave comprises to measure a global descriptor table of the sandboxed application, a local descriptor table of the sandboxed application, and the task state segment extension.

Example 14 includes the subject matter of any of Examples 1-13, and wherein the software isolation manager is further to: load, by the host application, a user-level virtual machine monitor, wherein the user-level virtual machine monitor comprises the unsandbox; and load, by the host application, a paravirtualized kernel, wherein the paravirtualized kernel manages the sandboxed application; wherein to configure the task state segment extension comprises to configure the task state segment extension by the user-level virtual machine monitor.

Example 15 includes the subject matter of any of Examples 1-14, and wherein: the software isolation manager is further to handle, by the user-level virtual machine monitor, a virtualized system call from the sandboxed application in the user privilege level; and to execute the sandboxed application further comprises to virtualize the system call, and wherein to virtualize the system call comprises to replicate a model-specific register of the processor that regulates user to supervisor mode transitions.

Example 16 includes the subject matter of any of Examples 1-15, and wherein the software isolation manager is further to: set a segmentation mode associated with the host kernel to a permissive segmentation mode; and set, by the host application, a segmentation mode associated with the task state segment extension to the low-latency segmentation mode.

Example 17 includes the subject matter of any of Examples 1-16, and wherein the software isolation manager is further to set a segment base and an effective limit associated with the unsandbox to zero in response to setting of the segmentation mode to the permissive segmentation mode.

Example 18 includes the subject matter of any of Examples 1-17, and wherein the software isolation manager is further to: load, by the sandboxed application, a nested sandboxed application in the user privilege level; configure, by the sandboxed application, a second task state segment extension that describes a second task, wherein the second task comprises the nested sandboxed application; and execute, by the computing device, the nested sandboxed application in response to configuration of the second task state segment extension.

Example 19 includes the subject matter of any of Examples 1-18, and wherein the processor further comprises a protection domain manager to: switch to a new protection domain, wherein the protection domain comprises a unit of code and data that may be used by multiple software threads; load a segmentation state of the processor for the new protection domain from a domain object segment, wherein the segmentation state comprises a local descriptor table selector and a code segment selector; load an entry point instruction pointer for the new protection domain from the domain object segment; determine if a subsystem identifier of the domain object segment is different from a current subsystem identifier of a current protection domain; index a subsystem table in a memory of the computing device with the subsystem identifier to retrieve a subsystem table entry in response to a determination that the subsystem identifier of the domain object segment is different from the current subsystem identifier; load a stack segmentation state from the subsystem table entry in response to indexing of the subsystem table, wherein the stack segmentation state comprises a stack segment selector and a stack pointer; and activate a low-latency segmentation mode in response to the indexing of the subsystem table, wherein the subsystem table entry is indicative of the low-latency segmentation mode; wherein to load the logical address comprises to load the logical address in response to activation of the low-latency segmentation mode.

Example 20 includes the subject matter of any of Examples 1-19, and wherein the protection domain manager is further to store a current stack pointer of the processor in the subsystem table in response to a determination that the subsystem identifier of the domain object segment is different from the current subsystem identifier; wherein to load the stack segmentation state further comprises to load the stack segmentation state in response to storage of the current stack pointer.

Example 21 includes the subject matter of any of Examples 1-20, and wherein the protection domain manager is further to store a stack limit in the subsystem table in response to the determination that the subsystem identifier of the domain object segment is different from the current subsystem identifier.

Example 22 includes the subject matter of any of Examples 1-21, and wherein the processor further comprises a call segment manager to: execute a call operation, wherein the call operation is indicative of a target code destination; push a call gate on a control stack in response to execution of the call operation, wherein the call gate is indicative of a return point associated with the call operation, and wherein the control stack is included in a control stack segment of the memory of the computing device; execute a return operation in response to execution of the call operation; determine whether a return address of a legacy stack matches an address of a top call gate of the control stack in response to execution of the return operation; and generate a control stack mismatch exception in response to a determination that the return address of the legacy stack does not match the address of the top call gate of the control stack.

Example 23 includes the subject matter of any of Examples 1-22, and wherein: to execute the call operation comprises to execute a call operation to the new protection domain; and to execute the return operation comprises to execute a return operation to the current protection domain.

Example 24 includes the subject matter of any of Examples 1-23, and wherein the control stack manager is further to: read a control stack segment mode from the subsystem table entry in response to the indexing of the subsystem table; and determine whether the control stack segment mode comprises an intra-domain transfer mode; wherein: to execute the call operation comprises to execute a call operation to the new protection domain; to execute the return operation comprises to execute a return operation to the new protection domain; to push the call gate further comprises to push the call gate in response to a determination that the control stack segment mode comprises the intra-domain transfer mode; and to determine whether the return address of the legacy stack matches the address of the top call gate further comprises to determine whether the return address of the legacy stack matches the address of the top call gate in response to the determination that the control stack segment mode comprises the intra-domain transfer mode.

Example 25 includes the subject matter of any of Examples 1-24, and further comprising: a software isolation manager to (i) load an unsandbox in a user privilege level of the processor, (ii) load, by the unsandbox, a sandboxed application in the user privilege level, (iii) store, by the unsandbox, an extended descriptor selector in a code segment register of the processor, wherein the extended descriptor selector references an extended descriptor of an extended descriptor table, and (iv) execute the sandboxed application in response to enablement of an application sandbox mode of the processor; wherein the processor further comprises a sandbox manager to enable the application sandbox mode in response to storage of the extended descriptor selector in the code segment register; and wherein to load the logical address comprises to load the logical address in response to execution of the sandboxed application.

Example 26 includes the subject matter of any of Examples 1-25, and wherein the extended descriptor selector comprises a 32-bit value including a 15-bit protection domain identifier, an extended descriptor bit, and an extended descriptor offset.

Example 27 includes the subject matter of any of Examples 1-26, and wherein the extended descriptor table comprises a hierarchical table having a first level and a second level, wherein the first level is indexed by the protection domain identifier of the extended descriptor selector and wherein the second level is indexed by the extended descriptor offset of the extended descriptor selector.

Example 28 includes the subject matter of any of Examples 1-27, and wherein the sandbox manager is further to prohibit, by the processor, loading of a segment register of the processor with a legacy descriptor selector in response to the enablement of the application sandbox mode, wherein the legacy descriptor selector references a legacy descriptor of a local descriptor table or a global descriptor table.

Example 29 includes a computing device for process isolation, the computing device comprising: a software isolation manager to: (i) execute an unsandbox in a first privilege level of a processor of the computing device, (ii) enable, by the unsandbox, a sandbox mode of the processor, wherein to enable the sandbox mode comprises to set a sandbox flag of the processor, and (iii) execute a sandboxed application in the sandbox mode and in the first privilege level in response to enablement of the sandbox mode; wherein the processor comprises a sandbox manager to (i) generate a sandbox exception in response to execution of the sandboxed application and (ii) dispatch the sandbox exception to a sandbox exception handler of the unsandbox in response to generation of the sandbox exception; wherein the software isolation manager is further to execute, by the unsandbox in the first privilege level, a dispatch return instruction in response to a dispatch of the sandbox exception; and wherein sandbox manager of the processor is further to resume execution of the sandboxed application in the sandbox mode and in the first privilege level in response to execution of the dispatch return instruction.

Example 30 includes the subject matter of Example 29, and wherein the first privilege level comprises a user privilege level of the processor.

Example 31 includes the subject matter of any of Examples 29 and 30, and wherein the first privilege level comprises a supervisor privilege level of the processor.

Example 32 includes the subject matter of any of Examples 29-31, and wherein: the software isolation manager is further to execute, by the unsandbox, the dispatch handler in the first privilege level in response to the dispatch of the sandbox exception; wherein to execute the dispatch return instruction comprises to execute the dispatch return instruction in response to execution of the dispatch handler.

Example 33 includes the subject matter of any of Examples 29-32, and wherein to dispatch the sandbox exception to the sandbox exception handler of the unsandbox comprises to: store one or more sandbox dispatch values into corresponding registers of the processor in response to the generation of the sandbox exception, wherein the sandbox dispatch values include a return address within the sandboxed application; clear the sandbox flag of the processor in response to the generation of the sandbox exception; and jump to the sandbox exception handler within the unsandbox in response to clearing of the sandbox flag, wherein the sandbox exception handler is identified by a dispatch instruction pointer register of the processor.

Example 34 includes the subject matter of any of Examples 29-33, and wherein the one or more sandbox dispatch values further include a return address within the sandboxed application, a dispatch address associated with the sandbox exception, and dispatch qualification data associated with the sandbox exception.

Example 35 includes the subject matter of any of Examples 29-34, and wherein to resume execution of the sandboxed application comprises to set the sandbox flag of the processor.

Example 36 includes the subject matter of any of Examples 29-35, and wherein to set the sandbox flag comprises to set a sandbox flag bit of a sandbox enable control register of the processor.

Example 37 includes the subject matter of any of Examples 29-36, and wherein: the software isolation manager is further to configure, by the unsandbox, a range register linked to a first segment register of the processor, wherein to enable the sandbox mode comprises to enable the sandbox mode in response to configuration of the range register; to execute the sandboxed application comprises to map, by the processor, a logical address to a linear address, wherein the logical address comprises a segment selector and an effective address, wherein the segment selector is indicative of a segment base and an effective limit, and wherein the segment selector is associated with the first segment register; to generate the sandbox exception comprises to determine whether the linear address is within memory bounds defined by the range register; and to dispatch the sandbox exception comprises to dispatch a segment range sandbox violation in response to a determination that the linear address is not within the memory bounds defined by the range register.

Example 38 includes the subject matter of any of Examples 29-37, and wherein to configure the range register comprises to store an upper bound linear address and a lower bound linear address in the range register.

Example 39 includes the subject matter of any of Examples 29-38, and wherein to dispatch the sandbox exception further comprises to (i) store the linear address in a dispatch address register of the processor and (ii) store a segment identifier indicative of the first segment register in a dispatch qualification data register of the processor.

Example 40 includes the subject matter of any of Examples 29-39, and wherein the software isolation manager is further to execute, by the unsandbox, the dispatch handler in the first privilege level in response to the dispatch of the sandbox exception, wherein to execute the dispatch handler comprises to: execute, by the unsandbox, an XSAVE instruction to save a sandbox configuration of a current thread; enable, by the unsandbox, a sandbox flag in a second sandbox configuration that corresponds to a destination thread, wherein the second sandbox configuration is stored in an XSAVE memory area; execute, by the unsandbox, an XRSTOR instruction to restore the second sandbox configuration in response to enablement of the sandbox flag in the second sandbox configuration; and switch to the destination thread in response to execution of the XRSTOR instruction.

Example 41 includes the subject matter of any of Examples 29-40, and wherein: to execute the sandboxed application comprises to execute, by the sandboxed application, a near return instruction; to generate the sandbox exception comprises to determine whether a top return address of a shadow stack matches a top return address of a legacy stack in response to execution of the near return instruction; and to dispatch the sandbox exception comprises to dispatch a stack mismatch violation in response to a determination that the top return address of the shadow stack does not match the top return address of a legacy stack.

Example 42 includes the subject matter of any of Examples 29-41, and wherein to dispatch the sandbox exception further comprises to store the top return address of the legacy stack in a dispatch address register of the processor and to store the top return address of the shadow stack in a dispatch qualification data register of the processor.

Example 43 includes the subject matter of any of Examples 29-42, and wherein the processor comprises a plurality of segment registers and a plurality of range registers, wherein each range register is linked to a corresponding segment register, and wherein the shadow stack is outside of each of a plurality of memory bounds, wherein each memory bound is established by a corresponding range register.

Example 44 includes the subject matter of any of Examples 29-43, and wherein: to generate the sandbox exception further comprises to determine, by the processor, whether a global sandbox enable flag of a configuration register of the processor is set in response to executing the near return instruction; and to dispatch the sandbox exception further comprises to dispatch the stack mismatch violation in response to the determination that the top return address of the shadow stack does not match the top return address of the legacy stack and a determination that the global sandbox enable flag of the configuration register is set.

Example 45 includes the subject matter of any of Examples 29-44, and wherein: to generate the sandbox exception comprises to execute, by the sandboxed application, a system call instruction; and to dispatch the sandbox exception comprises to dispatch, by the processor, a system call exception to the unsandbox in the first privilege level in response to execution of the system call instruction.

Example 46 includes the subject matter of any of Examples 29-45, and wherein the software isolation manager is further to: load a host kernel in a supervisor privilege level of the processor; and load, by the host kernel, a host application in the first privilege level, wherein the host application comprises the unsandbox, and wherein the first privilege level comprises a user privilege level of the processor.

Example 47 includes the subject matter of any of Examples 29-46, and wherein the software isolation manager is further to: load a secure enclave in the host application using secure enclave support of the processor; wherein to execute the unsandbox in the first privilege level comprises to execute the unsandbox within the secure enclave; and wherein to execute the sandboxed application in the sandbox mode and in the user privilege comprises to execute the sandboxed application within the secure enclave.

Example 48 includes the subject matter of any of Examples 29-47, and wherein the software isolation manager is further to: load, by the host application of the computing device, a user-level virtual machine monitor, wherein the user-level virtual machine monitor comprises the unsandbox; and load, by the user-level virtual machine monitor, a user-level paravirtualized kernel, wherein the user-level paravirtualized kernel comprises the sandboxed application.

Example 49 includes a method for process isolation, the method comprising: loading, by a processor of a computing device, a logical address, wherein the logical address includes a segment selector and an effective address, and wherein the segment selector is indicative of a segment base and an effective limit; and generating, by the processor, a linear address as a function of the logical address with the effective limit as a mask, wherein generating the linear address comprises, for each bit of the logical address, selecting a corresponding bit from the segment base or from the effective address based on a value of a corresponding bit from the effective limit.

Example 50 includes the subject matter of Example 49, and wherein loading the logical address comprises: reading a segment selector from a segment selector register of the processor; indexing a segment descriptor table in a memory of the computing device with the segment selector to read a segment descriptor; and loading the segment base and the effective limit from the segment descriptor.

Example 51 includes the subject matter of any of Examples 49 and 50, and wherein the segment base, the effective limit, the effective address, and the linear address each comprise a 32-bit value.

Example 52 includes the subject matter of any of Examples 49-51, and wherein the segment base, the effective limit, the effective address, and the linear address each comprise a 64-bit value.

Example 53 includes the subject matter of any of Examples 49-52, and wherein selecting the corresponding bit from the segment base or from the effective address comprises selecting the corresponding bit with a multiplexer device of the processor.

Example 54 includes the subject matter of any of Examples 49-53, and further comprising: switching, by the processor, to a new task, wherein the new task is described by a task state segment extension in a memory of the computing device; and activating, by the processor, a low-latency segmentation mode in response to switching to the new task, wherein the task state segment extension is indicative of the low-latency segmentation mode; wherein loading the logical address comprises loading the logical address in response to activating the low-latency segmentation mode.

Example 55 includes the subject matter of any of Examples 49-54, and wherein switching to the new task comprises: storing a current stack pointer value of the processor to a second task state segment extension associated with a previous task; loading an enhanced segmentation task register with a pointer value indicative of the task state segment extension; and loading a segmentation state of the processor for the new task from the task state segment extension.

Example 56 includes the subject matter of any of Examples 49-55, and wherein loading the segmentation state of the processor comprises: loading a local descriptor table register of the processor with a local descriptor table pointer from the task state segment; extension loading a stack segment register of the processor with a stack segment selector from the task state segment extension; loading a code segment register of the processor with a code segment selector from the task state segment extension; loading a stack pointer register of the processor with a stack pointer value from the task state segment extension; and loading an instruction pointer register of the processor with an instruction pointer value from the task state segment extension.

Example 57 includes the subject matter of any of Examples 49-56, and further comprising: determining, by the processor, whether an application sandbox mode is enabled; determining, by the processor, whether a destination segment for the new task is identified in a local descriptor table in response to determining that the application sandbox mode is enabled; determining, by the processor, whether a descriptor privilege level of the destination segment is less than a current privilege level of the processor in response to determining that the destination segment for the new task is identified in the local descriptor table; and generating, by the processor, an exception in response to determining that the descriptor privilege level is less than the current privilege level.

Example 58 includes the subject matter of any of Examples 49-57, and further comprising: loading, by the computing device, an unsandbox in a user privilege level; loading, by the unsandbox of the computing device, a sandboxed application in the user privilege level; configuring, by the unsandbox of the computing device, the task state segment extension, wherein the new task described by the task state segment extension comprises the sandboxed application; enabling, by the unsandbox of the computing device, the application sandbox mode; and executing, by the computing device, the sandboxed application in response to enabling the application sandbox mode; wherein loading the logical address comprises loading the logical address in response to executing the sandboxed application.

Example 59 includes the subject matter of any of Examples 49-58, and further comprising: loading, by the computing device, a host kernel in a supervisor privilege level; and loading, by the host kernel, a host application in the user privilege level, wherein the host application comprises the unsandbox.

Example 60 includes the subject matter of any of Examples 49-59, and further comprising: loading, by the computing device, a secure enclave in the host application using secure enclave support of the processor; wherein loading the sandboxed application comprises loading the sandboxed application in the secure enclave.

Example 61 includes the subject matter of any of Examples 49-60, and further comprising attesting, by the computing device, to the secure enclave, wherein attesting to the secure enclave comprises measuring a global descriptor table of the sandboxed application, a local descriptor table of the sandboxed application, and the task state segment extension.

Example 62 includes the subject matter of any of Examples 49-61, and further comprising: loading, by the host application of the computing device, a user-level virtual machine monitor, wherein the user-level virtual machine monitor comprises the unsandbox; and loading, by the host application of the computing device, a paravirtualized kernel, wherein the paravirtualized kernel manages the sandboxed application; wherein configuring the task state segment extension comprises configuring the task state segment extension by the user-level virtual machine monitor.

Example 63 includes the subject matter of any of Examples 49-62, and further comprising: handling, by the user-level virtual machine monitor of the computing device, a virtualized system call from the sandboxed application in the user privilege level; wherein executing the sandboxed application further comprises virtualizing the system call, and wherein virtualizing the system call comprises replicating a model-specific register of the processor that regulates user to supervisor mode transitions.

Example 64 includes the subject matter of any of Examples 49-63, and further comprising: setting, by the computing device, a segmentation mode associated with the host kernel to a permissive segmentation mode; and setting, by the host application of the computing device, a segmentation mode associated with the task state segment extension to the low-latency segmentation mode.

Example 65 includes the subject matter of any of Examples 49-64, and further comprising setting, by the computing device, a segment base and an effective limit associated with the unsandbox to zero in response to setting the segmentation mode to the permissive segmentation mode.

Example 66 includes the subject matter of any of Examples 49-65, and further comprising: loading, by the sandboxed application of the computing device, a nested sandboxed application in the user privilege level; configuring, by the sandboxed application of the computing device, a second task state segment extension that describes a second task, wherein the second task comprises the nested sandboxed application; and executing, by the computing device, the nested sandboxed application in response to configuring the second task state segment extension.

Example 67 includes the subject matter of any of Examples 49-66, and further comprising: switching, by the processor, to a new protection domain, wherein the protection domain comprises a unit of code and data that may be used by multiple software threads; loading, by the processor, a segmentation state of the processor for the new protection domain from a domain object segment, wherein the segmentation state comprises a local descriptor table selector and a code segment selector; loading, by the processor, an entry point instruction pointer for the new protection domain from the domain object segment; determining, by the processor, if a subsystem identifier of the domain object segment is different from a current subsystem identifier of a current protection domain; indexing, by the processor, a subsystem table in a memory of the computing device with the subsystem identifier to retrieve a subsystem table entry in response to determining that the subsystem identifier of the domain object segment is different from the current subsystem identifier; loading, by the processor, a stack segmentation state from the subsystem table entry in response to indexing the subsystem table, wherein the stack segmentation state comprises a stack segment selector and a stack pointer; and activating, by the processor, a low-latency segmentation mode in response to indexing the subsystem table, wherein the subsystem table entry is indicative of the low-latency segmentation mode; wherein loading the logical address comprises loading the logical address in response to activating the low-latency segmentation mode.

Example 68 includes the subject matter of any of Examples 49-67, and further comprising storing, by the processor, a current stack pointer of the processor in the subsystem table in response to determining that the subsystem identifier of the domain object segment is different from the current subsystem identifier; wherein loading the stack segmentation state further comprises loading the stack segmentation state in response to storing the current stack pointer.

Example 69 includes the subject matter of any of Examples 49-68, and further comprising storing, by the computing device, a stack limit in the subsystem table in response to determining that the subsystem identifier of the domain object segment is different from the current subsystem identifier.

Example 70 includes the subject matter of any of Examples 49-69, and further comprising: executing, by the processor, a call operation, wherein the call operation is indicative of a target code destination; pushing, by the processor, a call gate on a control stack in response to executing the call operation, wherein the call gate is indicative of a return point associated with the call operation, and wherein the control stack is included in a control stack segment of the memory of the computing device; executing, by the processor, a return operation in response to executing the call operation; determining, by the processor, whether a return address of a legacy stack matches an address of a top call gate of the control stack in response to executing the return operation; and generating, by the processor, a control stack mismatch exception in response to determining that the return address of the legacy stack does not match the address of the top call gate of the control stack.

Example 71 includes the subject matter of any of Examples 49-70, and wherein: executing the call operation comprises executing a call operation to the new protection domain; and executing the return operation comprises executing a return operation to the current protection domain.

Example 72 includes the subject matter of any of Examples 49-71, and further comprising: reading, by the processor, a control stack segment mode from the subsystem table entry in response to indexing the subsystem table; and determining, by the processor, whether the control stack segment mode comprises an intra-domain transfer mode; wherein: executing the call operation comprises executing a call operation to the new protection domain; executing the return operation comprises executing a return operation to the new protection domain; pushing the call gate further comprises pushing the call gate in response to determining that the control stack segment mode comprises the intra-domain transfer mode; and determining whether the return address of the legacy stack matches the address of the top call gate further comprises determining whether the return address of the legacy stack matches the address of the top call gate in response to determining that the control stack segment mode comprises the intra-domain transfer mode.

Example 73 includes the subject matter of any of Examples 49-72, and further comprising: loading, by the computing device, an unsandbox in a user privilege level of the processor; loading, by the unsandbox of the computing device, a sandboxed application in the user privilege level; storing, by the unsandbox of the computing device, an extended descriptor selector in a code segment register of the processor, wherein the extended descriptor selector references an extended descriptor of an extended descriptor table; enabling, by the computing device, an application sandbox mode in response to storing the extended descriptor selector in the code segment register; and executing, by the computing device, the sandboxed application in response to enabling the application sandbox mode; wherein loading the logical address comprises loading the logical address in response to executing the sandboxed application.

Example 74 includes the subject matter of any of Examples 49-73, and wherein the extended descriptor selector comprises a 32-bit value including a 15-bit protection domain identifier, an extended descriptor bit, and an extended descriptor offset.

Example 75 includes the subject matter of any of Examples 49-74, and wherein the extended descriptor table comprises a hierarchical table having a first level and a second level, wherein the first level is indexed by the protection domain identifier of the extended descriptor selector and wherein the second level is indexed by the extended descriptor offset of the extended descriptor selector.

Example 76 includes the subject matter of any of Examples 49-75, and further comprising prohibiting, by the processor, loading of a segment register of the processor with a legacy descriptor selector in response to enabling the application sandbox mode, wherein the legacy descriptor selector references a legacy descriptor of a local descriptor table or a global descriptor table.

Example 77 includes a method for process isolation, the method comprising: executing, by a computing device, an unsandbox in a first privilege level of a processor of the computing device; enabling, by the unsandbox of the computing device, a sandbox mode of the processor, wherein enabling the sandbox mode comprises setting a sandbox flag of the processor; executing, by the computing device, a sandboxed application in the sandbox mode and in the first privilege level in response to enabling the sandbox mode; generating, by the processor, a sandbox exception in response to executing the sandboxed application; dispatching, by the processor, the sandbox exception to a sandbox exception handler of the unsandbox in response to generating the sandbox exception; executing, by the unsandbox in the first privilege level, a dispatch return instruction in response to dispatching the sandbox exception; and resuming, by the processor, execution of the sandboxed application in the sandbox mode and in the first privilege level in response to executing the dispatch return instruction.

Example 78 includes the subject matter of Example 77, and wherein the first privilege level comprises a user privilege level of the processor.

Example 79 includes the subject matter of any of Examples 77 and 78, and wherein the first privilege level comprises a supervisor privilege level of the processor.

Example 80 includes the subject matter of any of Examples 77-79, and further comprising: executing, by the unsandbox, the dispatch handler in the first privilege level in response to dispatching the sandbox exception; wherein executing the dispatch return instruction comprises executing the dispatch return instruction in response to executing the dispatch handler.

Example 81 includes the subject matter of any of Examples 77-80, and wherein dispatching the sandbox exception to the sandbox exception handler of the unsandbox comprises: storing, by the processor, one or more sandbox dispatch values into corresponding registers of the processor in response to generating the sandbox exception, wherein the sandbox dispatch values include a return address within the sandboxed application; clearing, by the processor, the sandbox flag of the processor in response to generating the sandbox exception; and jumping, by the processor, to the sandbox exception handler within the unsandbox in response to clearing the sandbox flag, wherein the sandbox exception handler is identified by a dispatch instruction pointer register of the processor.

Example 82 includes the subject matter of any of Examples 77-81, and wherein the one or more sandbox dispatch values further include a return address within the sandboxed application, a dispatch address associated with the sandbox exception, and dispatch qualification data associated with the sandbox exception.

Example 83 includes the subject matter of any of Examples 77-82, and wherein resuming execution of the sandboxed application comprises setting, by the processor, the sandbox flag of the processor.

Example 84 includes the subject matter of any of Examples 77-83, and wherein setting the sandbox flag comprises setting a sandbox flag bit of a sandbox enable control register of the processor.

Example 85 includes the subject matter of any of Examples 77-84, and further comprising: configuring, by the unsandbox, a range register linked to a first segment register of the processor, wherein enabling the sandbox mode comprises enabling the sandbox mode in response to configuring the range register; wherein executing the sandboxed application comprises mapping, by the processor, a logical address to a linear address, wherein the logical address comprises a segment selector and an effective address, wherein the segment selector is indicative of a segment base and an effective limit, and wherein the segment selector is associated with the first segment register; wherein generating the sandbox exception comprises determining, by the processor, whether the linear address is within memory bounds defined by the range register; and wherein dispatching the sandbox exception comprises dispatching a segment range sandbox violation in response to determining that the linear address is not within the memory bounds defined by the range register.

Example 86 includes the subject matter of any of Examples 77-85, and wherein configuring the range register comprises storing an upper bound linear address and a lower bound linear address in the range register.

Example 87 includes the subject matter of any of Examples 77-86, and wherein dispatching the sandbox exception further comprises storing the linear address in a dispatch address register of the processor and storing a segment identifier indicative of the first segment register in a dispatch qualification data register of the processor.

Example 88 includes the subject matter of any of Examples 77-87, and further comprising executing, by the unsandbox, the dispatch handler in the first privilege level in response to dispatching the sandbox exception, wherein executing the dispatch handler comprises: executing, by the unsandbox, an XSAVE instruction to save a sandbox configuration of a current thread; enabling, by the unsandbox, a sandbox flag in a second sandbox configuration that corresponds to a destination thread, wherein the second sandbox configuration is stored in an XSAVE memory area; executing, by the unsandbox, an XRSTOR instruction to restore the second sandbox configuration in response to enabling the sandbox flag in the second sandbox configuration; and switching, by the computing device, to the destination thread in response to executing the XRSTOR instruction.

Example 89 includes the subject matter of any of Examples 77-88, and wherein: executing the sandboxed application comprises executing, by the sandboxed application, a near return instruction; generating the sandbox exception comprises determining, by the processor, whether a top return address of a shadow stack matches a top return address of a legacy stack in response to executing the near return instruction; and dispatching the sandbox exception comprises dispatching, by the processor, a stack mismatch violation in response to determining that the top return address of the shadow stack does not match the top return address of a legacy stack.

Example 90 includes the subject matter of any of Examples 77-89, and wherein dispatching the sandbox exception further comprises storing the top return address of the legacy stack in a dispatch address register of the processor and storing the top return address of the shadow stack in a dispatch qualification data register of the processor.

Example 91 includes the subject matter of any of Examples 77-90, and wherein the processor comprises a plurality of segment registers and a plurality of range registers, wherein each range register is linked to a corresponding segment register, and wherein the shadow stack is outside of each of a plurality of memory bounds, wherein each memory bound is established by a corresponding range register.

Example 92 includes the subject matter of any of Examples 77-91, and wherein: generating the sandbox exception further comprises determining, by the processor, whether a global sandbox enable flag of a configuration register of the processor is set in response to executing the near return instruction; and dispatching the sandbox exception further comprises dispatching the stack mismatch violation in response to determining that the top return address of the shadow stack does not match the top return address of a legacy stack and determining that the global sandbox enable flag of the configuration register is set.

Example 93 includes the subject matter of any of Examples 77-92, and wherein: generating the sandbox exception comprises executing, by the sandboxed application, a system call instruction; and dispatching the sandbox exception comprises dispatching, by the processor, a system call exception to the unsandbox in the first privilege level in response to executing the system call instruction.

Example 94 includes the subject matter of any of Examples 77-93, and further comprising: loading, by the computing device, a host kernel in a supervisor privilege level of the processor; and loading, by the host kernel, a host application in the first privilege level, wherein the host application comprises the unsandbox, and wherein the first privilege level comprises a user privilege level of the processor.

Example 95 includes the subject matter of any of Examples 77-94, and further comprising: loading, by the computing device, a secure enclave in the host application using secure enclave support of the processor; wherein executing the unsandbox in the first privilege level comprises executing the unsandbox within the secure enclave; and wherein executing the sandboxed application in the sandbox mode and in the user privilege comprises executing the sandboxed application within the secure enclave.

Example 96 includes the subject matter of any of Examples 77-95, and further comprising: loading, by the host application of the computing device, a user-level virtual machine monitor, wherein the user-level virtual machine monitor comprises the unsandbox; and loading, by the user-level virtual machine monitor, a user-level paravirtualized kernel, wherein the user-level paravirtualized kernel comprises the sandboxed application.

Example 97 includes a computing device comprising: a processor; and a memory having stored therein a plurality of instructions that when executed by the processor cause the computing device to perform the method of any of Examples 49-96.

Example 98 includes one or more machine readable storage media comprising a plurality of instructions stored thereon that in response to being executed result in a computing device performing the method of any of Examples 49-96.

Example 99 includes a computing device comprising means for performing the method of any of Examples 49-96.

Example 100 includes a computing device for process isolation, the computing device comprising: means for loading, by a processor of the computing device, a logical address, wherein the logical address includes a segment selector and an effective address, and wherein the segment selector is indicative of a segment base and an effective limit; and means for generating, by the processor, a linear address as a function of the logical address with the effective limit as a mask, wherein generating the linear address comprises, for each bit of the logical address, selecting a corresponding bit from the segment base or from the effective address based on a value of a corresponding bit from the effective limit.

Example 101 includes the subject matter of Example 100, and wherein the means for loading the logical address comprises: means for reading a segment selector from a segment selector register of the processor; means for indexing a segment descriptor table in a memory of the computing device with the segment selector to read a segment descriptor; and means for loading the segment base and the effective limit from the segment descriptor.

Example 102 includes the subject matter of any of Examples 100 and 101, and wherein the segment base, the effective limit, the effective address, and the linear address each comprise a 32-bit value.

Example 103 includes the subject matter of any of Examples 100-102, and wherein the segment base, the effective limit, the effective address, and the linear address each comprise a 64-bit value.

Example 104 includes the subject matter of any of Examples 100-103, and wherein the means for selecting the corresponding bit from the segment base or from the effective address comprises means for selecting the corresponding bit with a multiplexer device of the processor.

Example 105 includes the subject matter of any of Examples 100-104, and further comprising: means for switching, by the processor, to a new task, wherein the new task is described by a task state segment extension in a memory of the computing device; and means for activating, by the processor, a low-latency segmentation mode in response to switching to the new task, wherein the task state segment extension is indicative of the low-latency segmentation mode; wherein the means for loading the logical address comprises means for loading the logical address in response to activating the low-latency segmentation mode.

Example 106 includes the subject matter of any of Examples 100-105, and wherein switching to the new task comprises: means for storing a current stack pointer value of the processor to a second task state segment extension associated with a previous task; means for loading an enhanced segmentation task register with a pointer value indicative of the task state segment extension; and means for loading a segmentation state of the processor for the new task from the task state segment extension.

Example 107 includes the subject matter of any of Examples 100-106, and wherein the means for loading the segmentation state of the processor comprises: means for loading a local descriptor table register of the processor with a local descriptor table pointer from the task state segment; extension means for loading a stack segment register of the processor with a stack segment selector from the task state segment extension; means for loading a code segment register of the processor with a code segment selector from the task state segment extension; means for loading a stack pointer register of the processor with a stack pointer value from the task state segment extension; and means for loading an instruction pointer register of the processor with an instruction pointer value from the task state segment extension.

Example 108 includes the subject matter of any of Examples 100-107, and further comprising: means for determining, by the processor, whether an application sandbox mode is enabled; means for determining, by the processor, whether a destination segment for the new task is identified in a local descriptor table in response to determining that the application sandbox mode is enabled; means for determining, by the processor, whether a descriptor privilege level of the destination segment is less than a current privilege level of the processor in response to determining that the destination segment for the new task is identified in the local descriptor table; and means for generating, by the processor, an exception in response to determining that the descriptor privilege level is less than the current privilege level.

Example 109 includes the subject matter of any of Examples 100-108, and further comprising: means for loading an unsandbox in a user privilege level; means for loading, by the unsandbox of the computing device, a sandboxed application in the user privilege level; means for configuring, by the unsandbox of the computing device, the task state segment extension, wherein the new task described by the task state segment extension comprises the sandboxed application; means for enabling, by the unsandbox of the computing device, the application sandbox mode; and means for executing the sandboxed application in response to enabling the application sandbox mode; wherein the means for loading the logical address comprises means for loading the logical address in response to executing the sandboxed application.

Example 110 includes the subject matter of any of Examples 100-109, and further comprising: means for loading a host kernel in a supervisor privilege level; and means for loading, by the host kernel, a host application in the user privilege level, wherein the host application comprises the unsandbox.

Example 111 includes the subject matter of any of Examples 100-110, and further comprising: means for loading a secure enclave in the host application using secure enclave support of the processor; wherein the means for loading the sandboxed application comprises means for loading the sandboxed application in the secure enclave.

Example 112 includes the subject matter of any of Examples 100-111, and further comprising means for attesting to the secure enclave, wherein the means for attesting to the secure enclave comprises means for measuring a global descriptor table of the sandboxed application, a local descriptor table of the sandboxed application, and the task state segment extension.

Example 113 includes the subject matter of any of Examples 100-112, and further comprising: means for loading, by the host application of the computing device, a user-level virtual machine monitor, wherein the user-level virtual machine monitor comprises the unsandbox; and means for loading, by the host application of the computing device, a paravirtualized kernel, wherein the paravirtualized kernel manages the sandboxed application; wherein the means for configuring the task state segment extension comprises means for configuring the task state segment extension by the user-level virtual machine monitor.

Example 114 includes the subject matter of any of Examples 100-113, and further comprising: means for handling, by the user-level virtual machine monitor of the computing device, a virtualized system call from the sandboxed application in the user privilege level; wherein the means for executing the sandboxed application further comprises means for virtualizing the system call, and wherein the means for virtualizing the system call comprises means for replicating a model-specific register of the processor that regulates user to supervisor mode transitions.

Example 115 includes the subject matter of any of Examples 100-114, and further comprising: means for setting a segmentation mode associated with the host kernel to a permissive segmentation mode; and means for setting, by the host application of the computing device, a segmentation mode associated with the task state segment extension to the low-latency segmentation mode.

Example 116 includes the subject matter of any of Examples 100-115, and further comprising means for setting a segment base and an effective limit associated with the unsandbox to zero in response to setting the segmentation mode to the permissive segmentation mode.

Example 117 includes the subject matter of any of Examples 100-116, and further comprising: means for loading, by the sandboxed application of the computing device, a nested sandboxed application in the user privilege level; means for configuring, by the sandboxed application of the computing device, a second task state segment extension that describes a second task, wherein the second task comprises the nested sandboxed application; and means for executing the nested sandboxed application in response to configuring the second task state segment extension.

Example 118 includes the subject matter of any of Examples 100-117, and further comprising: means for switching, by the processor, to a new protection domain, wherein the protection domain comprises a unit of code and data that may be used by multiple software threads; means for loading, by the processor, a segmentation state of the processor for the new protection domain from a domain object segment, wherein the segmentation state comprises a local descriptor table selector and a code segment selector; means for loading, by the processor, an entry point instruction pointer for the new protection domain from the domain object segment; means for determining, by the processor, if a subsystem identifier of the domain object segment is different from a current subsystem identifier of a current protection domain; means for indexing, by the processor, a subsystem table in a memory of the computing device with the subsystem identifier to retrieve a subsystem table entry in response to determining that the subsystem identifier of the domain object segment is different from the current subsystem identifier; means for loading, by the processor, a stack segmentation state from the subsystem table entry in response to indexing the subsystem table, wherein the stack segmentation state comprises a stack segment selector and a stack pointer; and means for activating, by the processor, a low-latency segmentation mode in response to indexing the subsystem table, wherein the subsystem table entry is indicative of the low-latency segmentation mode; wherein the means for loading the logical address comprises means for loading the logical address in response to activating the low-latency segmentation mode.

Example 119 includes the subject matter of any of Examples 100-118, and further comprising means for storing, by the processor, a current stack pointer of the processor in the subsystem table in response to determining that the subsystem identifier of the domain object segment is different from the current subsystem identifier; wherein the means for loading the stack segmentation state further comprises means for loading the stack segmentation state in response to storing the current stack pointer.

Example 120 includes the subject matter of any of Examples 100-119, and further comprising means for storing a stack limit in the subsystem table in response to determining that the subsystem identifier of the domain object segment is different from the current subsystem identifier.

Example 121 includes the subject matter of any of Examples 100-120, and further comprising: means for executing, by the processor, a call operation, wherein the call operation is indicative of a target code destination; means for pushing, by the processor, a call gate on a control stack in response to executing the call operation, wherein the call gate is indicative of a return point associated with the call operation, and wherein the control stack is included in a control stack segment of the memory of the computing device; means for executing, by the processor, a return operation in response to executing the call operation; means for determining, by the processor, whether a return address of a legacy stack matches an address of a top call gate of the control stack in response to executing the return operation; and means for generating, by the processor, a control stack mismatch exception in response to determining that the return address of the legacy stack does not match the address of the top call gate of the control stack.

Example 122 includes the subject matter of any of Examples 100-121, and wherein: the means for executing the call operation comprises means for executing a call operation to the new protection domain; and the means for executing the return operation comprises means for executing a return operation to the current protection domain.

Example 123 includes the subject matter of any of Examples 100-122, and further comprising: means for reading, by the processor, a control stack segment mode from the subsystem table entry in response to indexing the subsystem table; and means for determining, by the processor, whether the control stack segment mode comprises an intra-domain transfer mode; wherein: means for executing the call operation comprises executing a call operation to the new protection domain; means for executing the return operation comprises executing a return operation to the new protection domain; means for pushing the call gate further comprises pushing the call gate in response to determining that the control stack segment mode comprises the intra-domain transfer mode; and means for determining whether the return address of the legacy stack matches the address of the top call gate further comprises determining whether the return address of the legacy stack matches the address of the top call gate in response to determining that the control stack segment mode comprises the intra-domain transfer mode.

Example 124 includes the subject matter of any of Examples 100-123, and further comprising: means for loading an unsandbox in a user privilege level of the processor; means for loading, by the unsandbox of the computing device, a sandboxed application in the user privilege level; means for storing, by the unsandbox of the computing device, an extended descriptor selector in a code segment register of the processor, wherein the extended descriptor selector references an extended descriptor of an extended descriptor table; means for enabling an application sandbox mode in response to storing the extended descriptor selector in the code segment register; and means for executing the sandboxed application in response to enabling the application sandbox mode; wherein the means for loading the logical address comprises means for loading the logical address in response to executing the sandboxed application.

Example 125 includes the subject matter of any of Examples 100-124, and wherein the extended descriptor selector comprises a 32-bit value including a 15-bit protection domain identifier, an extended descriptor bit, and an extended descriptor offset.

Example 126 includes the subject matter of any of Examples 100-125, and wherein the extended descriptor table comprises a hierarchical table having a first level and a second level, wherein the first level is indexed by the protection domain identifier of the extended descriptor selector and wherein the second level is indexed by the extended descriptor offset of the extended descriptor selector.

Example 127 includes the subject matter of any of Examples 100-126, and further comprising means for prohibiting, by the processor, loading of a segment register of the processor with a legacy descriptor selector in response to enabling the application sandbox mode, wherein the legacy descriptor selector references a legacy descriptor of a local descriptor table or a global descriptor table.

Example 128 includes a computing device for process isolation, the computing device comprising: means for executing an unsandbox in a first privilege level of a processor of the computing device; means for enabling, by the unsandbox of the computing device, a sandbox mode of the processor, wherein enabling the sandbox mode comprises setting a sandbox flag of the processor; means for executing a sandboxed application in the sandbox mode and in the first privilege level in response to enabling the sandbox mode; means for generating, by the processor, a sandbox exception in response to executing the sandboxed application; means for dispatching, by the processor, the sandbox exception to a sandbox exception handler of the unsandbox in response to generating the sandbox exception; means for executing, by the unsandbox in the first privilege level, a dispatch return instruction in response to dispatching the sandbox exception; and means for resuming, by the processor, execution of the sandboxed application in the sandbox mode and in the first privilege level in response to executing the dispatch return instruction.

Example 129 includes the subject matter of Example 128, and wherein the first privilege level comprises a user privilege level of the processor.

Example 130 includes the subject matter of any of Examples 128 and 129, and wherein the first privilege level comprises a supervisor privilege level of the processor.

Example 131 includes the subject matter of any of Examples 128-130, and further comprising: means for executing, by the unsandbox, the dispatch handler in the first privilege level in response to dispatching the sandbox exception; wherein the means for executing the dispatch return instruction comprises means for executing the dispatch return instruction in response to executing the dispatch handler.

Example 132 includes the subject matter of any of Examples 128-131, and wherein the means for dispatching the sandbox exception to the sandbox exception handler of the unsandbox comprises: means for storing, by the processor, one or more sandbox dispatch values into corresponding registers of the processor in response to generating the sandbox exception, wherein the sandbox dispatch values include a return address within the sandboxed application; means for clearing, by the processor, the sandbox flag of the processor in response to generating the sandbox exception; and means for jumping, by the processor, to the sandbox exception handler within the unsandbox in response to clearing the sandbox flag, wherein the sandbox exception handler is identified by a dispatch instruction pointer register of the processor.

Example 133 includes the subject matter of any of Examples 128-132, and wherein the one or more sandbox dispatch values further include a return address within the sandboxed application, a dispatch address associated with the sandbox exception, and dispatch qualification data associated with the sandbox exception.

Example 134 includes the subject matter of any of Examples 128-133, and wherein the means for resuming execution of the sandboxed application comprises means for setting, by the processor, the sandbox flag of the processor.

Example 135 includes the subject matter of any of Examples 128-134, and wherein the means for setting the sandbox flag comprises means for setting a sandbox flag bit of a sandbox enable control register of the processor.

Example 136 includes the subject matter of any of Examples 128-135, and further comprising: means for configuring, by the unsandbox, a range register linked to a first segment register of the processor, wherein enabling the sandbox mode comprises enabling the sandbox mode in response to configuring the range register; wherein the means for executing the sandboxed application comprises means for mapping, by the processor, a logical address to a linear address, wherein the logical address comprises a segment selector and an effective address, wherein the segment selector is indicative of a segment base and an effective limit, and wherein the segment selector is associated with the first segment register; wherein the means for generating the sandbox exception comprises means for determining, by the processor, whether the linear address is within memory bounds defined by the range register; and wherein the means for dispatching the sandbox exception comprises means for dispatching a segment range sandbox violation in response to determining that the linear address is not within the memory bounds defined by the range register.

Example 137 includes the subject matter of any of Examples 128-136, and wherein the means for configuring the range register comprises means for storing an upper bound linear address and a lower bound linear address in the range register.

Example 138 includes the subject matter of any of Examples 128-137, and wherein the means for dispatching the sandbox exception further comprises means for storing the linear address in a dispatch address register of the processor and means for storing a segment identifier indicative of the first segment register in a dispatch qualification data register of the processor.

Example 139 includes the subject matter of any of Examples 128-138, and further comprising means for executing, by the unsandbox, the dispatch handler in the first privilege level in response to dispatching the sandbox exception, wherein the means for executing the dispatch handler comprises: means for executing, by the unsandbox, an XSAVE instruction to save a sandbox configuration of a current thread; means for enabling, by the unsandbox, a sandbox flag in a second sandbox configuration that corresponds to a destination thread, wherein the second sandbox configuration is stored in an XSAVE memory area; means for executing, by the unsandbox, an XRSTOR instruction to restore the second sandbox configuration in response to enabling the sandbox flag in the second sandbox configuration; and means for switching to the destination thread in response to executing the XRSTOR instruction.

Example 140 includes the subject matter of any of Examples 128-139, and wherein: the means for executing the sandboxed application comprises means for executing, by the sandboxed application, a near return instruction; the means for generating the sandbox exception comprises means for determining, by the processor, whether a top return address of a shadow stack matches a top return address of a legacy stack in response to executing the near return instruction; and the means for dispatching the sandbox exception comprises means for dispatching, by the processor, a stack mismatch violation in response to determining that the top return address of the shadow stack does not match the top return address of a legacy stack.

Example 141 includes the subject matter of any of Examples 128-140, and wherein the means for dispatching the sandbox exception further comprises means for storing the top return address of the legacy stack in a dispatch address register of the processor and means for storing the top return address of the shadow stack in a dispatch qualification data register of the processor.

Example 142 includes the subject matter of any of Examples 128-141, and wherein the processor comprises a plurality of segment registers and a plurality of range registers, wherein each range register is linked to a corresponding segment register, and wherein the shadow stack is outside of each of a plurality of memory bounds, wherein each memory bound is established by a corresponding range register.

Example 143 includes the subject matter of any of Examples 128-142, and wherein: the means for generating the sandbox exception further comprises means for determining, by the processor, whether a global sandbox enable flag of a configuration register of the processor is set in response to executing the near return instruction; and the means for dispatching the sandbox exception further comprises means for dispatching the stack mismatch violation in response to determining that the top return address of the shadow stack does not match the top return address of a legacy stack and determining that the global sandbox enable flag of the configuration register is set.

Example 144 includes the subject matter of any of Examples 128-143, and wherein: the means for generating the sandbox exception comprises means for executing, by the sandboxed application, a system call instruction; and the means for dispatching the sandbox exception comprises means for dispatching, by the processor, a system call exception to the unsandbox in the first privilege level in response to executing the system call instruction.

Example 145 includes the subject matter of any of Examples 128-144, and further comprising: means for loading a host kernel in a supervisor privilege level of the processor; and means for loading, by the host kernel, a host application in the first privilege level, wherein the host application comprises the unsandbox, and wherein the first privilege level comprises a user privilege level of the processor.

Example 146 includes the subject matter of any of Examples 128-145, and further comprising: means for loading a secure enclave in the host application using secure enclave support of the processor; wherein the means for executing the unsandbox in the first privilege level comprises means for executing the unsandbox within the secure enclave; and wherein the means for executing the sandboxed application in the sandbox mode and in the user privilege comprises means for executing the sandboxed application within the secure enclave.

Example 147 includes the subject matter of any of Examples 128-146, and further comprising: means for loading, by the host application of the computing device, a user-level virtual machine monitor, wherein the user-level virtual machine monitor comprises the unsandbox; and means for loading, by the user-level virtual machine monitor, a user-level paravirtualized kernel, wherein the user-level paravirtualized kernel comprises the sandboxed application.

The invention claimed is:

1. An apparatus comprising:
   processor circuitry coupled to a memory, the processor circuitry to:
   load, via software isolation manager circuitry, an unsandbox in a user privilege level of the processor;
   load, via the unsandbox, a sandboxed application in the user privilege level;
   store, via the unsandbox, an extended descriptor selector in a code segment register of the processor, wherein the extended descriptor selector references an extended descriptor of an extended descriptor table; and
   execute the sandboxed application in response to enablement of an application sandbox mode of the processor, wherein the processor further comprises sandbox manager circuitry to enable the application sandbox mode in response to storage of the extended descriptor selector in the code segment register, and wherein to load the logical address comprises to load the logical address in response to execution of the sandboxed application.

2. The apparatus of claim 1, wherein the extended descriptor selector comprises a 32-bit value including a 15-bit protection domain identifier, an extended descriptor bit, and an extended descriptor offset.

3. The apparatus of claim 1, wherein the extended descriptor table comprises a hierarchical table having a first level and a second level, wherein the first level is indexed by the protection domain identifier of the extended descriptor selector and wherein the second level is indexed by the extended descriptor offset of the extended descriptor selector.

4. The apparatus of claim 1, wherein the processor is further to facilitate the sandbox manager circuitry to prohibit loading of a segment register of the processor with a legacy descriptor selector in response to the enablement of the application sandbox mode, wherein the legacy descriptor selector references a legacy descriptor of a local descriptor table or a global descriptor table.

5. The apparatus of claim 1, wherein the processor circuitry comprises one or more of application processor circuitry or graphics processor circuitry.

6. A method comprising:
   loading, by a processor of a computing device, an unsandbox in a user privilege level of the processor;
   loading, by the processor, a sandboxed application in the user privilege level;
   storing, by the processor, an extended descriptor selector in a code segment register of the processor, wherein the extended descriptor selector references an extended descriptor of an extended descriptor table;
   executing, by the processor, the sandboxed application in response to enablement of an application sandbox mode of the processor; and
   enabling, by the processor, the application sandbox mode in response to storage of the extended descriptor selector in the code segment register, and wherein to load the logical address comprises to load the logical address in response to execution of the sandboxed application.

7. The method of claim 5, wherein the extended descriptor selector comprises a 32-bit value including a 15-bit protection domain identifier, an extended descriptor bit, and an extended descriptor offset.

8. The method of claim 5, wherein the extended descriptor table comprises a hierarchical table having a first level and a second level, wherein the first level is indexed by the protection domain identifier of the extended descriptor selector and wherein the second level is indexed by the extended descriptor offset of the extended descriptor selector.

9. The method of claim 5, further comprising prohibiting, by the processor, loading of a segment register of the processor with a legacy descriptor selector in response to the enablement of the application sandbox mode, wherein the legacy descriptor selector references a legacy descriptor of a local descriptor table or a global descriptor table.

10. The method of claim 5, wherein the processor comprises one or more of an application processor or a graphics processor.

11. At least one non-transitory computer-readable medium having stored thereon instructions which, when executed, cause a computing device to perform operations comprising:
  loading an unsandbox in a user privilege level of a processor of the computing device;
  loading a sandboxed application in the user privilege level;
  storing an extended descriptor selector in a code segment register of the processor, wherein the extended descriptor selector references an extended descriptor of an extended descriptor table;
  executing the sandboxed application in response to enablement of an application sandbox mode of the processor; and
  enabling the application sandbox mode in response to storage of the extended descriptor selector in the code segment register, and wherein to load the logical address comprises to load the logical address in response to execution of the sandboxed application.

12. The non-transitory computer-readable medium of claim 9, wherein the extended descriptor selector comprises a 32-bit value including a 15-bit protection domain identifier, an extended descriptor bit, and an extended descriptor offset.

13. The non-transitory computer-readable medium of claim 9, wherein the extended descriptor table comprises a hierarchical table having a first level and a second level, wherein the first level is indexed by the protection domain identifier of the extended descriptor selector and wherein the second level is indexed by the extended descriptor offset of the extended descriptor selector.

14. The non-transitory computer-readable medium of claim 9, wherein the operations further comprise prohibiting loading of a segment register of the processor with a legacy descriptor selector in response to the enablement of the application sandbox mode, wherein the legacy descriptor selector references a legacy descriptor of a local descriptor table or a global descriptor table.

15. The non-transitory computer-readable medium of claim 11, wherein the processor comprises one or more of an application processor or a graphics processor.

16. A data processing system comprising:
  one or more processors;
  a memory coupled to the one or more processors, the one or more processors to:
  load an unsandbox in a user privilege level of the one or more processors;
  load, via the unsandbox, a sandboxed application in the user privilege level;
  store, via the unsandbox, an extended descriptor selector in a code segment register of the processor, wherein the extended descriptor selector references an extended descriptor of an extended descriptor table; and
  execute the sandboxed application in response to enablement of an application sandbox mode of the processor, wherein the processor further comprises a sandbox manager circuitry to enable the application sandbox mode in response to storage of the extended descriptor selector in the code segment register, and wherein to load the logical address comprises to load the logical address in response to execution of the sandboxed application.

17. The data processing system of claim 13, wherein the extended descriptor selector comprises a 32-bit value including a 15-bit protection domain identifier, an extended descriptor bit, and an extended descriptor offset.

18. The data processing system of claim 13, wherein the extended descriptor table comprises a hierarchical table having a first level and a second level, wherein the first level is indexed by the protection domain identifier of the extended descriptor selector and wherein the second level is indexed by the extended descriptor offset of the extended descriptor selector.

19. The data processing system of claim 13, wherein the processor is further to facilitate the sandbox manager circuitry to prohibit loading of a segment register of the processor with a legacy descriptor selector in response to the enablement of the application sandbox mode, wherein the legacy descriptor selector references a legacy descriptor of a local descriptor table or a global descriptor table.

20. The data processing system of claim 13, wherein the one or more processors comprise one or more application processors or one or more graphics processors.

* * * * *